(12) United States Patent
Choyi et al.

(10) Patent No.: US 11,240,212 B2
(45) Date of Patent: *Feb. 1, 2022

(54) CONTENT SECURITY AT SERVICE LAYER

(71) Applicant: Convida Wireless, LLC, Wilmington, DE (US)

(72) Inventors: Vinod Kumar Choyi, Conshohocken, PA (US); Yogendra C. Shah, Exton, PA (US); Dale N. Seed, Allentown, PA (US); Michael F. Starsinic, Newtown, PA (US); Shamim Akbar Rahman, Cote St. Luc (CA); Quang Ly, North Wales, PA (US); Zhuo Chen, Claymont, DE (US); William Robert Flynn, IV, Schwenksville, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/826,363

(22) Filed: Mar. 23, 2020

(65) Prior Publication Data

US 2020/0287876 A1 Sep. 10, 2020

Related U.S. Application Data

(63) Continuation of application No. 15/198,984, filed on Jun. 30, 2016, now Pat. No. 10,637,836.
(Continued)

(51) Int. Cl.
*H04L 29/06* (2006.01)
*H04W 12/06* (2021.01)
(Continued)

(52) U.S. Cl.
CPC ...... *H04L 63/0435* (2013.01); *H04L 63/0823* (2013.01); *H04L 63/101* (2013.01);
(Continued)

(58) Field of Classification Search
None
See application file for complete search history.

(56) References Cited

U.S. PATENT DOCUMENTS

| 8,402,526 B2 | 3/2013 | Ahn | |
|---|---|---|---|
| 2003/0074580 A1* | 4/2003 | Knouse | H04L 67/142 726/4 |

(Continued)

FOREIGN PATENT DOCUMENTS

| CN | 101341691 A | 1/2009 |
|---|---|---|
| CN | 102143134 A | 8/2011 |

(Continued)

OTHER PUBLICATIONS

Barnes, R., "Use Cases and Requirements for JSON Object Signing and Encryption (JOSE)", Internet Engineering Task Force (IETF), RFC 7165, Apr. 2014, 1-25 pages.

(Continued)

*Primary Examiner* — Brandon S Hoffman
(74) *Attorney, Agent, or Firm* — BakerHostetler

(57) ABSTRACT

Existing approaches to security within network, for instance oneM2M networks, are limited. For example, content might only be protected while the content is in transit between entities that trust each other. Here, the integrity and the confidentiality of content in an M2M network are protected. Such content may be "at rest," such that the content is stored at a hosting node. Only authorized entities may store and retrieve the data that is stored at the hosting node, and the data may be protected from a confidentiality perspective and an integrity perspective.

12 Claims, 37 Drawing Sheets

Related U.S. Application Data

(60) Provisional application No. 62/188,141, filed on Jul. 2, 2015, provisional application No. 62/248,808, filed on Oct. 30, 2015.

(51) Int. Cl.
   *H04W 12/08* (2021.01)
   *H04W 12/069* (2021.01)
   *H04W 12/086* (2021.01)
   *H04W 4/70* (2018.01)

(52) U.S. Cl.
   CPC ......... *H04W 12/06* (2013.01); *H04W 12/069* (2021.01); *H04W 12/08* (2013.01); *H04W 12/086* (2021.01); *H04L 63/061* (2013.01); *H04W 4/70* (2018.02)

(56) References Cited

U.S. PATENT DOCUMENTS

| | | | |
|---|---|---|---|
| 2005/0204148 A1* | 9/2005 | Mayo | H04L 63/0815 713/185 |
| 2007/0100913 A1 | 5/2007 | Sumner et al. | |
| 2010/0042929 A1 | 2/2010 | Berry et al. | |
| 2010/0251353 A1 | 9/2010 | Hodgkinson | |
| 2013/0095459 A1 | 4/2013 | Tran | |
| 2015/0003312 A1 | 1/2015 | Jeong et al. | |
| 2015/0032795 A1 | 1/2015 | Robbins et al. | |
| 2015/0033311 A1 | 1/2015 | Seed et al. | |
| 2015/0033312 A1 | 1/2015 | Seed et al. | |
| 2016/0302069 A1 | 10/2016 | Kim et al. | |

FOREIGN PATENT DOCUMENTS

| | | |
|---|---|---|
| CN | 103210627 A | 7/2013 |
| CN | 103532981 A | 1/2014 |
| EP | 2890073 A1 | 7/2015 |
| JP | 2009-512077 A | 3/2009 |
| JP | 2012-069110 A | 4/2012 |
| JP | 2015-036926 A | 2/2015 |
| WO | 2011/100331 A1 | 8/2011 |
| WO | 2014/185754 A1 | 11/2014 |
| WO | 2015/080515 A1 | 4/2015 |

OTHER PUBLICATIONS

Dierks, T., "The Transport Layer Security (TLS) Protocol Version 1.2", Network Working Group, RFC 5246, Aug. 2008, 1-104 pages.
Gramm-Leach-Bliley Act, Federal Trade Commission, 2 pages, http://www.ftc.gov/privacy/privacyinitiatives/glbact.html.
Health Insurance Portability And Accountability Act Of 1996, Public Law 104-191—Aug. 21, 1996, 169 pages.
Jones, M. and Hildebrand, J., "JSON Web Encryption (JWE)", Internet Engineering Task Force (IETF), RFC 7516, May 2015, 1-51 pages.
Jones, M., "JSON Web Algorithms (JWA)", Internet Engineering Task Force (IETF), RFC 7518, May 2015, 1-69 pages.
Jones, M., "JSON Web Key (JWK)", Internet Engineering Task Force (IETF), RFC 7517, May 2015, 1-40 pages.
Jones, M., "JSON Web Signature (JWS)", Internet Engineering Task Force (IETF), RFC 7515, May 2015, 1-59 pages.
Kent, S. and Seo, K., "Security Architecture for the Internet Protocol", Network Working Group, RFC 4301, Dec. 2005, 1-101 pages.
Korean Application No. 10-2016-7017358: Korean Office Action dated Sep. 22, 2016, 7 pages.
Motion Picture Association of America-Content Security Best Practices, V3.0, Apr. 2, 2015, 103 pages.
OneM2M Technical Specification, TS-0001-V1 .6.1, "Functional Architecture", Jan. 30, 2015, 1-321 pages.
OneM2M Technical Specification, TS-0003-V1 .0.1, "Security Solutions", Jan. 30, 2015, 1-91 pages.
OneM2M TR-0012 End to End Data Security Proposal, Oct. 2015, 9 pages.
Rescorla, E. and Modadugu, N., "Datagram Transport Layer Security Version 1.2", Internet Engineering Task Force (IETF), RFC 6347, Jan. 2012, 1-32 pages.
Gao et al., "Research on M2 M Functional Architecture and Security", Computer Technology and Development, vol. 22, No. 1, Jan. 2012, pp. 250-253. (English Abstract Submitted).

* cited by examiner

CONTENT SECURITY AT SERVICE LAYER

CROSS REFERENCE TO RELATED APPLICATIONS

This application is a continuation of application Ser. No. 15/198,984 filed Jun. 30, 2016, now U.S. Pat. No. 10,637,836, which claims the benefit of U.S. Provisional Patent Application Ser. No. 62/188,141 filed Jul. 2, 2015 and U.S. Provisional Patent Application Ser. No. 62/248,808 filed Oct. 30, 2015, the contents of which are hereby incorporated by reference in their entireties.

BACKGROUND

A typical communication session generally involves a persistent interactive exchange of information between two or more communicating entities (e.g., devices, applications, etc.), which can also be referred to as nodes. In the current RESTful approach, there is no real persistent connection. Instead, communication is performed via on-demand request and response messages. For example, a communication session may be established at a certain point in time, and torn down at a later point in time based on various circumstances (e.g., after the session times out or when one of the entities decides to terminate the session). A communication session often involves the exchange of multiple messages between entities and is typically stateful, which means that at least one of the communicating entities needs to save information about the session history in order to be able to maintain the communication session. Example information that may be saved includes security context such as credentials, identifiers, etc. Communication sessions may be implemented as part of protocols and services at various layers in a network protocol stack. As an example, FIG. 1 shows communication sessions established between network nodes at the transport protocol layer, application protocol layer, application service layer, and between applications.

A machine-to-machine (M2M) service layer is an example of one type of application service layer specifically targeted towards providing value-added services for M2M type devices and applications. For example, an M2M service layer can support Application Programming Interfaces (APIs) that provide applications and devices access to a collection of M2M centric capabilities supported by the service layer. Example capabilities include, without limitation, security, charging, data management, device management, discovery, provisioning, and connectivity management. FIG. 2 depicts the common services function (CSF) that is specified by the oneM2M specifications.

Referring to FIG. 2, the illustrated functions (capabilities) are made available to applications via APIs that make use of message formats, resource structures, and resource representations defined by the M2M service layer. A growing trend in the standardization of M2M network technologies has been the standardization of the M2M Service Layer. Examples of the standardization of the M2M Service Layer include the various oneM2M specifications.

An M2M service layer session refers to a communication session established between a M2M service layer instance and an M2M application or another M2M service layer instance. An M2M service layer session can consist of an M2M service layer state related to connectivity, security, scheduling, data, context, etc. This state can be maintained by the M2M service layer, an M2M application, or a combination thereof. An M2M service layer session can be layered on top of one or more underlying lower layer communication sessions. In doing so, a session state (e.g., security credentials, congestion information, etc.) can be shared and leveraged between the different sessions. In addition, an M2M service layer session can support persistency with regard to lower layer sessions such that the M2M service layer session can persist and be maintained independently from lower layer sessions being setup and torn-down. Examples of lower layer sessions that a M2M service layer session can be layered on top of include, but are not limited to, application protocol layer sessions (e.g., HTTP or CoAP) and transport protocol layer sessions (e.g., TCP and/or UDP), which may be secured using protocols such as, for example, Transport Layer Security (TLS for TCP) or Datagram Transport Layer Security (DTLS for UDP).

With respect to current approaches to oneM2M service layer security, when oneM2M endpoints communicate with one another in a secure manner, the nodes and intermediate nodes establish a security association with one another in a hop-by-hop manner. Each hop may have a separate security association that is independent from other hops. Hop-by-hop security associations may be established by means of symmetric keys, by using certificates/raw public keys, or by a bootstrapping process that may be performed by a direct process or remotely by using the services of a device manufacturer or service provider. Also, in accordance with the current version of the oneM2M Security Solution, one M2M-TS-0003 Security Solutions, "At the service layer level, the security association establishment results in a TLS or DTLS session which protects messages being exchanged between adjacent AE/CSE, i.e. hop-by-hop."

FIG. 3 shows an example of Hop-by-Hop (HbH) security associations between entities by means of (D)TLS secure associations using credentials that are unique and confidential to the two communicating entities that are involved. As shown, a first application entity (AE1) and a first hosting common services entity (HCSE1) create a secure (D)TLS connection based on HbH credentials (H1), which are shared by the two entities (AE1, HCSE1). Similarly, HCSE1 and an intermediate node (IN-CSE1) have setup a secure (D)TLS connection using H2 credentials. As shown, credentials H3 are used for creating a (D)TLS connection between IN-CSE and a second HCSE (HCSE2), and credentials H4 are used to create the secure connection between a second AE (AE2) and HCSE2.

Still referring to FIG. 3, if HCSE1 wanted to communicate information to AE2, then the information is first sent through the (D)TLS connection between HCSE1 and IN-CSE. The information is then extracted after being decrypted by the (D)TLS application, and then processed at the service layer and sent re-packaged through a separate (D)TLS tunnel between IN-CSE and HCSE2. The HCSE2 processes the message and then re-tunnels the message through a different secure tunnel between HCSE2 and AE2. As shown in the illustrated example, the communications between any two HbH entities is secured by (D)TLS, and therefore breach in confidentiality or integrity of messages that are in transit between the Entities may be difficult because they are protected by (D)TLS connection, however, the messages might not be protected at the entity where it is being processed at the service layer (SL) before being forwarded to the next hop.

Turning now to object security initiatives, object security initiatives have been studied and standardized within the IETF, and implemented for various single sign-on solutions (e.g., OpenID). As stated in the IETF RFC 7165, Use Cases and Requirements for JSON Object Signing and Encryption, "Many Internet applications have a need for object-based security mechanisms in addition to security mechanisms at the network layer or transport layer. For many years, the Cryptographic Message Syntax (CMS) has provided a binary secure object format based on ASN.1. Over time, binary object encodings such as ASN.1 have become less common than text-based encodings, such as the JavaScript Object Notation (JSON)". Different security aspects based on JSON are specified in 1) JSON Web Signature, IETF—RFC 7515 for integrity/authenticity; 2) JSON Web Encryption, IETF—RFC 7516 for confidentiality; 3) JSON Web Key, IETF—RFC 7516 for credential representation; and 4) JSON Web Algorithms, IETF-RFC 7518 for algorithms.

As described above, existing approaches to security within oneM2M networks, for example, are limited. For example, content might only be protected while the content is in transit (not at rest) between entities that trust each other.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Various shortcomings, such as the issues described above, are addressed herein. In one embodiment, the integrity and the confidentiality of content in an M2M network is protected. Such content may be "at rest," such that the content is stored at a node or apparatus.

In one embodiment, an apparatus, for instance an application entity, sends a request for one or more credentials that provide protection of content. The request may be based on one or more security parameters associated with the content. The apparatus may obtain the one or more credentials, and use the one or more credentials to secure the content. The credentials may comprise a master key for symmetric key confidentiality protection. The credentials may comprise credentials for both integrity protection and confidentiality protection. The apparatus may encrypt the content to create encrypted content. The apparatus may generate an authentication tag associated with the content. Further, the apparatus may send a request to a hosting common services entity to create a resource that contains the secured content and the security parameters. The credentials may be obtained from a trust enablement function, for instance an M2M enrollment function, in accordance with one example. The hosting common services entity may only allow authorized applications to create resources, and the hosting common services entity may only allow authorized applications to retrieve encrypted content.

In another embodiment, based on one or more security requirements, an apparatus determines one or more cryptographic parameters. The apparatus may further send a secure hosting request message to a content hosting function, and the secure hosting request message may include the one or more cryptographic parameters and content associated therewith, such that the content hosting function can securely store the content using the one or more cryptographic parameters. Based on the one or more cryptographic parameters, the apparatus may encrypt the content such that the content is confidential. In an example, the content may consist of subcomponents, and the node encrypt each of the subcomponents such that each subcomponent is confidential, based on the one or more cryptographic parameters. In another example, the content may consist of pairs of attributes and values, and the node may encrypt each of the values such that each value is confidential, based on the one or more cryptographic parameters. The node may also compute an authentication tag associated with the content such that the content is integrity protected.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF ILLUSTRATIVE EMBODIMENTS

Figure 1:
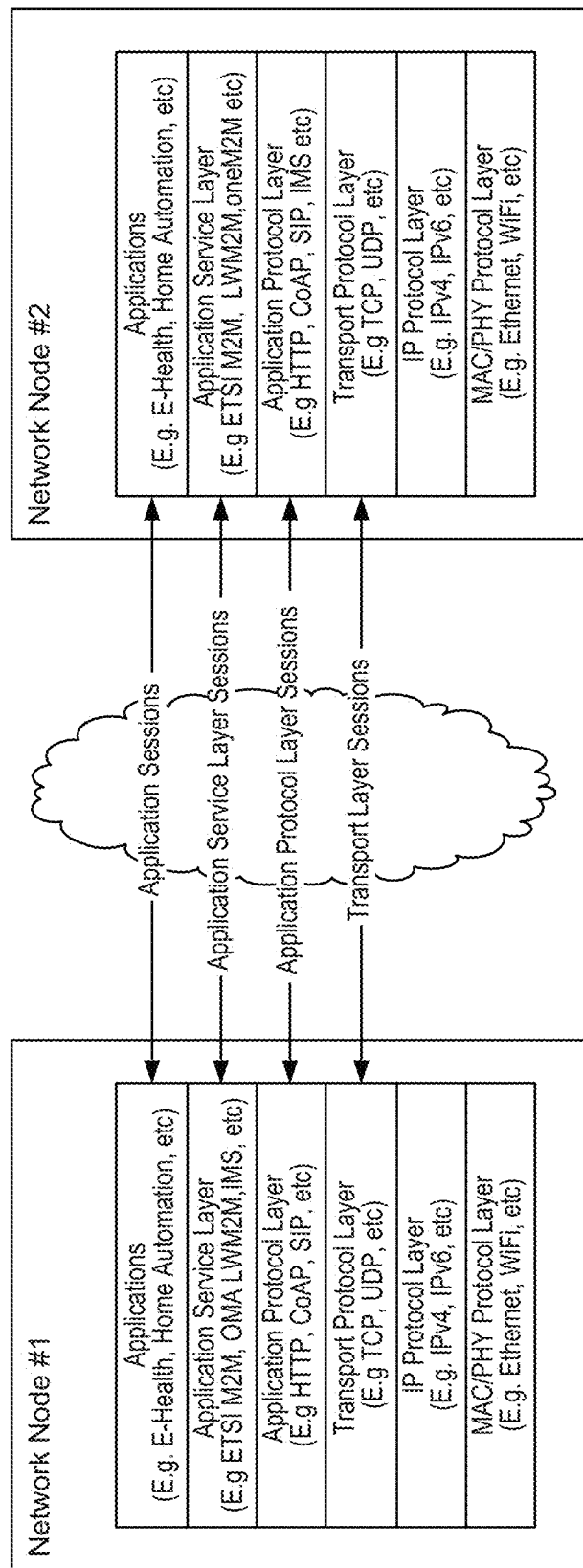
FIG. 1 is a diagram that shows an example of various communication sessions that be established between network nodes.
Figure 2:
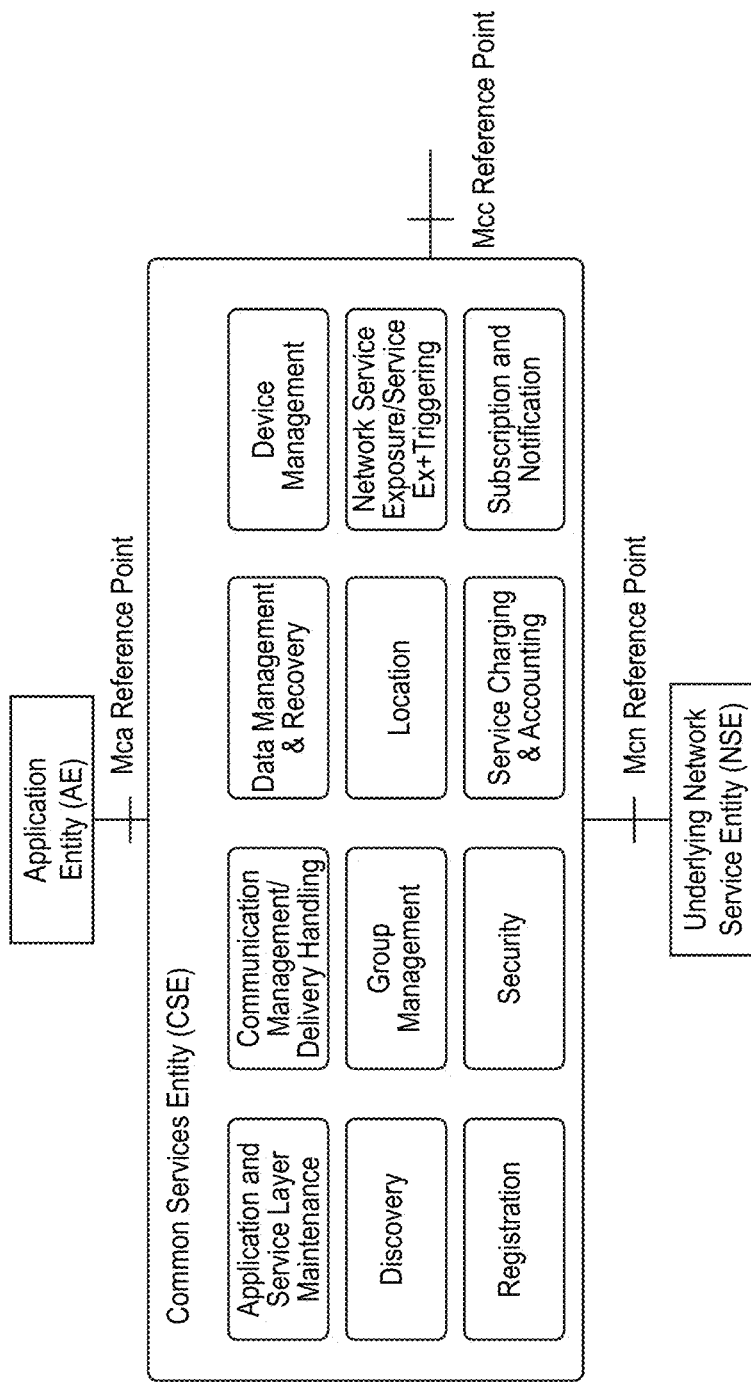
FIG. 2 is a diagram that shows common service functions that are specified by oneM2M.
Figure 3:
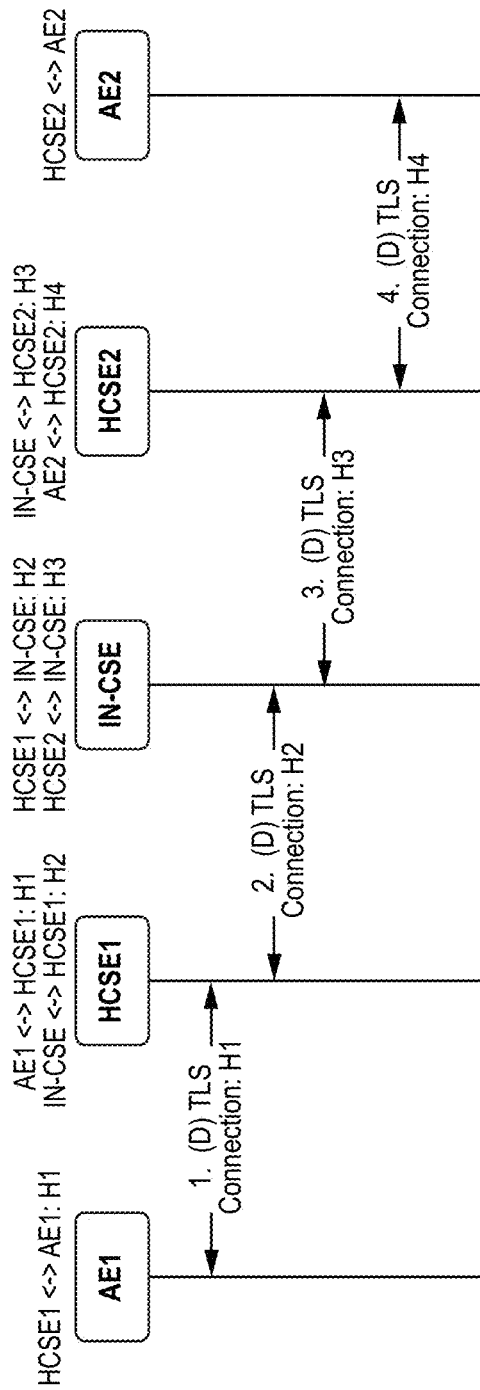
FIG. 3 is a call flow that shows an example of oneM2M nodes establishing security associations with each other in a hop-by-hop manner.

As described above, existing approaches to security within M2M networks are limited. For example, in oneM2M, content might only be protected while it is "in transit" between two "trusted" entities by means of transport-layer protocols (e.g., TLS/DTLS). Thus, content is not protected while it is hosted at an entity (at rest). The implication is that the content (object) protection, if at all performed, must be done at the application layer. It is recognized herein that there are problems associated with an application content protection approach. For example, applications do not provide a uniform mechanism for application content protection. Furthermore, service layer resources are not protected per se. Also, if there were application layer protections, they might only provide for the actual application data protection, and not the resources associated with the service layer (SL). It is further recognized herein that separate application layer protocols for securing content must be performed for an application content protection approach, which may be cumbersome. In certain scenarios, in order for a service layer to be able to provide value-added services, the content may have to be in its unencrypted form. It is also recognized herein that life-cycle management of security credentials and security protections associated with oneM2M resources is not currently performed. Mechanisms to handle security of data hosted on decommissioned entities are not currently addressed.

As used herein, the term "service layer" refers to a functional layer within a network service architecture. Service layers are typically situated above the application protocol layer such as HTTP, CoAP or MQTT, and provide value added services to client applications. The service layer also provides an interface to core networks at a lower resource layer, such as for example, a control layer and transport/access layer. The service layer supports multiple categories of (service) capabilities or functionalities including service definition, service runtime enablement, policy management, access control, and service clustering. Recently, several industry standards bodies (e.g., oneM2M) have been developing M2M service layers to address the challenges associated with the integration of M2M types of devices and applications into deployments such as the Internet/Web, cellular, enterprise, and home networks. An M2M service layer can provide applications and/or various devices with access to a collection of, or a set of, the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs that make use of message formats, resource structures, and resource representations defined by the M2M service layer. The CSE or SCL is a functional entity that may be implemented by hardware and/or software and that provides (service) capabilities or functionalities exposed to various applications and/or devices (e.g., functional interfaces between such functional entities) in order for them to use such capabilities or functionalities.

Figure 4:
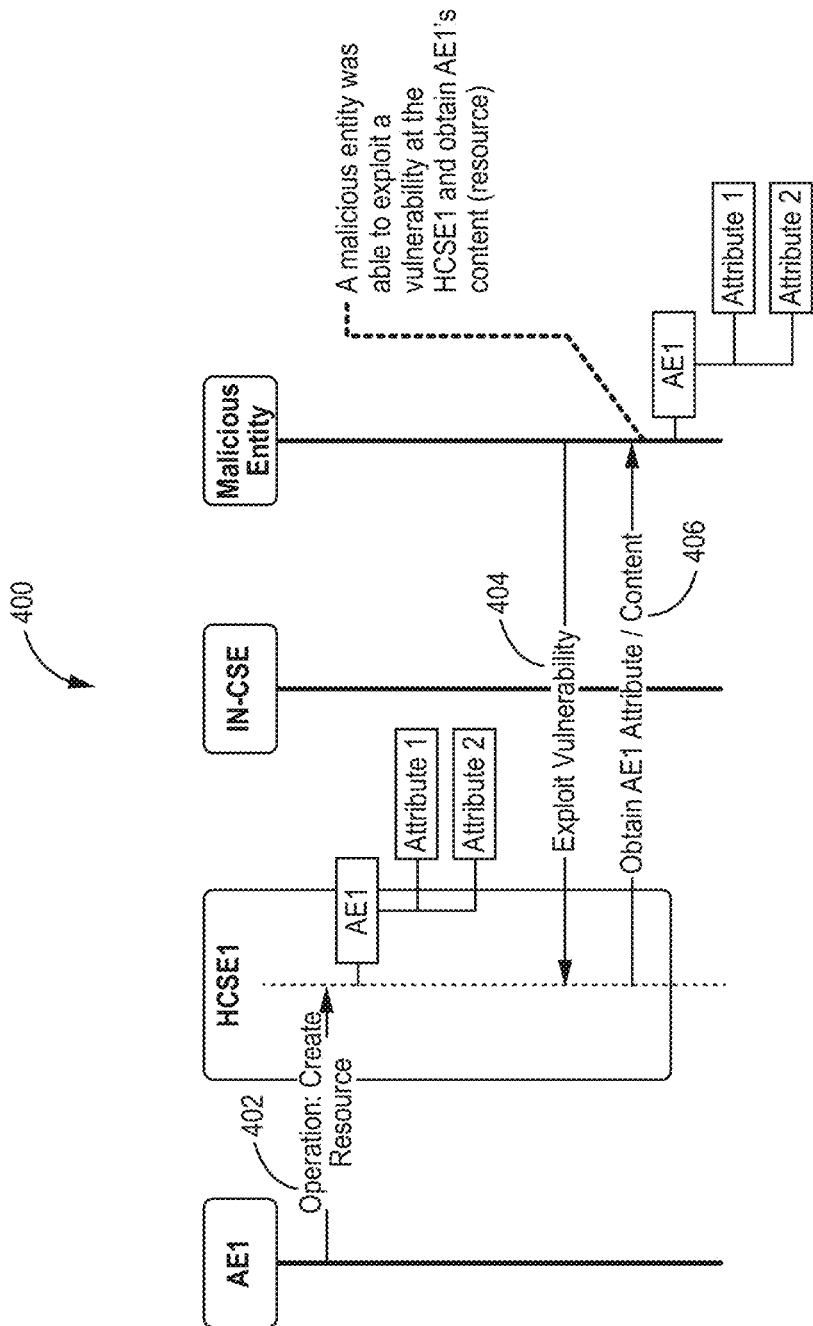
FIG. 4 is a call flow illustrating an example use case that shows an example of a malicious entity exploiting a vulnerability in a network that includes an application entity (AE), hosting common services entity (HCSE), and an intermediate node common services entity (IN-CSE)
Figure 5:
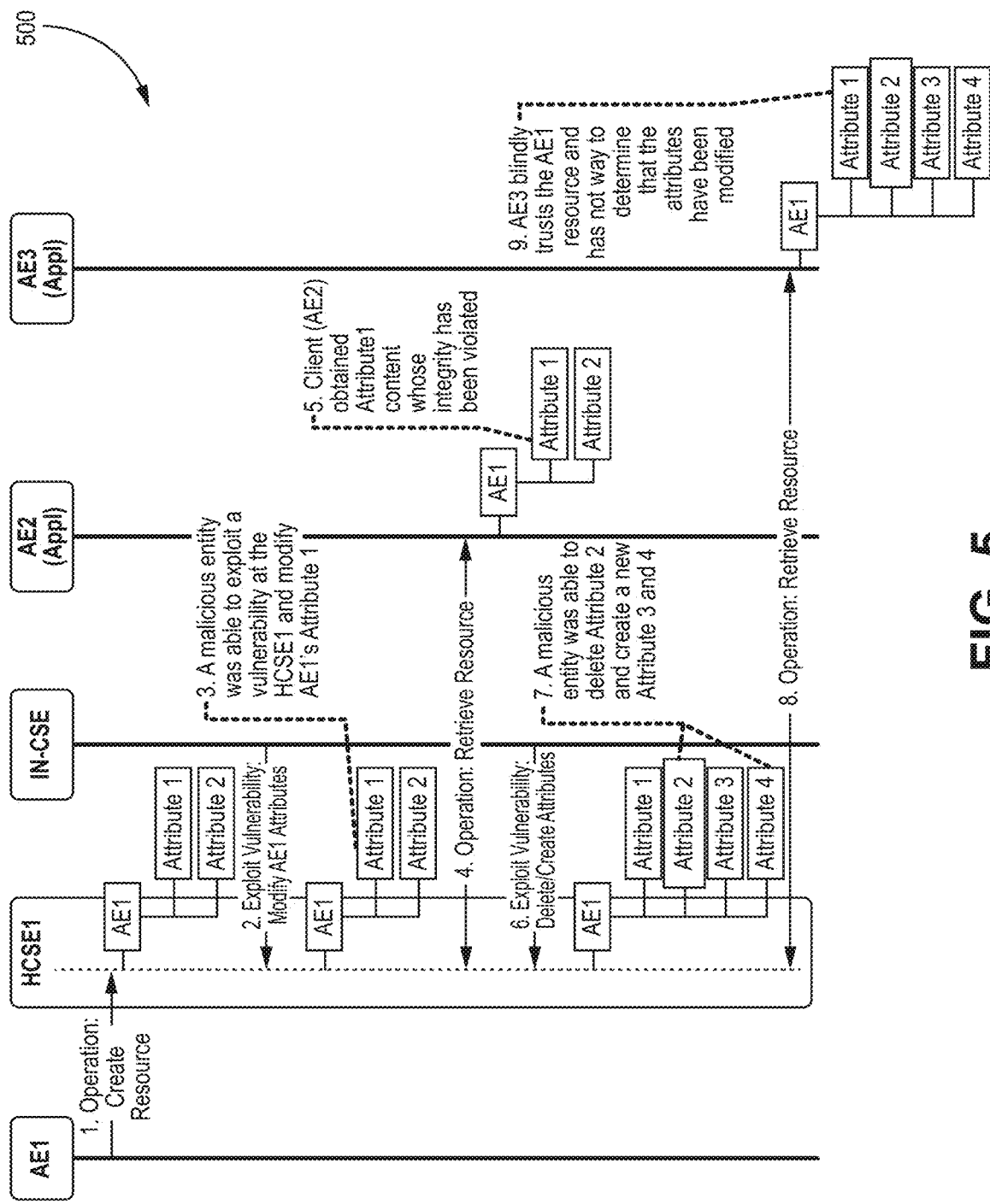
FIG. 5 is a call flow illustrating another example use case in which an attacker may exploit vulnerabilities at the IN-CSE or the HCSE.

To further illustrate issues with current oneM2M solutions, for purposes of example, FIGS. 4 and 5 illustrate respective uses cases. In FIG. 4, impacts on data/content privacy are shown, and FIG. 5 is illustrative of problems associated with the lack of integrity protection and authentication of data/content.

With particular reference to FIG. 4, a network 400 includes four example entities: a first application entity (AE1), a Hosting common services entity (HCES1), an intermediate node CSE (IN-CSE), and a malicious entity, which may be a hacker application or a non-malicious function. At 402, the AE1 creates a resource within the HCSE1 at a service layer, which stores attributes and content/content instances. In this use case, two attributes are provided as examples: Attribute 1 and Attribute 2. In accordance with the example, the AE1 and HCSE1 have mutually authenticated each other and have used a secure communications channel prior to performing the "create resource" operation at 402. At some point, at 404, the malicious entity (e.g., a hacking application) exploits a vulnerability within the HCSE1 through the IN-CSE. In some cases, the hacking application may be able to reach the HCSE1 without having to go through an IN-CSE. In other cases, because of the diversity of protocol support (e.g., open ports and services that run) on the IN-CSE, it may make a good entry point for a hacking application by possibly exploiting a vulnerability at the IN-CSE as well. Once the hacker is able to access the HCSE1, it steals the content stored within the AE1 resource at 406. This may be a classic attack without the need for much sophistication. One way to mitigate such an attack is to encrypt the whole disk or use encryption on a per-file basis. However, the content may have to be processed at the SL and decrypted at a transit node on the communication path, such that the content becomes vulnerable to an attack. Another mitigation technique is to protect the content using JSON-based object signing and encryption mechanisms. But there is currently no framework to enable the use of such mechanisms for protecting SL resources. An additional issue is that the HCSE1's platform is not trustworthy and therefore secure processes may not be carried out. Also, if a root key is broken, then it exposes the data from all the AEs stored on the HCSE1. In short, the security of an application data or user's confidential data is off-loaded to an entity that the user or application does not have much control of and the trustworthiness of the platform is based on the trust the user has of the SP. Additionally, when the HCSE1 is de-commissioned, the data may remain within the HCSE1 and protected only by a file-based encryption, which may be broken easily by an obsolete operating system protecting the resources.

Thus, in summary, the use case of FIG. 4 shows, for example and without limitation, a lack of a confidentiality protection mechanism at the hosting entity (e.g. HCSE) when the content is at rest, a lack of a mechanism to hide the content even from the HCSE (e.g., a less-trustworthy HCSE), that each hop (e.g., transit CSE) has an unencrypted access to the content once the data comes through a TLS/DTLS tunnel when transferring content to a client, and a lack of an ability to re-cycle the security of content on a regular basis for the content's lifecycle.

Referring now to the use case illustrated in FIG. 5, a network 500 includes a first application entity (AE1) that generates content, a second AE (AE2) and a third AE (AE3) that are Client applications that consume the content produced by the AE1. The network further includes a hosting CSE (HCSE1) and an intermediate node-CSE (IN-CSE). In the example, the content is hosted on the HCSE1 without any integrity protection. Similar to the example use case illustrated in FIG. 4, an attacker may exploit vulnerabilities at the IN-CSE or HCSE1. At 1, AE1 creates a resource at HCSE1. For example, an attacker may modify the resource and/or the resource structure (e.g., attributes and/or content) at 2 and 3. As shown, FIG. 5 illustrates a scenario in which an attacker is able to perform an unauthorized modification of AE1's attribute, referred to as Attribute 1. AE2, which subscribes to AE1's resource, obtains the modified copy of the resource at 4 and 5. In some cases, for example when the resource obtained from AE1 is used to make critical decisions or operations by AE2, the modification may have major ramifications. At 6 and 7, in accordance with the illustrated example, the attacker deletes the Attribute 2 and adds new attributes (Attribute 3 and Attribute 4). Thus, in the example, the attacker is not only changing the resource, but also the structure of the resource. The AE3 that subscribes to the resource then has a completely different resource tree than what was created by AE1. Thus, as shown by the example use case of FIG. 5, current security approaches might not provide integrity protection to a resource, provide integrity protection to the structure of the resource, and/or provide integrity protection to system critical resources.

Various shortcomings, such as the issues described above, are addressed herein. In one embodiment, the integrity and the confidentiality of content is protected. As used herein, unless other specified, the term content refers to any data that is produced or consumed by machine-controlled or human-controlled client applications or service functions (e.g., firmware, configuration parameters, policies, context, documents, etc.). Thus, the terms content and data may be used interchangeably herein without limitation. Content may be in its rawest form (e.g., temperature reading, other sensor readings, etc.). In some cases, content may be raw data with additional metadata associated with it, or may be a combination of raw data and raw data with metadata. Content may also refer to various information such as, for example, machine executable content (e.g., computer program, binary code, executable machine code that may have been compiled or translated, computer program scripts, etc.), computer related configuration parameters, operational polices (e.g., security or service policies), multimedia content (e.g., video, audio etc.), documents, or anything that may have a certain monetary, strategic, or intellectual value. Content may also be referred to as an object.

As used herein, unless otherwise specified, authentication refers to a process of establishing confidence in an identity associated with an entity. Confidentiality generally refers to a process of ensuring that only an authorized entity is able to view data. As used herein, unless otherwise specified, an entity or node may refer to an application, a subset of applications, a service enabling function, or a device (e.g., sensor device). The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," "entity," and "network node" may be used interchangeably. The term "integrity" may refer to a process of establishing confidence that a message or a system has not been altered by an unauthorized entity. The internet of things (IoT) generally refers to uniquely identifiable objects and their virtual representations, which can be connected to the Internet. As used herein, the term life cycle management refers to a mechanism by which data and credentials associated therewith are managed through provisioning, maintenance, and decommissioning phases.

Various M2M terms are used herein. An M2M service layer generally refers to a software middleware layer that supports value-added services for M2M applications and devices through a set of Application Programming Interfaces (APIs) and underlying networking interfaces. An M2M Service Layer hop refers to an M2M service layer communication session between two M2M service layers or between an M2M service layer and an M2M application. An M2M Service Layer Session refers to an established exchange of messages between two or more communicating entities that is typically stateful in nature. As used herein, unless otherwise specified, an M2M Service Layer Session Endpoint refers to a logical entity that can be the source or destination of M2M Service Layer Session communication. Further, as used herein, unless otherwise specified, an M2M Service Layer Session Manager refers to a logical entity that provides services for M2M Service Layer Session management. A nonce refers to a random value that may be associated with a session and whose validity may be associated with a session/time component.

By way of introduction, various functions and process mechanisms are defined herein to enable security protection of content. It will be understood that the various functionalities are named for purposes of example, and the functions may alternatively be named as desired. A Content Creation and Security Determination Function (CCSDF) is described below. The CCSDF may be composed of multiple functions and hosted on the same entity (node) or distributed across multiple entities (nodes) that may also reside on different administrative domains. The Content Creation Function (CCF) may create content based on data that is collected. In some cases, the content may be raw data or information, and the content may include sensor data or information created from raw data. The CCF may create structure to content and some form of structure to content based on sub-components of the content. The Security Determination Function (SDF) may be responsible for determining the security requirements associated with content. The SDF may determine the level of security required in order to protect the content. For example, the SDF may determine a generic security requirement for content protection based on an established policy.

A Secure Content Hosting Function (SCHF) is described herein. In an example embodiment, the SCHF is the function that hosts content securely. The SCHF may also function as a security policy enforcement entity and perform access control checks. The SCHF may process, identify, and perform the necessary cryptographic procedures in order to be able to secure content. The SCHF may interact with a Security Enabling Function (SEF) in order to request and register appropriate credentials. In one embodiment, the SEF is an enabling function that provides credentials for protecting and/or accessing content. The SEF may work as a trusted intermediary such as a Trusted-Third-Party (TTP), for example, in order to provide a client with access to content. The SEF may provision and register appropriate content-specific credentials. The SEF may provision and register appropriate client-specific credentials.

A Security Parameters Determination Process (SPDP) is described below in accordance with an example embodiment. As part of an example SPDP, the correct set of security parameters is determined for particular content "at rest". In addition, the life-cycle management of the content may also be determined. For example, security policies relating to content security at rest may be queried. The policies may be processed such that appropriate security parameters are derived. Life-cycle management parameters may also be determined and derived.

In an example embodiment, a Secure Hosting Requisition Process (SHRP) may be initiated by the CCSDF. In some instances, the SHRP may also be initiated by the SCHF. As part of a requisition, the CCSDF may request for secure hosting of the content with the SCHF. The SCHF may be zero-hop (hosted on the same platform), one-hop away from the CCSDF (generally preferred approach), or multiple-hops (two or more hops away) from the CCSDF. The SHRP allows the SCHF to be discovered based on a certain level of trustworthiness. In an example embodiment, the hosting of content may be requested based on security requirements. The SCHF may host secure content in accordance with one embodiment.

A Credential Requisition & Registration Process (CRRP) is described below, which may include a Credential Requisition Process (CQP) and a Credential Registration Process (CGP). During the CQP, the SCHF may request for the provisioning of appropriate credentials for secure storage of content. This process may be optional, for example, because in some cases, it may be enough for the SCHF to generate the appropriate credentials for content. In an example, in which client-specific content is to be protected, then the SDP may request for a client's credentials. For example, credentials may be requested that are associated with particular content. By way of further example, credentials may be requested based on an algorithm and a credential type. Credentials may also be requested that are specific to a client. As part of an example CGP, the set of credentials used for protecting content may be published with the SEF. For scalability reasons, for example, the credentials may be published at multiple SEFs. The CGP may provide the ability to request registration of generated credentials associated with content; the ability to specify the algorithms to be used, the credential type, mechanisms on how the credentials may be used, and an access control policy (ACP) associated with the credentials; and the ability to register credentials intended for use by a client.

An example Secure Hosting Process (SHP) is described herein. As part of this process, an SCHF may host content based on the SHRP message from the CCSDF. The content may be hosted in the appropriate format requested by the CCSDF by including the correct set of containers/attributes for holding the content. Alternatively, or additionally, the SCHF may have to perform appropriate cryptographic operations in order to securely host the content. The type of cryptographic operations that are carried out may be based upon the security parameters associated with the content. The SHP may obtain and carry appropriate cryptographic processes in order to protect content. Further, based on the SHRP message, the SCHF may create appropriate life-cycle management processes that are triggered in order to update the security properties associated with the content. For example, the content may be deleted or made unaccessible.

An example Third-Party Credential Requisition Process (TPCRP) is described herein. In some cases, the SEF may have to authorize a client and provide it with the necessary credentials so that the client (third party) is able to access a resource and verify its authenticity. The TPCRP may allow for any entity (e.g., Client) to request for credentials to a SEF or to a SCHF based on an identity associated with content (content-Id). During an example Content Retrieval Process (CRP), a Client initiates a mechanism to request for access to content. The Client may obtain the information regarding the SCHF from pre-configured information, or the information may be discovered dynamically using DNS-SD or RD. Secure content (encrypted and/or integrity-protected) may be retrieved including necessary cryptographic parameters. Content Processing (CP) is also described herein. During CP, a Client that would like to access the content may desire to verify the authenticity and/or integrity of the content. In addition, the Client may also desire to verify the content structure and attributes associated with the content. In one example, a client can verify the authenticity/integrity of content, subcomponents of content, and the structure of content. The content may be decrypted based on cryptographic parameters that was provisioned.

In an example Content Life-cycle Management Process (CLMP), the CCSDF may optionally send an explicit CLMP message to update the life-cycle management for particular content. This process/messaging may be skipped if the CCSDF has communicated explicit life-cycle management requirements as part of the SHRP. Credentials may be refreshed and cryptographic operations may be periodically performed. Content may be cleared based on a decommission period. Credentials associated with content may be managed such that credentials are reprovisioned, reprotected, or removed on a temporary or permanent basis.

Figure 6:
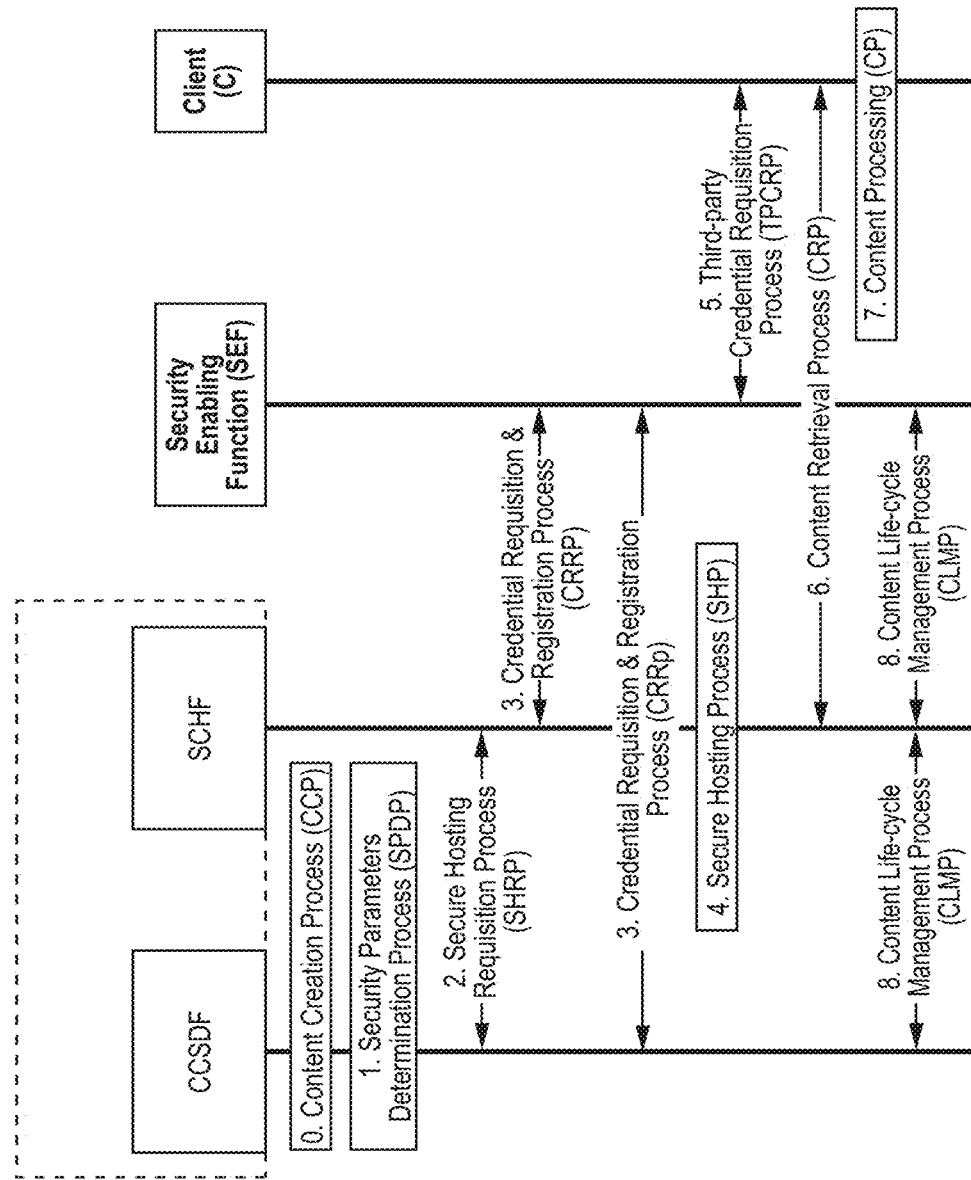
FIG. 6 is a call flow that depicts example functions and interactions therebetween in accordance with an example embodiment.

Referring generally to FIG. 6, in order to counter various shortcomings described above, protection of content/data is enabled as described herein. As described herein, protection of data may include ensuring that an entity requesting access to the data has been authorized to access the data (may include authentication as well). Protection of data may include that data is hidden (e.g., encrypted) from unauthorized entities and appears opaque to nonauthorized entities. Protection of data may include detecting unauthorized modification of the data. Protection of content may include managing the life-cycle of the content on a regular basis or permanently.

In one embodiment, content is created from subcomponents (if required) and structure to the content may be created based on subcomponents. This may be performed by the CCP. The SDF may perform a risk-based assessment of security requirements for content protection by assessing security requirements of its subcomponents. In an embodiment, appropriate security parameters that are required to protect content at rest are identified. This may be achieved by using the SPDP. The CRRP may obtain or generate credentials, and register the credentials for content protection. In an example embodiment, content is hosted in a secure manner using the SHP. The TPCRP, as described herein, may provide a capability in order to provision credentials to authorized third-parties to access the content.

Though the description below is focused primarily on the protection of content, it will be understood that credentials described herein may be tailored appropriately to protect system resources that are created, updated, deleted, and retrieved by various service enabling functions.

FIGS. 6-35, 37, and 38 (described hereinafter) illustrate various embodiments of methods and apparatus for protecting content. In these figures, various steps or operations are shown being performed by one or more nodes or apparatuses. It is understood that the nodes and apparatuses illustrated in these figures may represent logical entities in a communication network and may be implemented in the form of software (e.g., computer-executable instructions) stored in a memory of, and executing on a processor of, a node or apparatus of such network, which may comprise one of the general architectures illustrated in FIG. 36A or 36B described below. That is, the methods illustrated in FIGS. 6-35, 37, and 38 may be implemented in the form of software (e.g., computer-executable instructions) stored in a memory of a network node or apparatus, such as for example the node or computer system illustrated in FIG. 36C or 36D, which computer executable instructions, when executed by a processor of the node or apparatus, perform the steps illustrated in the figures. It is also understood that any transmitting and receiving steps illustrated in these figures may be performed by communication circuitry (e.g., circuitry 34 or 97 of FIGS. 36C and 36D, respectively) of the node or apparatus under control of the processor of the node or apparatus and the computer-executable instructions (e.g., software) that it executes.

Example functions that may be implemented in software and reside on an entity along with other applications hosted on, for example, a User Equipment (UE) or on a Server are described below. These functions may reside on dedicated hardware entities and therefore throughout this document, the terms, function, entity, apparatus, and node may be used interchangeably, without limitation. For example, a client may be an application or service residing on a user's device. A client may also refer to an application or service residing on a machine, a dedicated hardware, or a cloud-based application or service. The client may also be part of a group of applications or services that work together within a platform or in a distributed manner on different platforms. A client generally initiates a request in order to access content. A trigger for the client to send a request in order to access a content may be initiated by a user, a machines, an application, or a service.

Referring to FIG. 6, the Content Creation and Security Determination Function (CCSDF) may be composed of multiple functions and hosted on the same entity (node) or distributed across entities (multiple nodes) that may also reside on different administrative domains. If the functions reside within different administrative domains, then a trust relationship may exist between the various entities where the functions reside for conducting transactions. The CCSDF may be an entity that generates content or uses data sources (e.g., sensors) to create content. In some cases, the CCSDF and the SCHF may be co-hosted on the same physical entity (e.g., server, gateway). In one embodiment, the Content Creation Function (CCF) is involved in collecting data from various sources (e.g., sensors, applications, databases, etc.) and creating content. The data may be proactively collected or published by sensor(s) and applications. The CCF manages the processes involved in content creation. The Security Determination Function (SDF) may be responsible for determining the security requirements associated with the content. The SDF may determine the level of security required in order to protect the content. In this disclosure, security requirements associated with the content when the content is "at rest" are determined. That is, the security requirements and management of content security with regard to storage are described herein. As mentioned above, the CCF and the SDF may be performed on the same node/entity, or the functions may reside on different nodes/entities.

The Secure Content Hosting Function (SCHF) may host the content. The SCHF may also function as a security policy enforcement entity and perform access control checks. In some cases, the SCHF must have the necessary capabilities (e.g., functionality, computing resources) to perform the security operations (e.g., security policy enforcement) associated with the content, and also resources to host the content in a secure manner. The Security Enabling Function (SEF) may provide credentials for protecting and/or accessing content. The SEF may work as a trusted intermediary such as Trusted-Third-Party (TTP) in order to provide Client(s) with access to content. The SEF may be able to provision symmetric credentials as well as public key credentials. It may also function or interface to an external Certificate Authority (CA).

As shown in FIG. 6, processes involved in providing content security may be classified into various processes identified below. For example, as part of an example Content Creation Process (CCP), the sub-components of content are used to create combined Content that has a certain relationship and structure. Example content may be made up of one or more attribute/value pairs, where each of the attribute/value pair is a subcomponent. As part of an example Security Parameters Determination Process (SPDP), the correct set of security parameters is determined for a particular content "at rest". In addition, the life-cycle management of the content is also determined. A Secure Hosting Requisition Process (SHRP) may be initiated by the CCSDF or by the SCHF. In one example, as part of the requisition, the CCSDF requests for secure hosting of the content on the SCHF. The SCHF may be zero-hop (hosted on the same platform), one-hop away from the CCSDF (generally preferred approach), or multiple-hops (two or more hops away). In an example in which the CCF, SDF, and the SCHF are implemented on the same node/entity, steps 0, 1, and 2 may be carried out internally within the node/entity, and thus communications between the functions may be carried out using intra-process communications.

In an example embodiment, the Credential Requisition & Registration Process (CRRP) may include a Credential Requisition Process (CRP) and a Credential Registration Process (CGP). During the CRP, the SCHF may request the provisioning of appropriate credentials for secure storage of a content. This process may be optional, since in many cases, it may be enough for the SCHF to generate the appropriate credentials for that content. In cases where a client-specific content is to be protected, then the CCSDF/SDP may request a client's credentials. As part of the CGP, the set of credentials used for protecting the content may be published with the SEF. For scalability reasons, the credentials may be published at multiple SEFs. In some cases, if the CCSDF is able to generate credentials on its own, then the CCSDF may only perform the CGP. However, in other cases, if the CCSDF is not able to generate the appropriate credentials, then it would have to perform the Complete CRRP processes. As part of an example Secure Hosting Process (SHP), a SCHF may perform hosting of the content based on the SHRP message from the CCSDF. An assumption here is that the CCSDF may have performed the necessary cryptographic operations so that the content is protected and, based on the instructions from the CCSDF, the SCHF hosts the content appropriately. Alternatively, the SCHF may have to perform the appropriate cryptographic operations in order to securely host the Content. The type of cryptographic operations that are carried out may be based upon the security parameters associated with the content. Based on the SHRP message, the SCHF may create appropriate life-cycle management processes that will have to be triggered in order to update the security properties associated with the content and optionally delete the content or make it unaccessible.

Turning now to a Third-Party Credential Requisition Process (TPCRP), in order for a third-party (e.g., a Client) to access the resource, the SEF may have to authorize the Client and provide it with the necessary credentials so that the Client is able to decrypt the content and/or verify the content's integrity/authenticity. The TPCRP may involve authentication and authorization, as well as credential distribution to the third-party (e.g., the Client). During an example, Content Retrieval Process (CRP), a Client initiates a request for accessing a content. The Client may obtain the information regarding the SCHF from preconfigured information, or the information may be discovered dynamically using DNS-SD or RD. During an example of Content Processing (CP), a Client that would like to access the Content may desire to verify the authenticity and/or integrity of the content. In addition, the Client may also desire to verify the content structure and attributes associated with the content. In cases where the content is protected for confidentiality, the content may be sent as an encrypted content, and the content may be decrypted before sending the content to the Client by the SCHF. Determination of whether content has to be decrypted by the SCHF may be based on policy and security requirements associated with the content.

As part of an example Content Life-cycle Management Process (CLMP), the CCSDF may optionally send an explicit CLMP message to update the life-cycle management for a particular content. This process/messaging may be skipped if the CCSDF has communicated explicit life-cycle management requirements as part of the SHRP. It may also be skipped if the local policies at the SCHF have been pre-configured to deal with life-cycle management of the Content. Policies at the SCHF may determine the necessary operations that will have to be carried out in order to either update the security properties associated with the content, such as delete or make the content unavailable to any entity.

Figure 7:
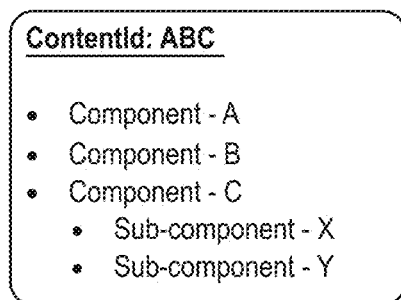
FIG. 7 depicts example content that includes content that is made up of components and subcomponents.

The Content Creation Process (CCP) will now be discussed in detail. As part of this process raw data that is collected by a data collector (e.g., sensor data) may be used by the CCF in order to create content to be stored in a certain structure. As part of the CCP, in accordance with an example embodiment, the subcomponents of content are used to create combined Content that has a certain relationship and structure. An example Content may be made up of one or more attribute/value pairs, where each of the attribute/value pair is a sub-component. As mentioned above, for convenience, data or information or content may be referred to generally as content, without limitation. Content may be identified by a globally Unique Resource Identifier or may be locally identifiable. The Content may be made up of one or more sub-Content(s) (components) having a certain relationship structure (e.g., hierarchical or flat web) between the subcomponents. An example Content with its subcomponents or attributes is depicted in FIG. 7. FIG. 7 depicts Content having a content identifier, "ABC" and made up of three components: Component-A, Component-B and Component-C. The Component-C is again made up of two sub-components; Sub-component-X, Sub-component-Y.

Turning now to the Security Parameters Determination Process (SPDP), in accordance with an example embodiment, during the SDPD, the SDF, which may be part of the CSSDF, determines the appropriate security requirements and parameters that are required in order to protect the Content "at rest". As mentioned previously, in some cases in which the CCSDF is able to generate credentials on its own, then the CCSDF may only perform the CGP. Alternatively, if the CCSDF is not able to generate the appropriate credentials, then it may have to perform both the Complete CRRP processes. As part of the determination process, the CCSDF may determine, for example and without limitation:

Whether the content has to be protected from eavesdroppers (Confidentiality/Privacy Protection)

Level of Protection: Algorithm Strength, Credential Type/Size

Protection from un-authorized modification of content—Integrity Protection

Level of Protection: Algorithm Strength, Digest/Signature length

Capability to update protection mechanisms

Requirements of Secure Storage of credentials/Secure Operations Environment

Lifetime security management associated with the content

TABLE 1

An example of high-level security requirements
and parameters associated with content

|  |  |  | Integrity Protection | | | |
|---|---|---|---|---|---|---|
| Content | Confidentiality Protection | | Authentication Code/ | | Secure | Life-cycle/ Update |
| Id/ Sub | Algorithm Strength | Credential strength | Algorithm Strength | Signature Length | Environ- ment | Sec. Protection |
| XYZ/ No | High | >200 bits | Medium | MAC >=256 | No | 10 years/ 3 years |
| ABC/ Yes | High | >200 bits | High | DS >=4096 | Yes | 5 years/ 1 year |
| MNO/ No | Low | >120 bits | Medium | MAC >=256 | No | 15 years/ No |

Illustrated in Table 1 above is an example of high-level security parameters associated with content XYZ (identified by XYZ-Id), ABC, and MNO. Each of the content is associated with their corresponding security parameters. As an example, as shown, the content XYZ has a confidentiality requirement of "High" and requires that the key size used is at least 200 bits. The credential strength may be based on a type of encryption (e.g., symmetric key) and therefore equivalent key sizes for other encryption types (e.g., public key) may be appropriately used. In some cases, there may be a maximum size limit to the credential strength considering that the content may be hosted on constrained entities. As shown, the example integrity protection algorithm is "Medium" and has a MAC length of >=256 bits. The content does not have to make use of a secure environment. With regard to Life-cycle management, in accordance with the illustrated example, the content may be purged or made unaccessible after a period of 10 years and the security protection may be updated every 3 years. The table only demonstrates an example of possible high-level security requirements for content protection. It will be understood that additional requirements may be added or removed in order to suit a particular implementation. For example, the requirements associated with life-cycle management may be absent for certain types of content.

The SPDP may be triggered by a process at the SDF, for example, based on local policies on the CCF or policies provisioned by a content owner/service provider. The mechanisms used for triggering the SPDP may be proactive or reactive based on a request for certain content. The SPDP may be performed using security-specific policies that have been provisioned or implemented based on best practices for protecting sensitive data/content that has national security implications or commercial value. A simplified example of policies used by SPDP is given below in Table 2, though it will be understood that policies may vary as desired.

TABLE 2

Example policies for SPDP

| Security Value | Confidentiality | Integrity | Secure Environment | Life-cycle Management |
|---|---|---|---|---|
| Low | Low | Medium | No | No |
| Medium | Medium | High | No | Yes |
| High | High | High | Yes | Yes |

In some cases, content may be composed of sub-Components, each with its own Identity, or there may be attributes/values associated with Content. Each sub-component or attribute/value may have its own corresponding security requirement. The entire Content may then be protected (e.g., Integrity protected) because all the sub-components (e.g., attributes/values) are individually protected.

Figure 8:
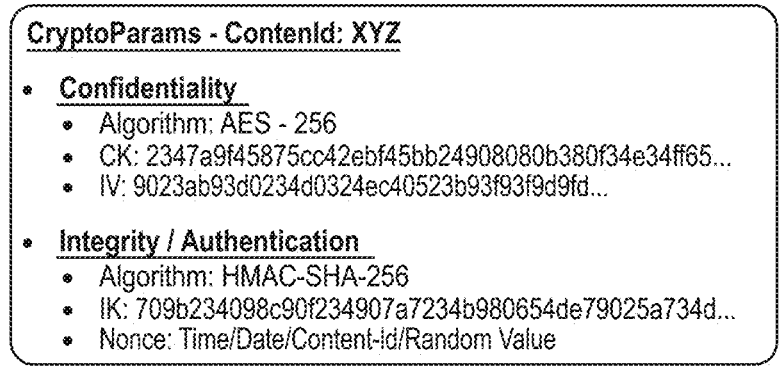
FIG. 8 depicts example cryptographic parameters associated with example content.

In an example embodiment, the SDF determines the appropriate cryptographic parameters (CryptoParams) based on the requirements. If the CSSDF hosts the content, then the CCSDF may derive the required security value(s) for the content. An example of CryptoParams associated with content XYZ is depicted in FIG. 8. FIG. 8 describes an encryption/decryption algorithm: AES using a 256 bit key. This key may be generated using a Key Derivation Function (KDF). An example KDF may be of the form: Confidentiality Key (CK)=KDF (KeyGenKey, "ContentId"||"RandomValue"||"ConfidentialityKeyGen").

A KDF, such as a Keyed-Hash-Message-Authentication-Code (HMAC-SHA) for example, may be used for deriving the CK. The input parameters may involve a key used by the CSSDF for generating other keys, which may be referred to herein as the KeyGenKey. In addition, input parameters may include the ContentId, which can be assumed to be unique within the context of the CCSDF, a random value generated by the SDF, and a string "ConfidentialityKeyGen". As mentioned above, it will be understood that the generation of the CK is only used as an example for illustration purposes, and input parameters may be varied as desired for possible reduction in collision.

Still referring to FIG. 8, an integrity/authentication algorithm selected is the HMAC-SHA-256 algorithm with an associated Integrity Key (IK). The IK may be derived using similar means as the CK but with variations on the input parameters. As an example, a new RandomValue is generated and the "ConfidentialtiyKeyGen" may be replaced by "IntegrityKeyGen" string.

Figure 9:
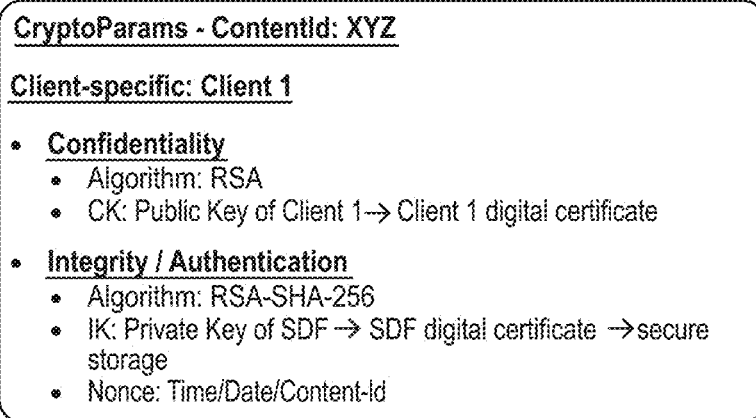
FIG. 9 depicts example client-specific cryptographic parameters associated with the example content.

In an example embodiment, content is protected so that only a specific client is able to access the content. In addition, the client may be able to verify that a particular SDF had created the content and that it was not modified by any other entity with a very high degree of assurance. When client-specific content protection mechanisms are used, for example, it may be preferable to use the client's digital certificate to obtain the client's public key, and use the public key encrypt the content. An example of a client-specific CryptoParams is depicted in FIG. 9. As shown, the confidentiality algorithm is determined to be Rivest-Shamir-Addleman (RSA) public key algorithm and the Key is determined to be Client1's public key, which may be obtained from the digital certificate associated with Client 1.

In order to obtain Client 1's digital certificate, a credential requisition process described below may be carried out, for example, if the SDF does not already possess the digital certificate. In accordance with the example, the Integrity (digital signing) algorithm is determined to be RSA using SHA-256 digest, the signing key (IK) that is to be used is the SDF's private key associated with the SDF's digital certificate, which is preferably stored in a secure storage. A nonce, such as the time/date of when the CryptoParams was created, the ContentId and/or metadata associated with the content, may be used as the nonce.

In an example scenario, the client may be a group of clients that share a set of credentials. Using public keying mechanisms for confidentiality might not work well in such scenarios because each entity may have to share the private key, which lessens security. Instead, symmetric key mechanisms may be preferably used for confidentiality in this scenario. Alternatively, for integrity/authentication, public keying mechanisms may be the preferred approach. Therefore for scalability and for maintaining optimum performance, a confidentiality algorithm may be based upon symmetric keying mechanisms, and public keying mechanisms may be used for providing integrity/authenticity of the content/content generator in accordance with one embodiment. In some cases, the confidentiality of content may be ignored, while the integrity/authenticity of content/content generator is verified.

If content is made up of subcomponents, for example, then each of the subcomponents may have its own security parameters and corresponding CryptoParams associated therewith. For example, the content and subcomponents, which may be made up of attribute/value pairs, may have their own unique CryptoParams. The amount of computing resources required to protect each specific attribute/value pair may be expensive, and in many cases, the component as a whole may be protected rather than having its individual components separately protected. The mechanisms described herein may be used to perform protection of content from a global content-perspective or from a more granular attribute/value pair perspective, wherein each of the subcomponents associated with content may have varying security requirements. It will be understood that the cryptoParams may be represented using JSON notation by means of JWA and JWK for algorithms and keys.

Turning now to an example Secure Hosting Requisition Process (SHRP), the SCHF may be located on the same entity (node) as the CCSDF, and therefore the SHRP messaging may be conducted internally in such cases. In some cases, where the CCSDF and the SCHF are located on different entities, the CCSDF may initiate SHRP with one or more SCHFs. The hosting of a Content with a single SCHF is described herein, however, similar mechanisms may be used for hosting with multiple SCHFs. The SHRP may be composed of the following subprocesses, for example and without limitation, Security Value(s) computation, discovery of an appropriate SCHF, and the messaging process.

With respect to computing security values, necessary security values may be computed based on local policy at the SDF and/or CryptoParams that were determined as part of the SPDP described above. In certain cases, the computation of the security values may be offloaded to a Trusted Third Party (TTP) or to the SCHF. The local policies at the entity that hosts the SDF may be based upon a combination of service provider policies, capabilities (e.g., constrained device, availability of the right firmware/software, etc.) of the entity that hosts the SDF, and the content type. The term Protected Values (PV) is used herein to denote the computed security values. Example computed PVs include Encrypted Content (EC) and Authentication Tag (AT). With respect to EC, the entire content may be encrypted or the sub-components or attribute/value pairs may be encrypted based on CryptoParams associated with each of the subcomponents. In some cases, only the "value" component of the attribute/value pairs is encrypted. The AT is the integrity value that is computed on the Content using the integrity parameters specified in the CryptoParams for that particular content. As mentioned earlier, each subcomponent of the content may have its own unique computed AT.

In an example embodiment, both an EC and an AT is achieved by using Authenticated Encryption with Associated Data (AEAD) mechanisms, such as AES-Galois Mode (AES-GCM) for example. The use of AEAD may be specified explicitly within the CryptoParams or inferred by the SCHF. The EC and AT may be generated using separate CK, IK or having a single key for both confidentiality as well as integrity. Also, in the case of AES-GCM, the AT may be the "additional authenticated data". The EC and the AT may be represented using JSON notation by means of RYE and JWS, respectively.

In an example embodiment, the CCSDF may perform a discovery process in order to determine the correct SCHF to host its content. The discovery process may involve querying a trusted entity or other entities that perform an active listing of available services (e.g., DNS-SD, RD). In some cases, the CCSDF may off-load the discovery process to a local hosting entity that then determines an appropriate SCHF. As a response to the query, the CCSDF may be provided with the location information (e.g., URI) regarding a SCHF or a list of SCHFs ordered based on certain criteria that best fits the security parameters. In cases where a highly-trustworthy SCHF is not available, then the cryptographic operations involving the computation of the PVs may be performed by the CCSDF. If a highly-trustworthy SCHF is discovered, then the computation of PVs may be offloaded to the SCHF.

Figure 10:
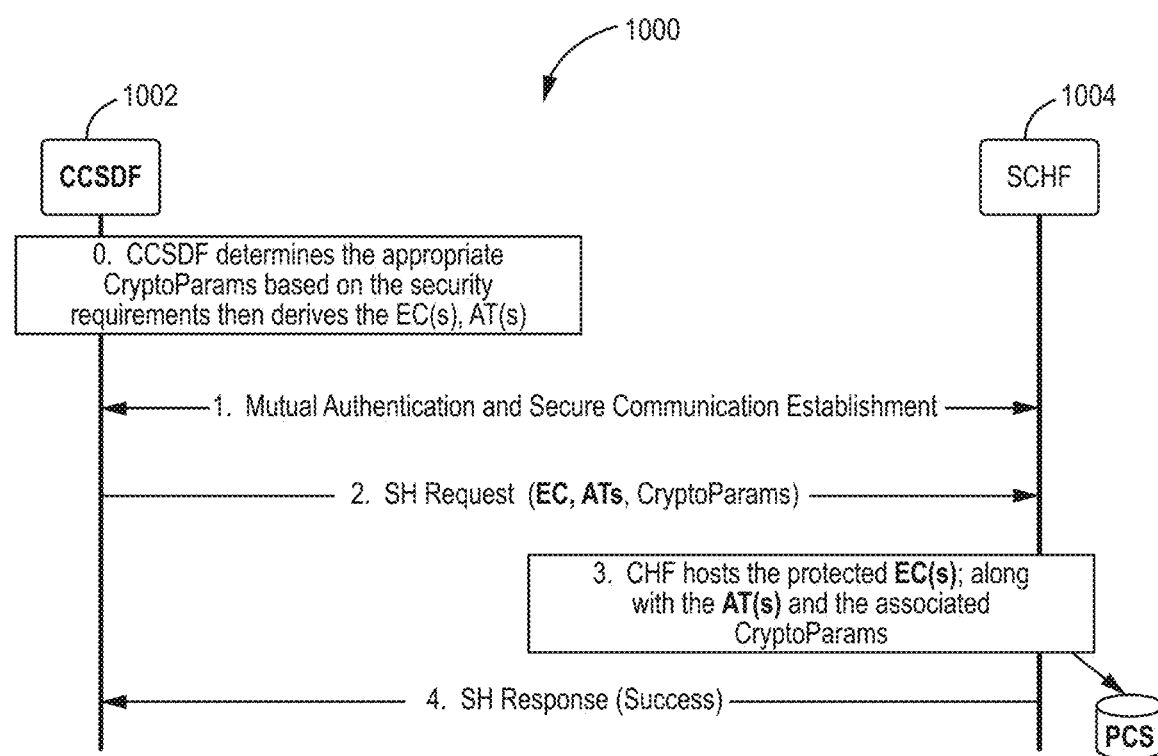
FIG. 10 is a call flow that shows example messaging between a Content Creation and Security Determination Function (CCSDF) and a less-trustworthy Content Hosting Function (CHF) in accordance with an example embodiment.

Referring now to FIG. 10, a network 1000 includes a CCSDF 1002 and a SCHF 1004 that performs Secure Hosting Requisition (SHR) Messaging with the CCSDF 1002 in accordance with an example. It will be appreciated that the example network 1000 is simplified to facilitate description of the disclosed subject matter and is not intended to limit the scope of this disclosure. Other devices, systems, and configurations may be used to implement the embodiments disclosed herein in addition to, or instead of, a network such as the network 1000, and all such embodiments are contemplated as within the scope of the present disclosure. Based on the type of response received by the CCSDF 1002, it may create an appropriate message and the generation of the correct set of parameters that may be required in order for the content to be hosted on the SCHF 1004. If the SCHF is a less-trustworthy entity, then the message depicted in FIG. 10 may be performed.

At 0, in accordance with the illustrated embodiment, the CCSDF 1002 generates the appropriate PVs of the content: EC(s) and associated AT(s). At 1, the CCSDF 1002 and the selected SCHF 1004 may mutually authenticate one another and establish a secure communication channel. At 2, the CCSDF 1002 sends a Secure Hosting (SH) Request message containing the EC(s), the associated AT(s) and the CryptoParams to the SCHF 1004. At 3, in accordance with the illustrated example, the SCHF 1004 hosts the EC(s), the AT(s), and the CryptoParams, and stores them within a Protected Content Store (PCS). The SCHF 1004 may optionally post the CryptoParams along with the ContentId with a SEF, which is described further below. At 4, once the EC and the PVs are hosted, a success message containing optionally a unique hosted-id (H-Id), which may be a URI to the location of the EC as well as the ATs and the CryptoParams, is sent to the CCSDF 1002. The ECs may be hosted on one physical entity, and the CryptoParams and ATs may be located on different trusted entities.

Figure 11:
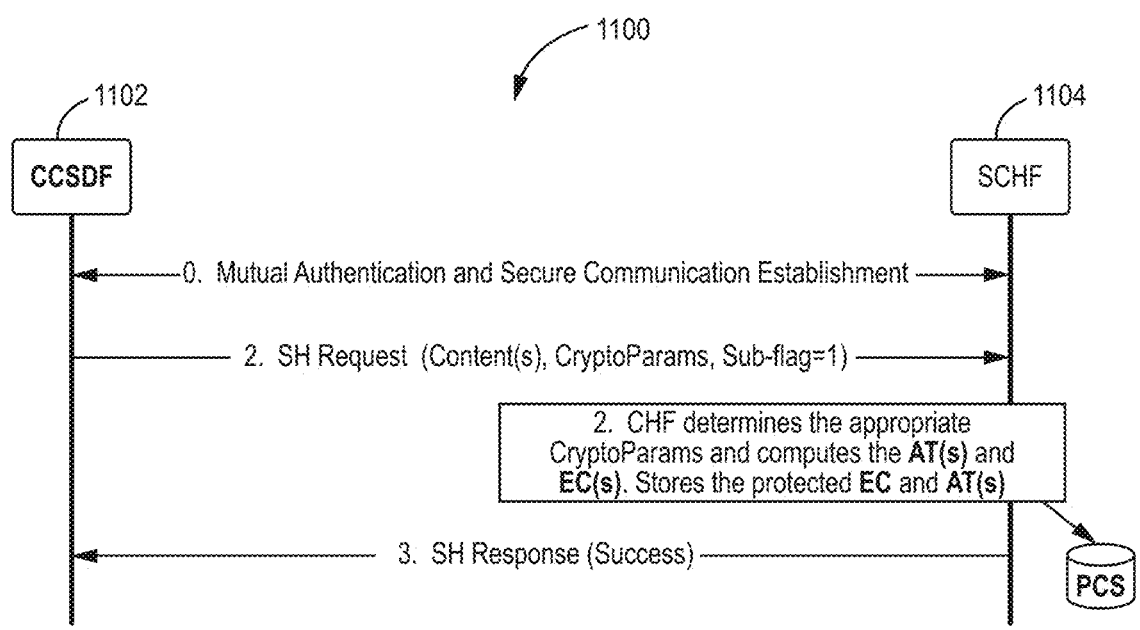
FIG. 11 is a call flow that shows example messaging between the CCSDF and a Secure Content Hosting Function (SCHF) in accordance with an example embodiment.

Referring now to FIG. 11, a network 1100 includes a CCSDF 1102 and an SCHF 1004 that is a trusted entity, such that the CCSDF 1102 may depend upon the trusted SCHF 1104 to perform the cryptographic operations on behalf of it, as shown. In accordance with the example, the CCSDF 1102 only provides the SCHF 1104 with the Content and the associated CryptoParams. At 0, in accordance with the illustrated example, the CCSDF 1102 and the SCHF 1104 may mutually authenticate one another and establish a secure communications channel with one another. At 1, the CCSDF 1102 sends the SH Request message containing the Content (which is not protected) along with the associated CryptoParams. In addition, a Sub_I-flag that indicates that the subcomponents must be integrity protected individually is also sent. Because the SCHF 1104 is trusted and also because the messages are sent through a secure communications channel, the content and the parameters are protected 'in transit". If the SCHF 1104 is located a few hops away from the CCSDF 1102, and if the messaging payload were to traverse through untrusted entities, then the Content and CryptoParams must be protected using end-to-end security mechanisms. At 2, the SCHF 1104 uses the CryptoParams on the Content in order to derive the EC(s) and the associated AT(s). Since the Sub_I-flag=1, the individual subcomponents of each content are also integrity protected and the appropriate AT values are computed. The SCHF 1104 may use the services of a SEF in order to obtain the right set of credentials that have to be used. This may be particularly necessary if the Content to be protected is Client-specific Content. The SCHF 1104 may store the EC(s) and AT(s) on to it. Details of an example secure hosting process is described below. At 3, the SCHF 1104 sends a SH Response containing "Success" to the CCSDF 1102. The SCHF 1104 may optionally send a hosting identifier as well.

Thus, with reference to FIGS. 10 and 11, a node (e.g., the CCSDF) can include a processor, a memory, and communication circuitry. The node may be connected to a network via its communication circuitry, and the node further comprising computer-executable instructions stored in the memory of the node which, when executed by the processor of the node, cause the node to, based on one or more security requirements, determine one or more cryptographic parameters. The node may also send a secure hosting request message to a content hosting function (CHF). The secure hosting request message may include the one or more cryptographic parameters and content associated therewith, such that the content hosting function can securely store the content using the one or more cryptographic parameters. Based on the one or more cryptographic parameters, the node may encrypt the content such that the content is confidential. Alternatively, the content may consist of subcomponents, and the node may, based on the one or more cryptographic parameters, encrypt each of the subcomponents such that each subcomponent is confidential. Alternatively still, the content may consist of pairs of attributes and values, and the node may, based on the one or more cryptographic parameters, encrypt each of the values such that each value is confidential. The node may also compute an authentication tag (AT) associated with the content such that the content is integrity protected. Alternatively, or additionally, the content may consist of subcomponents, and the node may compute respective authentication tags associated with each of the subcomponents, such that each of the subcomponents is integrity protected.

Figure 12:
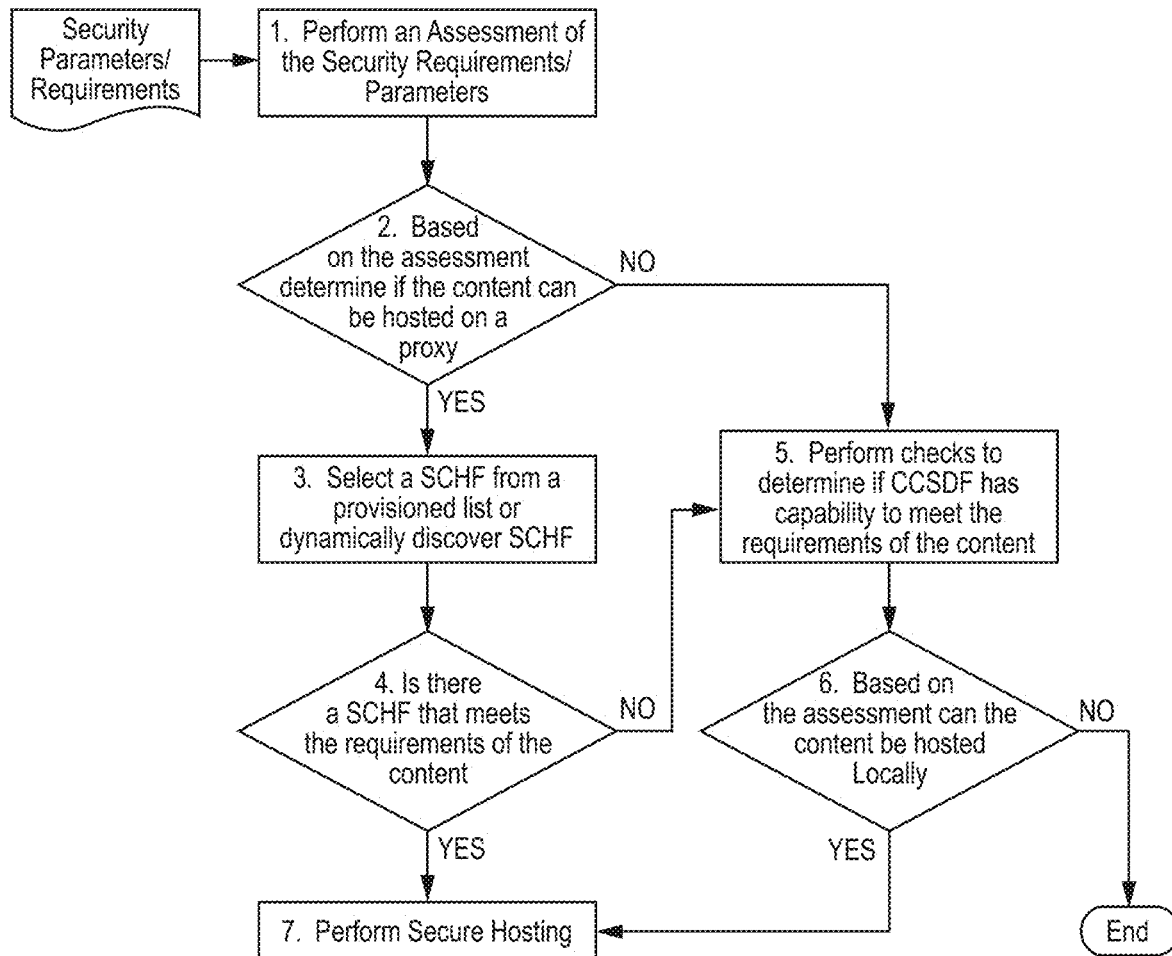
FIG. 12 is an example flow diagram for determining location for hosting content in accordance with any example embodiment.

An example mechanism that may be performed by a CCSDF, in order to determine if the content can be hosted locally or on a proxy is illustrated in FIG. 12. Referring to FIG. 12, in accordance with the illustrated example, at 1, the CCSDF performs an assessment of the security requirements associated with the content. A security requirement may require that the content is not allowed to be taken outside of the entity or domain that generated the content. It may also have restrictions on geographical locations where the content may be hosted (e.g., restrictions of storage of content within a different county, state, country etc.). Other security assessments may also be carried out, such as the efficiency and ability of performing certain security functions. At 2, the CCSDF makes an assessment if the content can be hosted on a proxy. At 3, if the content can be hosted on a proxy, then the CCSDF may obtain a list of potential one or more SCHFs that may be able to host the content. The CCSDF may have been configured with a list of potential SCHFs ordered in a certain priority, or it obtains the list from a TTP. In some cases, the CCSDF may discover a SCHF in a more dynamic manner by using the means of discovery services (e.g. DNS-SD or oneM2M discovery services). At 4, the CCSDF determines if the SCFH(s) meets or exceeds the requirements of the content. At 5, in accordance with the illustrated example, if the SCFH(s) do not meet the requirements of the content, then the SDF determines if the content can be hosted locally on the CCSDF. At 6, if the content can be hosted locally then it triggers a SHP process. Otherwise, if the CCSDF does not possess the necessary security capabilities (application, software, firmware, hardware, etc.), then the secure hosting process may be aborted. Alternatively, a new discovery process may be performed, or modified content having a lower security requirement may be hosted based on an updated discovery process.

Turning now to a secure hosting process (SHP), in accordance with an example embodiment, the content is handled in a manner that meets security requirements or a security profile associated with the content. Secure hosting may include providing a strong authentication mechanism to access the data, providing a robust authorization mechanism, providing integrity to data, and/or providing confidentiality of data. The capability to host data in a secure manner may involve the use of a Secure Element (SE) or Trusted Execution Environment (TEE). In some cases, the overhead involved (computing, memory, battery) may be too much for a constrained device. Cryptographic credentials (e.g., keys/certificate/identities) and/or sensitive cryptographic functions may be carried out within the SE or TEE. If an entity is not able to host the data in a secure manner, it may use a proxy to store that data. The use of a Roots-of-Trust (RoT) is generally helpful, but this disclosure does not make any assumption regarding the presence of hardware or software-based RoTs.

As described above, the SCHF may reside one-hop away from the CCSDF or may be multiple-hops away from the CCSDF. The number of hops refers to the number of service layer hops. The CCSDF may or may not have a direct trust-relationship with the SCHF, but may be able to build on an established trust hierarchy or create a new trust relationship using a common root of trust. An end-to-end approach for securing the connection between the CCSDF and the SCHF may be preferred, however, where end-to-end security mechanisms are not available and hop-by-hop security may be used.

In an example embodiment, an entity may make a determination to store the data locally within the device on which the entity is hosted based on the requirements associated with the data. For example, if the entity makes a determination that the host entity is able to host the data in a secure manner, then it performs the necessary cryptographic operations on the data so that the data is integrity protected and/or protected for confidentiality. Appropriate cryptographic algorithms and credentials may be used to protect the data. An example of cryptographic values for confidentiality protection is provided in Table 3 below.

TABLE 3

An example of possible values for confidentiality protection

| Security Level—Confidentiality | Algorithm | Key Length | Storage requirements |
| --- | --- | --- | --- |
| Low | 3-DES | 168 bits | None |
| Medium | AES | 192 bits | FDE |
| High | AES | 256 bits | File-based |
| Critical | RSA | 4096 | TEE/SE* |

Figure 13:
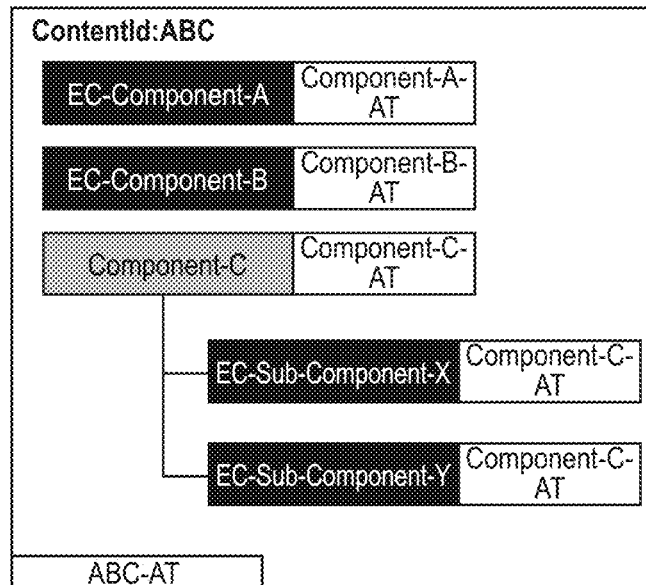
FIG. 13 shows an example protected content structure stored within a Protected Content Store (PCS) in accordance with an example embodiment.

An example of protected content stored within a PCS is depicted in FIG. 13. FIG. 13 depicts content with identifier: ABC, having A, B and C, and the component C is made up of sub-components X and Y. Based on the CryptoParams and indication of the components that has to be protected, the CCSDF computes the EC and the AT associated with the content. The component A and B are encrypted using a credential that may be unique. However, the component C itself may not contain any data and may be unprotected, while the subcomponents X, Y are encrypted. The integrity data (AT) for Component A and B and for the structure and the entire component C is protected (using Component-C-AT), and the individual subcomponents X and Y are protected. An ABC-AT is computed in order to integrity protect the content, "ABC" and the subcomponents and their relationship/structure within the content.

In some cases, protection mechanisms are cumbersome and computationally expensive, and thus may not be suitable for a constrained CCSDF. Therefore, some of the operations may be off-loaded on to a trusted SCHF. The mechanisms for protecting content at a granular-level, described here, provide a lot of flexibility for content consumption while providing a robust security mechanism. A Client that is only authorized to access a subcomponent (e.g. Sub-component-X) of a content may be able to verify the integrity of that particular subcomponent (e.g. using Component-X-AT) without having any information about the content in its entirety. Selection of the CryptoParams and the granularity of content protection may be based on the type of solution (e.g., determined by a service provider) that is being implemented as well as the local policies on the CCSDF determined by the platform.

In another example embodiment, a CCDSF may decide to host the content onto a proxy where the SCHF resides. The discovery mechanism described above may be used to discover a secure Proxy. In certain scenarios, a constrained CCSDF may not be able to host the content onto completely trustworthy proxy since the CCSDF may not be able to reach a trustworthy proxy. In such a scenario, the CCSDF may not provide the CryptoParams to the SCHF (proxy), but instead may provide a link to the CryptoParams stored on a TTP (e.g., SEF). In an example, the SEF only provides the CryptoParams to an entity that has the appropriate authorization. However, if a proxy is a secure SCHF, then the CryptoParams may be located in a secure storage at the SCHF. Mechanisms for storing the content in a secure manner may follow the procedures described above.

Figure 14:
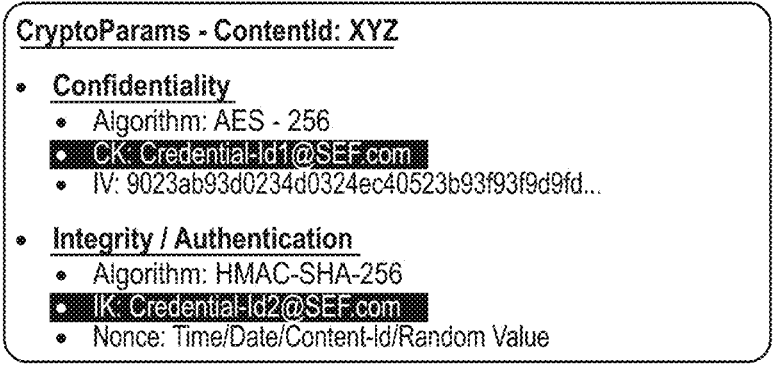
FIG. 14 depicts example cryptographic parameters associated with content.

Example CryptoParams that may be provided by the CCSDF to a less-trustworthy SCHF is illustrated in FIG. 14. The credentials might not be provided, but a Credential-Id that was registered with the SEF may be provided. An entity may be able to obtain the credentials from the SEF only after the entity has been authorized. Therefore even the SCHF that hosts the EC will not be able to decrypt the content since it is does not possess the credential, and it might not be an entity that has been authorized with the SEF.

Turning now to a Credential Requisition and Registration Process (CRRP), the CRRP process may be interleaved between the SHRP and the SHP, and may depend upon the mechanisms used for hosting the content based on the trust relationship between the CCSDF and the SEF, or the availability of Client credentials at the CCSDF or at the SCHF. The CRRP process may be carried out between the CCSDF and the SEF or between the SCHF and the SEF based on the entity that is performing security protection process. The CRRP is composed of a Credential Requisition Process (CRP) and Credential Regeneration Process (CGP).

Figure 15:
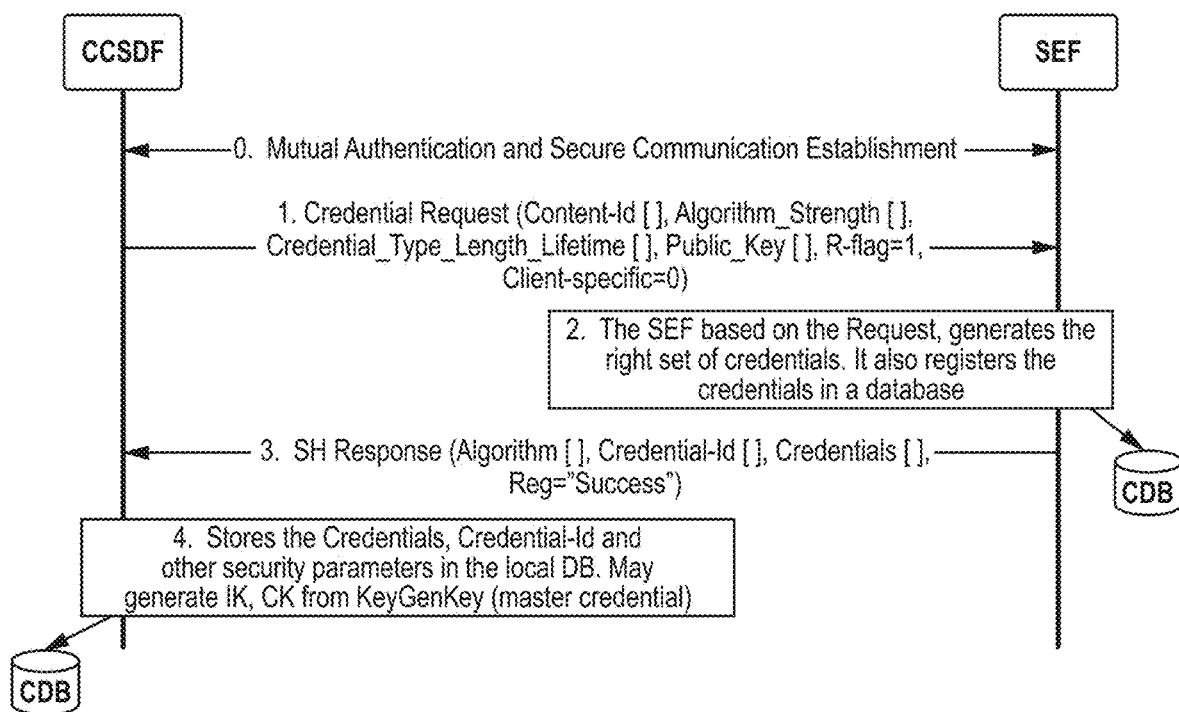
FIG. 15 is a call flow that depicts a content-specific credential requisition in accordance with an example embodiment.

With respect to an example CRP, if a SDF is not able to generate or obtain credentials (e.g., certificate, keys) locally within the entity on which it is hosted, then the SDF may initiate a CRP with a SEF. In certain scenarios, the SDF may be able to obtain the credentials from a TTP entity that may be physically closer to it. As a general scenario, it is assumed that the SDF has a trust relationship with the SEF, which may also function as a central credential repository. FIG. 15 illustrates a CRP initiated by a CCSDF with a trusted SEF, but the same call flow may be also applicable to the CRP between a CHF and SEF.

At 1, in accordance with the illustrated example, after a successful authentication and the establishment of a secure communication channel between the CCSDF and the SEF (at 0), the SEF sends a Credential Request (CR) message. The message may contain the following parameters, presented by way of example and without limitation:

Content-Id[ ]: A list of Content identifiers. The number of entries may be one or more.

Algorithm_Strength[ ]: For each Content, a corresponding Algorithm_Strength. This may be optional, and the CCSDF may select an appropriate algorithm based on the strength on its own Credential_Type_Length_Lifetime[ ]: For each content a corresponding credential type, length and duration of the validity of the credential is provided. The Credential_Type for a content may be "certificate", while for another it may request for "symmetric key". The length of the credential for "symmetric key" may be (e.g., 64/128/256 bits), while for Credential_Type="certificate", the length of the credential supplied depends upon the algorithm used (e.g., RSA public key may be 2048/4096 bits; while for ECC, it may be: 224/256 bits). The Lifetime value is the duration for which the credential is valid and similar CR process or renewal process may have to be carried out. The Lifetime of the credentials may be based upon the "Update Sec. Protection" value described in Table 1.

Public_Key[ ]: List of public keys associated with the content. It is noted that the Public_Key entries for content whose Credential_Type="symmetric key", may be empty. Only those content for which the Credential_Type is a "certificate', there would be a corresponding public key entry in accordance with an example.

R-flag: This flag may be used by the CCSDF to indicate that it would like to register these credentials with the SEF. For example, if the R-flag=1, then the CCSDF is requesting to perform both a CRP and also a CGP. If the flag is set to "0", then only the credential requisition is performed.

Client-specific: This flag indicates if the message is a Client-specific credential request. Here it is set to '0" to indicate that it is only a Content-specific CR.

Still referring to FIG. 15, in accordance with the illustrated example, the SEF, based on the request, generates the correct set of credentials. In the case of Credential_Type="symmetric key", similar mechanisms as described above by means of a KDF may be used. The SEF may generate a KeyGenKey, which is valid for the "Lifetime" value that was requested and provides it to the CCSDF. The KeyGenKey is then registered for that particular Content with the SEF, in a CDB. Alternatively, the SEF may generate both the IK and CK and registers it to the Content and stores in the Credential Database (CDB). In some cases in which the Credential_Type="certificate", the SEF uses the public key to generate a certificate that is signed by the SEF and associates the certificate to the Content-Id and limits the use of the certificate to the Lifetime value that was provided as part of the request. The certificate for the content is also stored in the CDB. At 3, the SEF sends the credential(s) list. In cases in which the corresponding algorithm was selected, then the list of Algorithms may also be provided along with a flag that provides an indication of whether the registration was successful or not. As part of the Credential list, a flag indicating whether the credential is a KeyGenKey as well as the validity of the credential may be provided. A list of unique Credential-Id(s) associated with each Credential is also provided to the CCSDF in accordance with an example. At 4, the CCSDF stores the Credential(s), Credential-Id(s), and the lifetime associated into a CDB. If the credential is KeyGenKey, the CCSDF may optionally generate the CK, IK or it may be left to the client to derive them.

Figure 16:
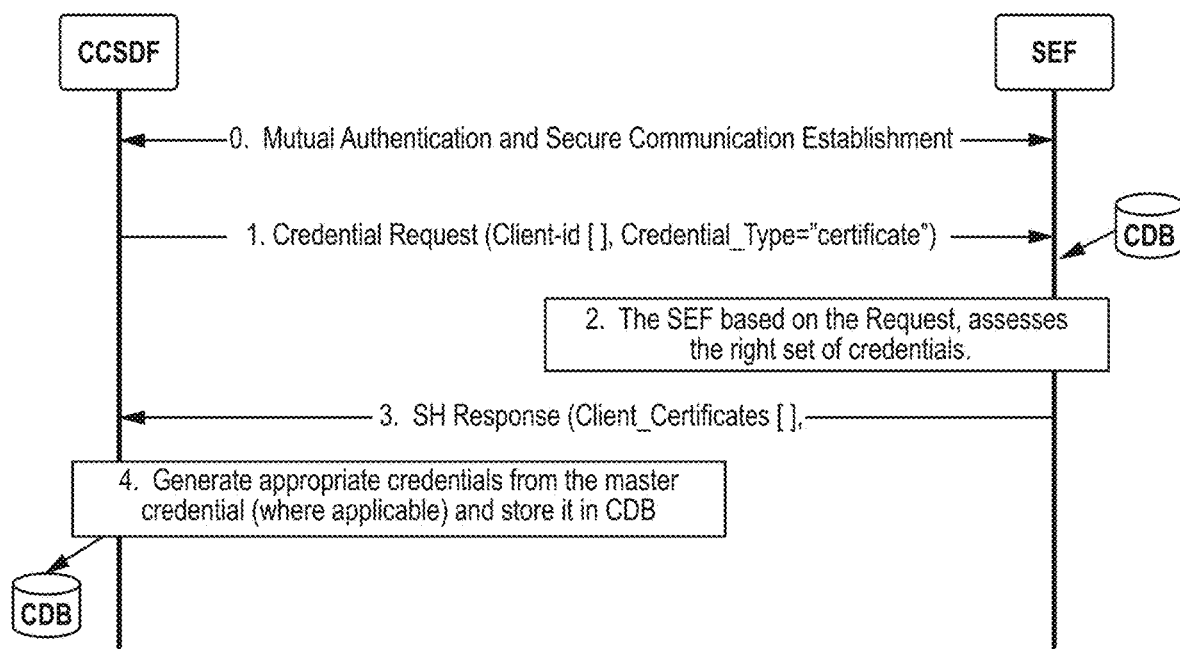
FIG. 16 is a call flow that depicts a client-specific credential requisition in accordance with an example embodiment.

Referring now to FIG. 16, an example Client-specific CR process is depicted. The CCSDF may request for Client-specific credentials, for example, if it would require that only those clients are able to access the content. At 0, a secure communications channel is established between a CCSDF and an SEF after the CCSDF and the SEF mutually authenticate each other. After the channel has been established, at 1, the CCSDF sends a CR message containing a list of Client(s) whose credentials are being requested. The Credential_Type is the type of credential that is being requested. Credential_Type may be a "certificate" or public key or "symmetric key". It may be preferable to request for "certificate' or "public key" associated with a client rather than "symmetric key'. It may be possible that a Client-id is associated with multiple Client(s) and a group of Clients share the same Client-id.

At 2, the SEF processes the request and queries the CDB and obtains the right set of credentials for the specific Client. If the Credential_Type="certificate" or "public key" then those credentials that are associated with that Client are fetched from the CDB, as depicted in the illustrated example. If the Credential_Type="symmetric key", then the SEF may only fetch the CK from the CDB. In certain instances, it may alternatively fetch the KeyGenKey associated with the Client, which is then used by the CCSDF in order to generate the CK. At 3, in accordance with the illustrated example, only the certificate that is associated with the Client(s) is sent. The SEF may send a list of Credentials that are each associated with a Client. Each of the credentials may be of a certain type (public key, certificate or symmetric key). It may also be possible that a group of Clients share the same credential. At 4, if the credential(s) sent was the KeyGenKey(s), then the CCSDF may generate the CK(s) for each Client(s) from it and stores the credentials within the local CDB. If the credentials are just "public key(s)" or "certificate(s)", associated with each Client then they may be stored as-is.

For simplicity, the client credentials as well as the content-specific credentials may be stored within a generic CDB in accordance with the example, but it will be understood that they may be stored in separate DBs and they may also be hosted within different administrative domains. The SEFs used for Content-specific CR and the Client-specific CR may be different, and thus the trust relationships between the CCSDF and the SEFs may be different.

Figure 17:
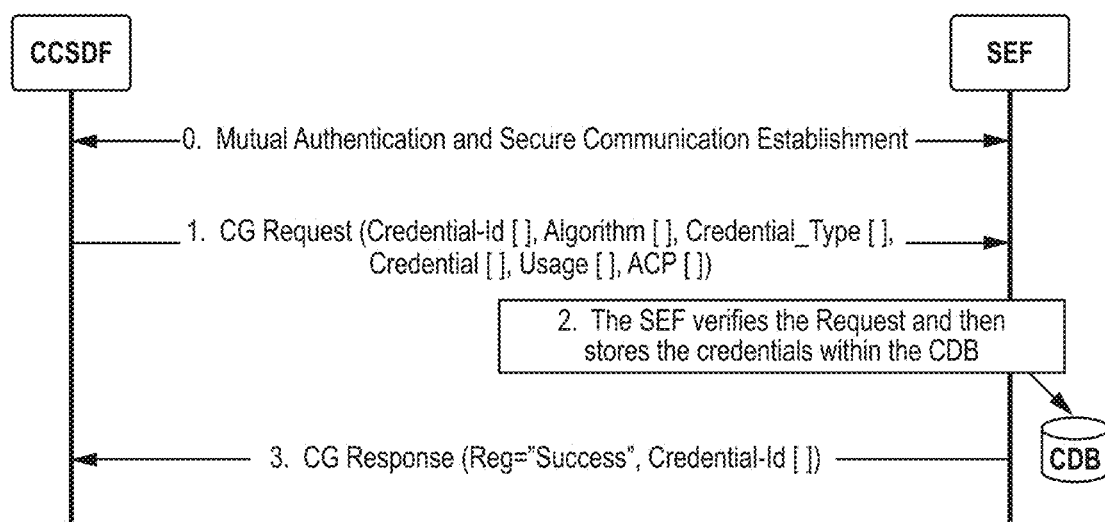
FIG. 17 is a call flow that depicts a content-specific credential registration in accordance with an example embodiment.

Referring now to FIG. 17, the CCDSF may register the credentials associated with content on to a SEF using a Credential Registration process (CGP) as depicted in FIG. 17. Similar mechanisms described here may be used by the CCDSF in order to register the credential(s) with a SCHF or by the SCHF with the SEF when a proxy-based on hosting of content is used. In an example embodiment, the CGP is required only when the content-specific credentials have not been generated by the SEF. In cases where the credentials are generated by the CCSDF or by the SCHF, then the credentials may be registered with the SEF.

Still referring to FIG. 17, in accordance with the illustrated example, at 1, the CCDSF sends a CG Request message to the SEF using a secure communications channel. As mentioned above, the end point of the CG Request message may be other SEFs or the SCHF. As part of the message the following parameters may be included, presented by way of example and without limitation:

Content-Id[ ]: List of Content Identifier(s), which are assumed to be unique globally, or within the domain of the SEF and the CCSDF. Additional messaging may be used in order to ensure the uniqueness of the Content-Id within the domains that the Content is being registered.

Algorithm[ ]: List of Algorithms to be used for each of the Content as well as the type of operations that may be carried out. E.g. each content may have one or more associated algorithms (e.g. Integrity protection: HMAC-SHA and Confidentiality protection: AES)

Credential_Type[ ]: As previously stated, this may be: symmetric key, public key or certificate Usage[ ]: May be general guidelines on how the Algorithm and Credentials are to be used. In most cases, this may be based on best-practices and dictated by policy and therefore may be omitted.

ACP[ ]: A list of entities (Clients) that may be allowed, blocked or restricted from being provided with the credentials. This list may also contain a class of Clients or based on Clients domain information (e.g. FQDN), etc.

At 2, in accordance with the illustrated example, the SEF verifies that the Content-Id(s) are unique and that Credentials (e.g., in the case of public key/Certificate) are associated with the correct Content-Id. A side-channel verification of the possession of the right private key(s) may be performed. Once the checks have been conducted and successfully verified, then the credentials are stored within a CDB. At 3, the SEF responds with a registration successful message and also includes a list of Credential-Id(s), which are a unique identifier associated with each credential that was registered with the SEF.

Figure 18:
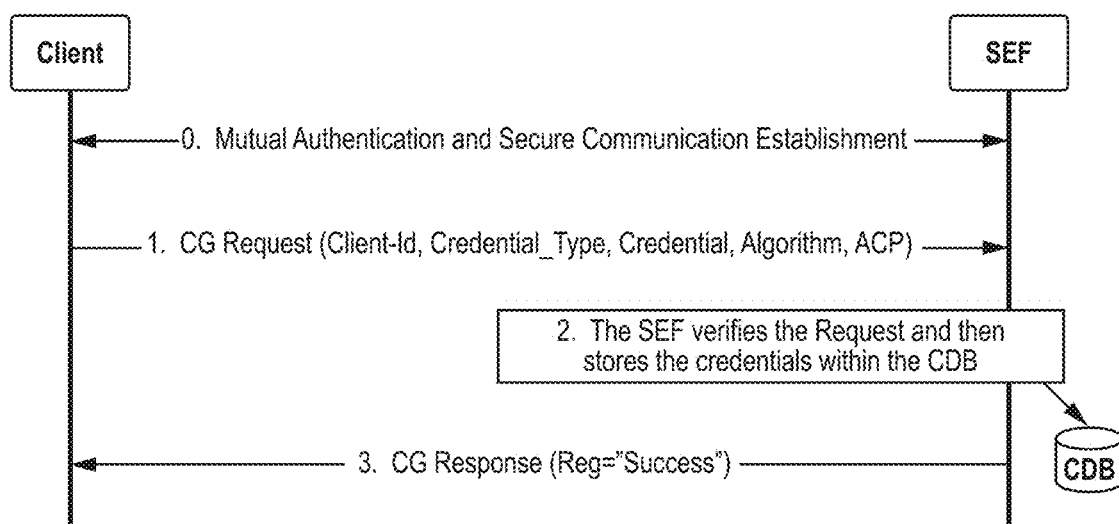
FIG. 18 is a call flow that depicts a client credential registration in accordance with another example embodiment.

The Client(s) may have a trust relationship with the same SEF or a different SEF. An example illustration of the CG process associated with Client credentials is depicted in FIG. 18. At 1, in accordance with the illustrated example, the Client that wishes to register its credentials with a SEF, may send the following parameters, presented by way of example and without limitation:

Client-Id

Credential_Type: This is an indication of the type of credential that is being registered. The preferred Credential_Type for a Client may be a "public key" or its "certificate". It may also be possible for the Client to register a "symmetric key", which is only used for providing confidentiality protection.

Credential(s): The Client may have multiple credentials and may register the various credentials with the SEF.

Algorithm: The Algorithm that is to be used for the type of credential.

Usage: Policies on how the credentials may be used. This parameter is deemed to be optional in accordance with one example.

ACP: List of restrictions on who/what can use the credentials. This may also optional.

At 2, in accordance with the illustrated example, the SEF verifies the CG Request and stores the credentials within a CDB. At 3, the SEF sends a "success" message to the Client upon successfully registering the credentials. It also sends a unique Credential-Id associated with each of the credential that was registered for the Client.

Figure 19:
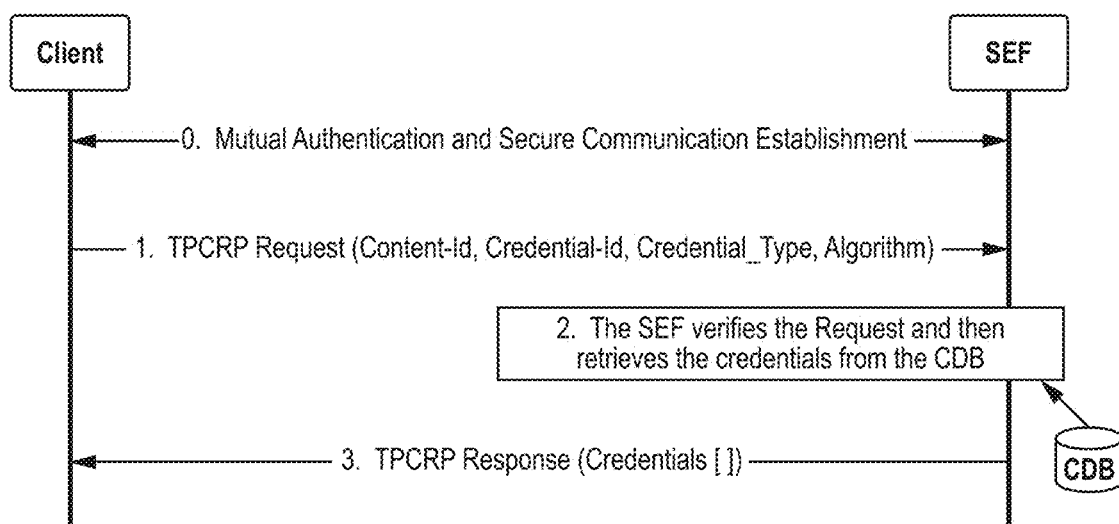
FIG. 19 is a call flow that depicts a third party credential requisition in accordance with an example embodiment.

Turning now to an example Third-party Credential Requisition Process (TPCRP), a Client that wishes to verify the authenticity of Content, and if it requires the ability to be able to decrypt encrypted Content, may request credentials from a SEF. Alternatively, if the credentials associated with Content are registered with a SCHF and if the Client is able to discover the SCHF, then the Client may issue a CR Request with the SCHF. It is also possible that the credentials are never registered externally and are stored locally at the content generator (e.g. CCSDF). In such cases, the Client may issue a CR with the CCSDF. The URI associated with SEF, SCHF, or CCSDF may be discovered by using common Service Discovery/Resource Discovery mechanisms (e.g., DNS-SD, RD messaging). Irrespective of where the credentials have been registered, the entities (e.g., SEF, SCHF, or the CCSDF) may have to perform an authentication and authorization on its own or may use TTP services that may perform on behalf of the entities in order that the credentials are released. The ACP may have been provided as part of the CR process. The strength of the authentication and authorization mechanisms may be based on the type of Content that is being requested. An example TPCRP is illustrated in FIG. 19, where the credentials have been registered with the SEF. As mentioned earlier, similar mechanisms may be used if the request is being targeted to a CCSDF or SCHF.

Referring to FIG. 19, in accordance with the illustrated example, at 1, the Client sends a TPCRP Request to the SEF. The Request may contain the following parameters, presented by way of example and without limitation:

Content-Id: The identity of the content that the Client wishes to request

Credential-Id (optional): If the Client wishes to receive a particular credential that is associated with Content, then it may use this parameter. In most cases, if the Credential-Id is present then the Content-Id may be omitted. However, in cases where a Credential-Id may be used to protect multiple Content(s), then using the combination of Content-Id as well as Credential-Id may be used.

Credential_Type (optional): In cases where the Client may not have access to a Credential-Id, the Client may request the credentials of a certain type (e.g. public key or symmetric key).

Algorithm (optional): If the Client is only able to perform a particular encryption algorithm (e.g. AES), then the Client may specify it, for example.

At 2, the SEF verifies that the client meets the ACP (e.g., authentication/authorization level required for access to credentials) associated with the Content and if the credentials are present in the CDB, then the SEF retrieves the credentials based upon the Content-Id. If the SEF has multiple credentials associated with the Content-Id, and if a Credential-Id has also been presented by the Client, then SEF retrieves that particular credential. If a Credential-Id is absent, the SEF checks to see if the Client had sent a preferred Credential_Type within its Request, and if so, picks a credential associated with the Content-Id that matches the Credential_Type. If the Credential_Type is absent but a preferred Algorithm has been requested, then the SEF may select a credential that can be used by that particular algorithm. In an alternative embodiment, the SEF may send all the credentials associated with the Content-Id, provided that ACPs allow for such a transaction. At 3, as shown, the SEF sends a Response containing the Credential(s).

Figure 20:
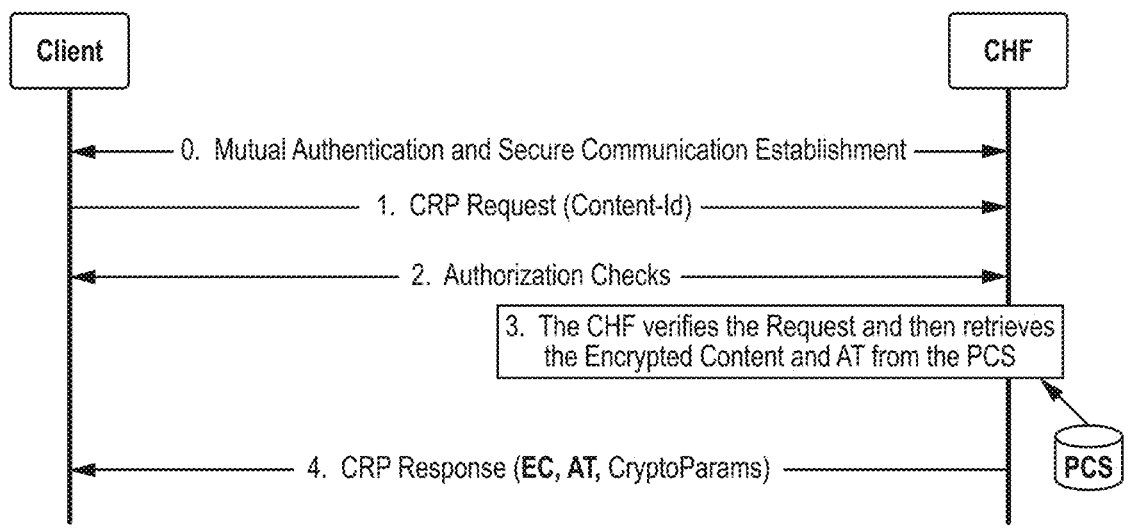
FIG. 20 is a call flow for content retrieval in accordance with an example embodiment.

FIG. 20 shows an example Content Retrieval Process (CRP). At 1, in accordance with the illustrated example, a Client initiates a CRP Request and presents the Content-Id as part of the message to the SCHF. At 2, the SCHF may initiate an authorization check in order to determine if the Client has been authorized to access the Content. The Client may present an authorization token if it had obtained one from the SEF. If not, a fresh authorization may have to be carried out between the Client and the SCHF. At 3, in accordance with the illustrated example, after verifying the request, the SCHF retrieves the EC and the associated AT from the PCS. At 4, the SCHF sends a CRP Response message containing the EC, AT, and the CryptoParams. The CryptoParams may be optionally sent by the SCHF. In some cases, the SCHF may not possess the CryptoParams. In such cases, the Client may have either pre-fetched the CryptoParams using the TPCRP described above. Based on the type of Content and the CryptoParams, some Content may not be encrypted and therefore the Content may be sent in unencrypted form. It is assumed that in most cases the Content may be integrity protected and therefore a corresponding AT may have been derived by the SDF.

Figure 21:
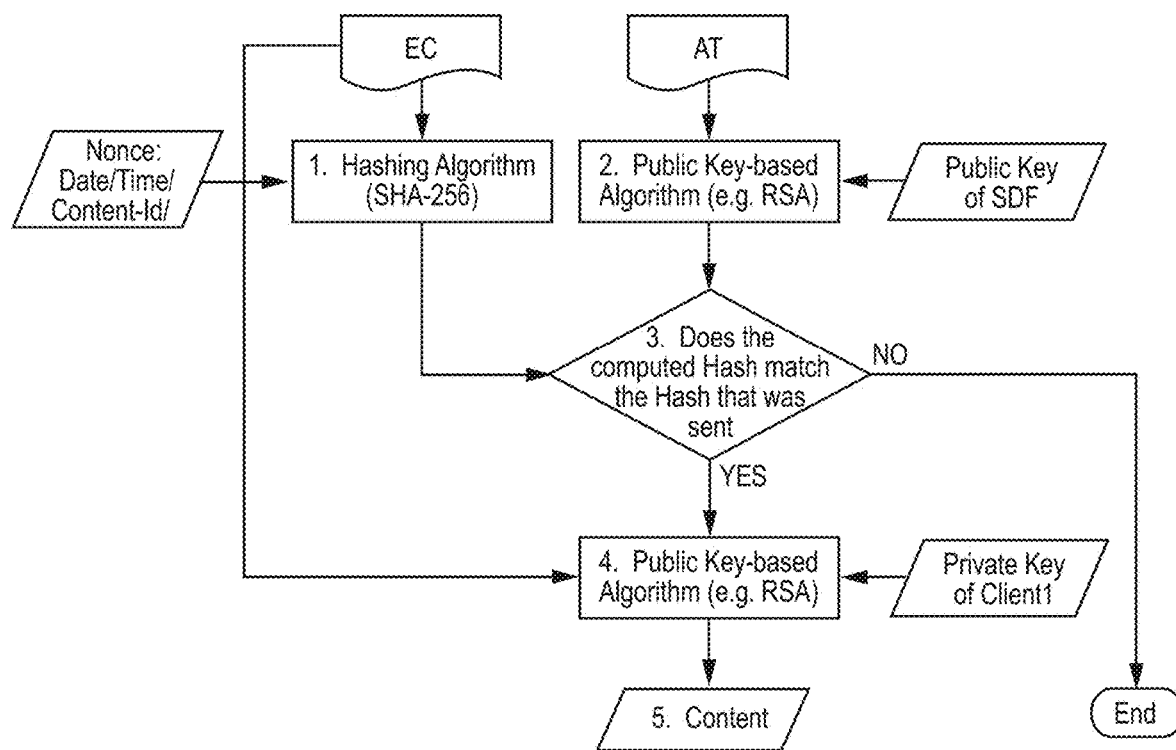
FIG. 21 is a flow diagram that illustrates example security checks that can be performed by a client in accordance with an example embodiment.

In an example embodiment, after the Client retrieves the EC and the associated AT, the Client processes the Content by verifying that the Content has not been modified by an unauthorized entity and was produced by a legitimate or trustworthy entity (e.g., CCSDF or a highly-trustworthy SCHF), and by decrypting the encrypted content so that the Client is able to consume the content. Referring to FIG. 21, a flow-chart that depicts the high-level view of the integrity/authenticity check as well as the decryption process carried out by the Client is illustrated. Description of FIG. 21 is based on the Client-specific CryptoParams illustrated in FIG. 9, where the Content is encrypted using the Client's public key and integrity protected using the SDP's private key. At 1, in accordance with the illustrated example, the Client uses the EC that was retrieved from a SCHF and uses the hashing algorithm (e.g., SHA-256) and the Nonce specified within the CryptoParams in order to compute a hash of the EC. At 2, the client uses the AT and decrypts it using a public key algorithm (e.g. RSA) and the SDF's public key in order to obtain the hash that was computed by the SDF. At 3, in accordance with the illustrated example, the hash that was computed by the Client is compared to the decrypted hash that was generated by the SDF. If the hashes do not match, then the process is stopped. At 4, if the hashes matched, then the Client decrypts the EC using the Client's private key by means of a public key algorithm (e.g., RSA). It is assumed that some form of padding is used for randomness in generating the encrypted content. Even though the example presented herein is an encryption based on RSA, it will be understood that the embodiments are not so limited. For example, a symmetric key based encryption algorithm may be preferred for encryption rather than a public-key based mechanism. At 5, the Client consumes the content.

Turning now to an example Content Life-cycle Management Process (CLMP), the CCSDF and/or the SDF may be involved with the Content Life-cycle Management of particular content. The CLM process may be initiated by the CCSDF based on the "Life-cycle" (e.g. in years) value provided within the security parameters as provided in Table 1. When the Life-cycle period has been achieved based on the policies, the Content may be deleted or made unavailable (e.g., by means of mixing and padding the content with a random value and encrypting it using one-time-key and a strong encryption algorithm). The "Update Security Protection" value (e.g. in years) may be used to update the security protection associated with the Content. Updating the security protection may be optional and in some cases, may expose the content to security attacks and therefore only trusted entities (e.g. platforms that has a TEE and based on RoT) may be allowed to perform the CLM process. A new CRP, CGP, re-hosting process and TPCRP may be performed in order to generate and register the credentials and protect the content. In summary a new credential is generated, registered, the content is then protected using the new credentials and then the protected content is provided to authorized Client along with the newly generated credential preferably using a separate channel for consumption.

Figure 22:
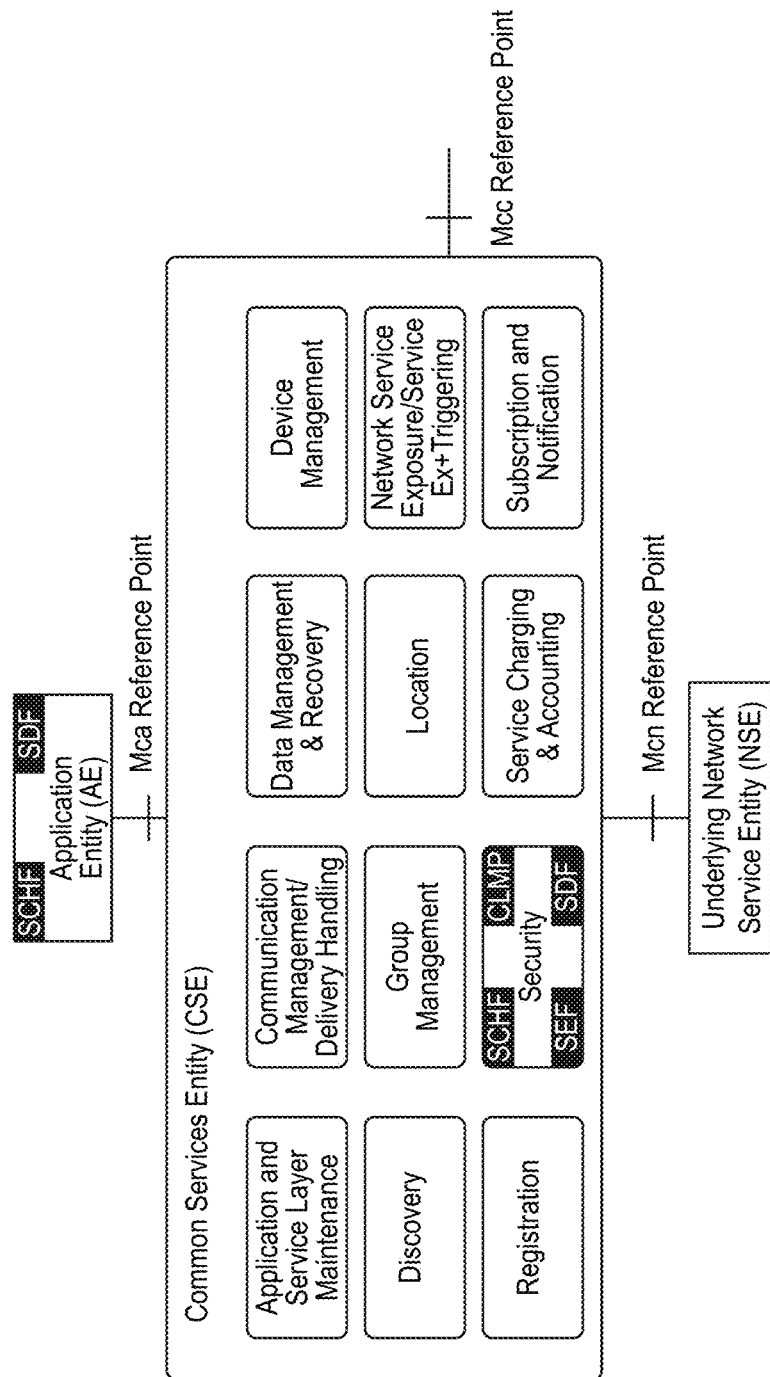
FIG. 22 is the diagram from FIG. 2, shown with example security functionalities described herein.

The embodiments described herein are mainly focused on the oneM2M architecture for convenience, although it will be understood that embodiments are not limited to oneM2M. The general functions described earlier (e.g., SEF) may be incorporated into the oneM2M architecture as part of the "Security" over the Mca interface, as shown in FIG. 22. In an example, an AE may incorporate the CCSDF, and the CSE may implement a SCHF. The SEF is incorporated into an M2M Enrollment Function (MEF) in an example embodiment. It will be understood that there is an underlying trust relationship between an AE and the MEF, and also between a CSE and the MEF. A summary mapping of the functionalities described earlier and oneM2M entities are provided in the Table 4 below, by way of example and without limitation.

TABLE 4

Mapping security functionalities to oneM2M entities over Mca interface

| oneM2M entity | Functionality |
| --- | --- |
| AE | SCHF |
| | SDF/CCSDF |
| CSE | SCHF |
| | SEF |
| | SDF |
| | CLMP |
| MEF | SEF |
| | CLMP |

Figure 23:
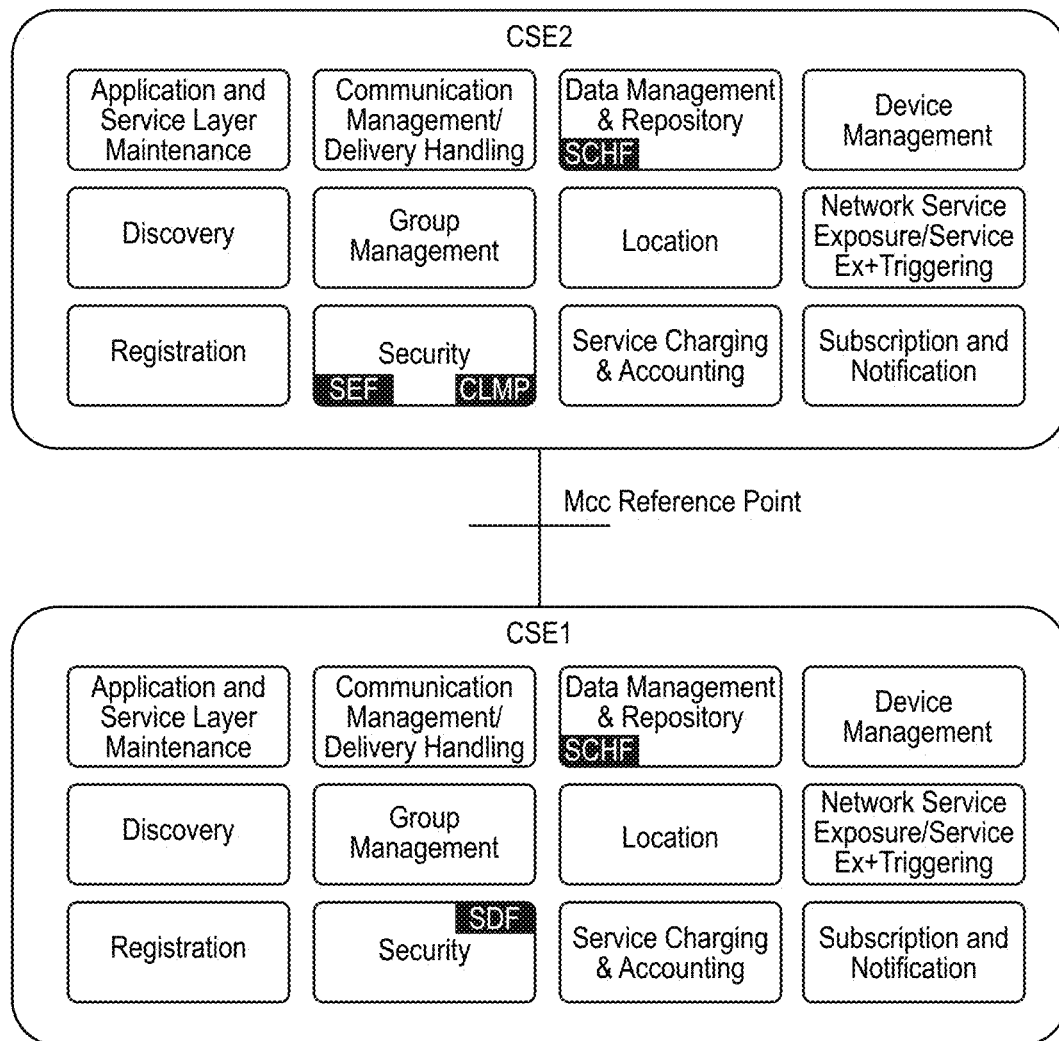
FIG. 23 is a diagram of Common Service Functions (CSFs) with example security functionalities described herein depicted.

FIG. 23 depicts one example for incorporating security functionalities for providing content security at the Mcc interface. A summary mapping of the functionalities described earlier and oneM2M entities are provided in the Table 5, presented by way of example and without limitation.

TABLE 5

Mapping security functionalities to oneM2M entities over Mcc interface

| oneM2M entity | Functionality |
| --- | --- |
| CSE1 | SCHF |
| | SDF |
| CSE2 | SEF |
| | SCHF |
| | CLMP |

As shown, the CSE1 may implement a SDF and SCHF. The SCHF functionality is used to store oneM2M resource (s) that may be related to an application content or oneM2M system resources in a secure manner. The SCHF may reside and may be managed as part of the Data Management & Repository CSF. The SDF may reside and be managed within the Security CSF. At the CSE2, in accordance with the example, the SEF and the CLMP functionalities may be incorporated as part of the Security CSF, while a SCHF that is primarily involved in securely storing credential(s) resources in a secure manner may be incorporated as part of the Data Management & Repository. The credential-Id resource and cryptoParams depicted above may be appropriate resources that may be stored and managed by the SCHF.

Figure 24:
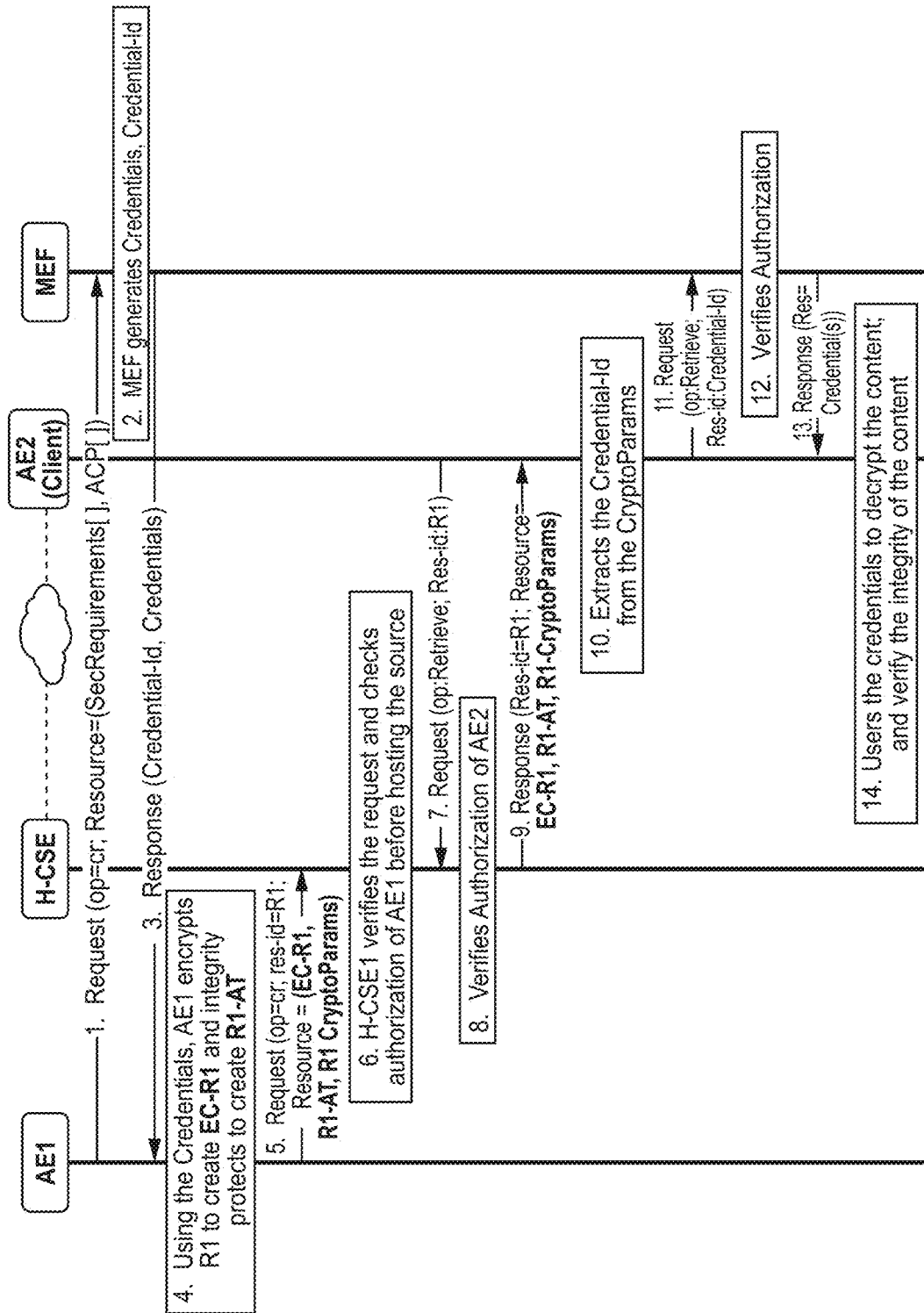
FIG. 24 is a call flow illustrating an example embodiment in which content is represented as a oneM2M resource.
Figure 25:
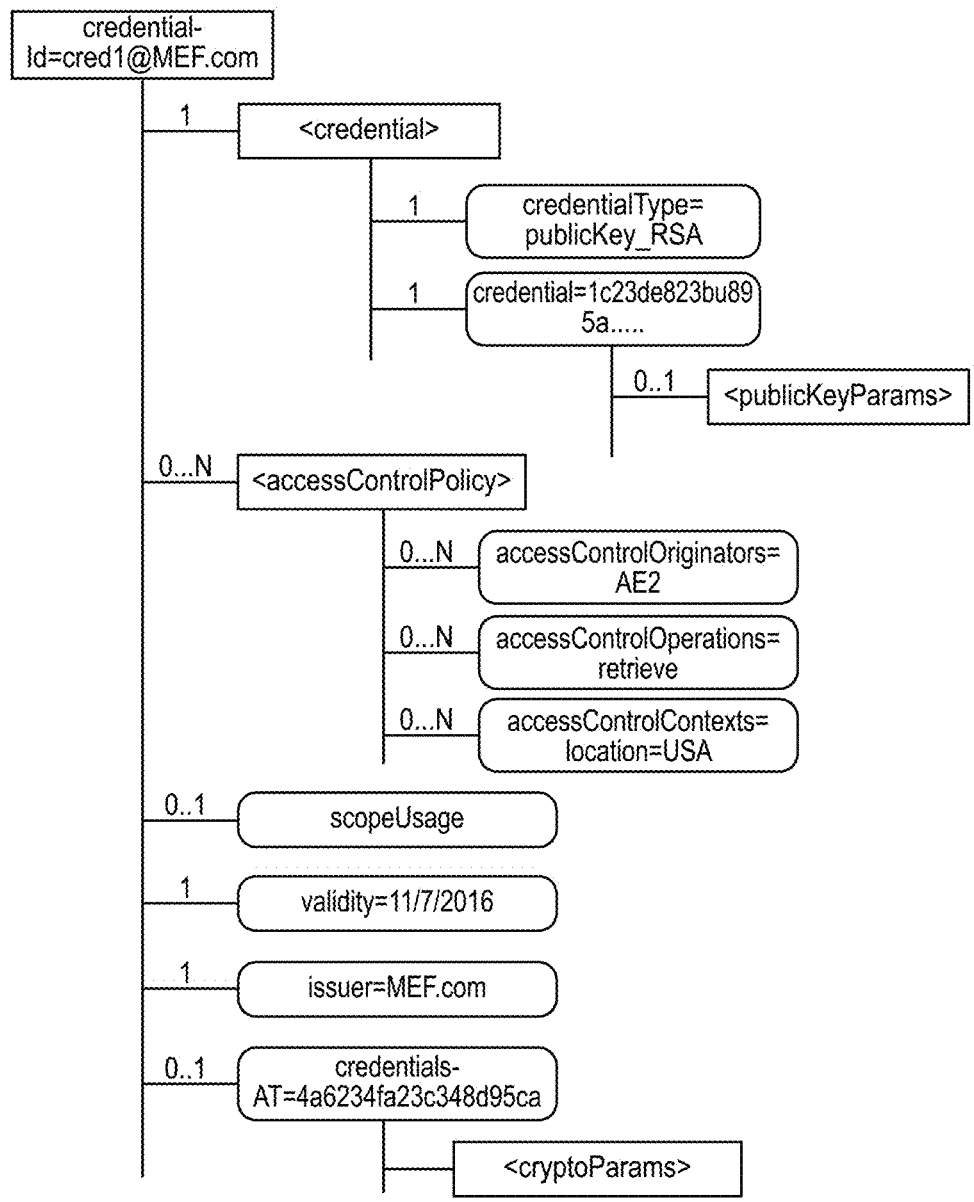
FIG. 25 illustrates an example structure of a Credential-Id resource created at a CSE in accordance with an example embodiment.

Referring now to FIG. 24, an example embodiment is depicted in accordance with oneM2M. As shown, content may be represented as an oneM2M resource, while the subcomponents may be represented within attributes and contentInstance(s). It is assumed here that the service layer connections (hops) may be protected using TLS/DTLS based secure connections. At 1, in accordance with the illustrated example, an AE1 that intends to provide protection to a resource created by it, may request for the appropriate credentials with an M2M Enrollment Function MEF. It is assumed that the AE1 and the MEF may have performed a mutual authentication between them and established a secure communications channel using (D)TLS. It is also assumed that the MEF has determined that the AE1 has been authorized to perform such as request. If AE1 would like to provide integrity as well as confidentiality protection, it may request those credentials explicitly. Alternatively, the AE1 may only require a master key (e.g., KeyGenKey) if using symmetric key mechanisms. The AE1 may send a resource creation request and provide its security requirements (SecRequirements) with the request. Also, an Access Control Policy (ACP) list may be provided, which may contain a list of authorized entities (e.g., AE2's identity). At 2, the MEF checks to ensure that AE1 is authorized to create a resource at the MEF. If the AE1 is authorized, then the MEF generates the appropriate credential(s) and associated credential-Id(s). It may create a resource structure as depicted in FIG. 25. At 3, in accordance with the illustrated example, the MEF sends the credentials and the credential-Id as a response back to the AE1. Alternatively, the AE1 may be able to perform a retrieve operation in order to obtain the credentials. The credentials may be represented and sent in the form of a JSON Web Key (JWK) format, for example.

Figure 29:
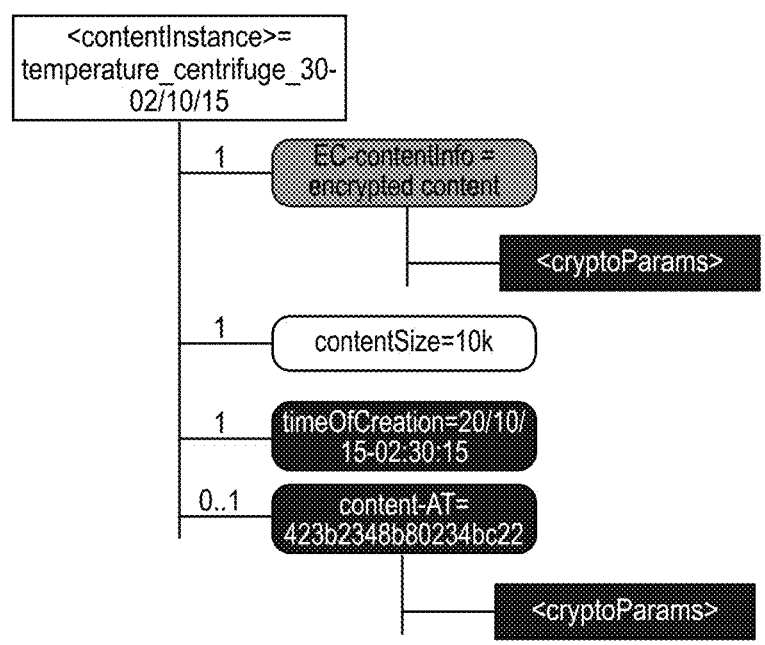
FIG. 29 illustrates an example resource structure for protected content in accordance with an example embodiment.

Still referring to FIG. 24, in accordance with the illustrated example, at 4, based on the CryptoParams as well as the credentials that were retrieved by the AE1, the AE1 encrypts the resource to create EC-R1, and generates an AT (MAC or digital signature) of the resource, which is referred to as R1-AT. The selection of the algorithm as well as the nonces and Id may be based upon the values within the CryptoParams. The EC-R1 that is created may be based upon the JSON Web Encryption (JWE), and the R1-AT that is created may be based upon the JSON Web Signature. The appropriate algorithms may be represented in the form as specified in the JSON Web Algorithms (JWA) standards, for example. At 5, the AE1 sends a request to create a resource that contains the encrypted content (EC-R1) as well as the R1-AT and the CryptoParams to a Hosting-CSE (H-CSE). The request at 5 may be part of a registration process or the AE1 may have previously registered with the H-CSE prior to sending the request. Care should be taken to ensure that the CK, IK and the KeyGenKey are not provided or exposed as part of the CryptoParams to the H-CSE since the H-CSE might not be completely trustworthy in some cases. However, if the public key mechanisms are used, for example, then the public key values or a link to a certificate or public key may be provided as part of the CryptoParams. At 6, if the AE1 is authorized to create a resource at the H-CSE, for example, then the H-CSE hosts the protected content. An example resource structure that is created for the protected content is illustrated in FIG. 29. At 7, in accordance with the illustrated example, a Client (AE2) would like to obtain the protected resource EC-R1 and therefore sends a Request message to the H-CSE in order to Retrieve the R1. At 8, the H-CSE verifies the authorization of AE2 by using the ACP that is associated with EC-R1. The ACP may have been created based on policies provided by the AE (CCSDF), SP-provisioned policies, or local policies at the H-CSE. At 9, if the AE2 passes the authorization check, then the H-CSE sends a response that contains the EC-R1, R1-AT, and the CryptoParams, to the AE2. As mentioned above, the CryptoParams might not contain the CK, IK or KeyGenKey because the H-CSE may not be trustworthy in some cases. The CryptoParams may contain a public key or certificate or a link to a public key or certificate. At 10, the AE2 extracts the Credential-Id from the CryptoParams. At 12, the AE2 sends a request message to the MEF. The request message may contain the Credential-Id associated with R1 in order to perform a retrieve operation for the Credential(s). At 12, in accordance with the illustrated example, the MEF determines that the AE2 has been authorized to be provisioned with credentials based on the ACP that was created by the AE1. At 13, if the AE2 has been authorized, then the MEF sends the credentials to the AE2. At 14, the AE2 uses the credentials to verify the authenticity/integrity of R1 and to decrypt it.

It will be understood that the embodiment described above with reference to FIG. 24 may be applicable to the Mcc interface (e.g., between two CSEs: CSE1, CSE2) as well. In such a scenario, the AE1 may be replaced with a CSE1, and the AE2 may be replaced by a CSE2, for example.

Thus, referring to FIG. 24, an apparatus (e.g., AE1) may include a processor, a memory, and communication circuitry. The apparatus may be connected to a network via its communication circuitry, and the apparatus may further comprise computer-executable instructions stored in the memory of the node which, when executed by the processor of the apparatus, cause the apparatus to send a request for one or more credentials that provide protection of content. The request may be based on one or more security parameters associated with the content. The apparatus may obtain the one or more credentials, and use the one or more credentials to secure the content. The credentials may comprise a master key for symmetric key confidentiality protection. The credentials may comprise credentials for both integrity protection and confidentiality protection. The apparatus may encrypt the content to create encrypted content. The apparatus may generate an authentication tag associated with the content. Further, as shown, the apparatus may send a request to a hosting common services entity to create a resource that contains the encrypted content and the security parameters. As shown, the credentials may be obtained from an M2M enrollment function in accordance with one example.

Figure 26:
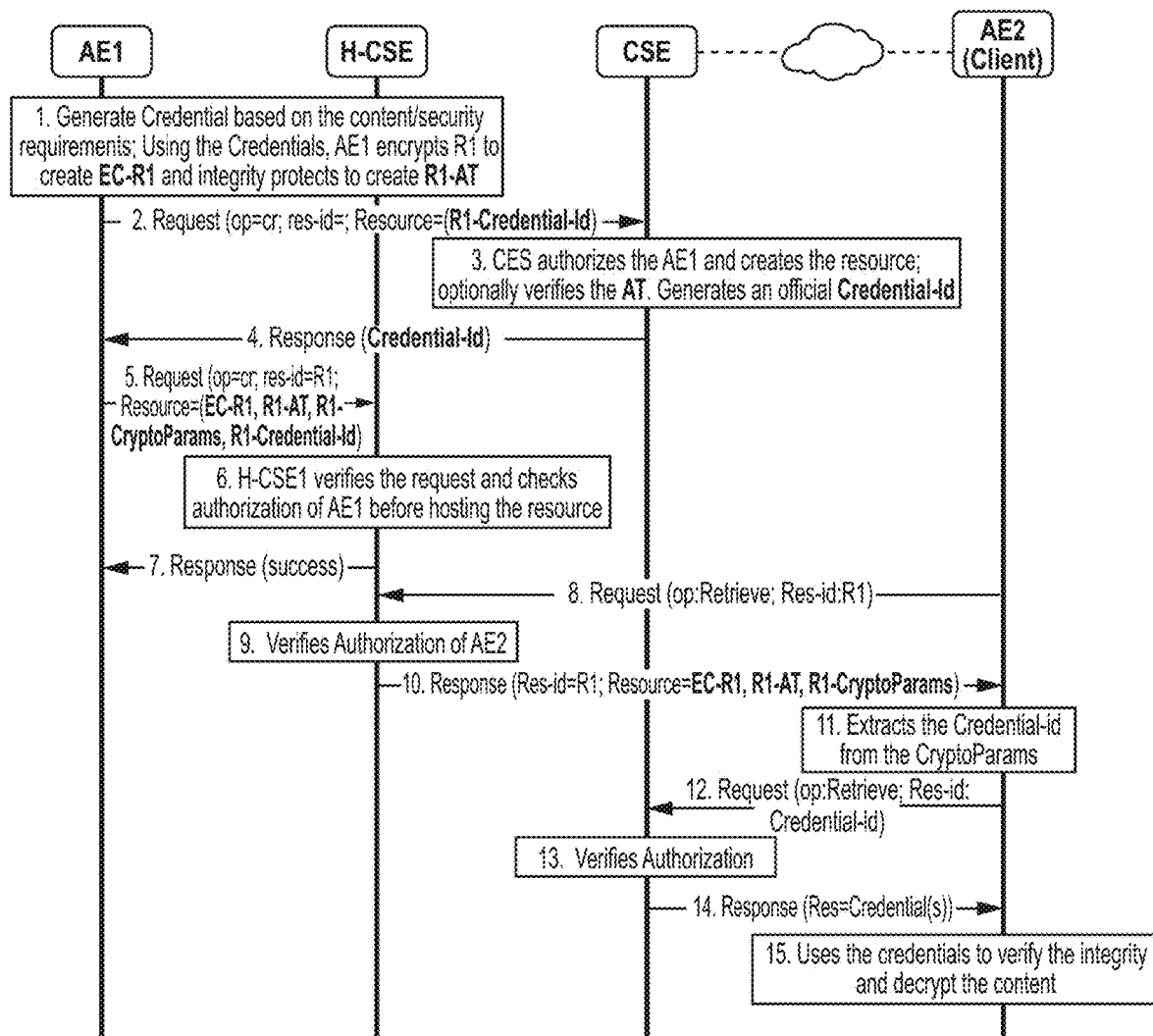
FIG. 26 is a call flow illustrating another example embodiment in which a Service Enabling Function (SEF) resides at a CSE.

An alternative embodiment in which an SEF resides at a CSE is illustrated in FIG. 26. Referring to FIG. 26, in accordance with the illustrated embodiment, at 1, an AE1 that would like to host a resource R1 securely, generates the appropriate Credentials based upon the security requirements. Using the credentials, the AE1 may encrypt the content to create EC-R1 and integrity protects it to create R1-AT (which may be DS or MAC based on the type of credentials that have been used). As an example the encrypted EC-R1 may be represented as a JSON Web Encryption. At 2, the AE1 performs a Request in order to create a Credential-Id resource at a CSE that performs credential hosting services. It is assumed in the example that AE and the CSE share a mutual trust relationship. It is also assumed in the example that the communications between the AE1 and CSE are carried over a secure communications channel (e.g., DTLS, TLS). Using the secure communication channel, the AE1 may send one or more credentials, which the AE1 generated and used for encrypting and/or integrity protecting the content, to the CSE. At 3, the CSE may determine whether the AE1 is authorized to create a resource. For example, the CSE may have carried out an authentication procedure during the secure communications channel establishment process using (D)TLS. Alternatively, or additionally, the ACP policies may have been pre-provisioned at the CSE by the service provider. The CSE may optionally verify the AT using AE1's public key. The CSE may optionally generate a unique Credential-Id that is associated with the CSE. This is optional and may have been provided by the AE1. In some cases, in order to provide for uniqueness within the domain as well as global reachability, the CSE may generate the Credential-Id on behalf of the AE1. The Credential-Id resource created at the CSE may be of the form illustrated by the example in FIG. 27.

Figure 28:
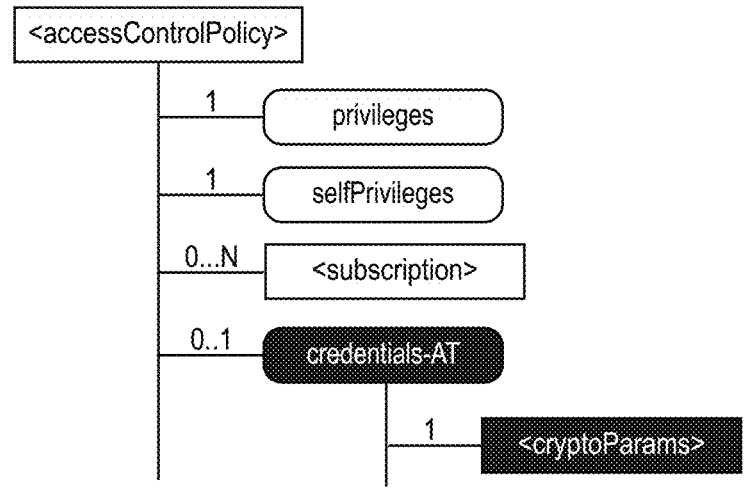
FIG. 28 depicts an example structure of an example Access Control Policy in accordance with an example embodiment.

Still referring to FIG. 26, in accordance with the illustrated embodiment, the CSE sends the Credential-Id to the AE1 at 4. At 5, the AE1 Requests to create a secure resource R1, that is encrypted EC-R1 and integrity protected using R1-AT. Thus, in accordance with the illustrated example, the H-CSE receives a first request, from a first application (AE1), to create a resource for hosting secured content associated with the first application. The AE1 may also provide the necessary CryptoParams and Credential-Id. Thus, the request may include a credential identity generated by a CSE that is separate from the H-CSE. The Credential-Id may be part of the CryptoParams or may be sent as separate child resource associated with R1. In the example, it is assumed that the AE1 and H-CSE have mutually authenticated one another and established a secure communications channel using TLS or DTLS. It may also include an associated access control policy resource as depicted in FIG. 28, for example. This ACP may be integrity protected and an AT may be created based on a DS that was generated using AE1's private key. The EC-R1 that is created may be based upon the JSON Web Encryption (JWE), and the R1-AT that is created may be based upon the JSON Web Signature, The appropriate algorithms may be represented in the form as specified in the JSON Web Algorithms (JWA) standards. At 6, the H-CSE verifies the request and checks to ensure that (determine whether) the AE1 has been authorized to create a resource at the H-CSE. At 7, in accordance with the illustrated example, the H-CSE responds with a success. Thus, if the example application is authorized, the H-CSE may host the secured content. In some cases, the application may be authorized by a CSE that is separate from the H-CSE, to create the resource.

At 8, a client (AE2) would like to retrieve R1 and therefore sends a request, for instance a second request, to the H-CSE, to retrieve R1. Thus, the H-CSE may receive a second request, from a second application (AE2), to access the secured content associated with AE1. Mechanisms involved in discovering R1 is outside the scope of the example and it is assumed that the AE2 is able to discover the location of a secure version of R1. It may be possible for AE2 to discover a less secure version of R1 having lesser assurance from an integrity perspective. The request is assumed to be sent over a secure channel after a mutual authentication was performed based on DTLS or TLS. At 9, in accordance with the illustrated embodiment, the H-CSE verifies the authorization of whether AE2 is allowed to perform a retrieve operation using the information within the ACP that was created by AE1. Thus, the H-CSE can determine whether AE2 is authorized to access the secured content. At 10, the H-CSE sends a response containing the EC-R1, EC-AT as well as R1-CryptoParams. Thus, if the second application is authorized to access the secured content, the H-CSE can send the secured content to the second application. The EC-R1 may be represented using, e.g., JSON-based notation, JWE, while the EC-AT may be represented using JWS and the R1-CryptoParams may be represented using JWA. At 11, if the Credential-Id was included as part of the CryptoParams, AE2 extracts the Credential-Id from it. At 12, AE2 sends a Request message to the CSE (e.g., the URI of the CSE may be determined based on domain information contained within the Credential-Id, where the Credential-Id may be of the form: R1xyrtabsffas@CSE.com) in order to perform a retrieve operation by including the Credential-Id as the resource-id within the message. It is assumed in the example that the AE2 and CSE have mutually authenticated one another and established a secure communications channel using TLS or DTLS. The Credential-Id may be sent using, e.g., JSON-based notation such as JWK. At 13, the CSE verifies authorization of AE2 based on the ACP that was created by the AE during the credential registration process at 2. At 14, if AE2 is authorized to retrieve, then the CSE sends the credentials over a secure channel to the AE2. At 15, using the credentials, the AE2 verifies the integrity using R1-AT and decrypts R1. Thus, the secured content can be decrypted when the CSE sends one or more credentials associated with the secured content to the second application (AE2). In some cases, as described above, the AE2 is authorized to access the secured content by an access control policy of the AE1.

It will be understood that the embodiment described above with respect to FIG. 26 may be applicable to the Mcc interface (e.g., between two CSEs: CSE1, CSE2) as well. In such a scenario, the entity AE1 may be replaced with CSE1, and AE2 may be replaced by CSE2.

Thus, with reference to FIG. 26, an apparatus (e.g., AE1) may comprise a processor, a memory, and communication circuitry. The apparatus may be connected to a network via its communication circuitry, and the apparatus may further comprise computer-executable instructions stored in the memory of the apparatus which, when executed by the processor of the apparatus, cause the apparatus to, based on security requirements associated with content, generate one or more credentials. As described in detail below (e.g., see FIG. 37), the one or more credentials may be generated by bootstrapping an association between the apparatus and a trust enablement function. The apparatus may secure (e.g., encrypt) the content using the one or more credentials, and request that a hosting node store the secured content, such that only an authorized client can retrieve the content from the hosting node. The apparatus may also generate an authentication tag using the one or more credentials. The authentication tag may indicate an integrity and authenticity of the content for hosting at a hosting common services entity. In response to the request, the apparatus may receive a credential identity from a common services entity. The request may include a credential associated with the credential identity, wherein the request seeks a registration of the credential. In an example embodiment, the credential identity is unique to the common services entity. As shown, the apparatus may also receive a success message if the hosting node determines that the node is authorized to create a resource at the hosting node.

In accordance with another embodiment, data security credentials are generated using bootstrapping. For example, an AE may generate data security credentials by leveraging a bootstrapping process that uses an existing association between the AE and a trusted third entity, such as an M2M Enrollment Function (MEF), Trust Enablement Function (TEF) or an M2M Authentication Function (MAF). As used in this context, it will be understood the term "data security" may refer to content security or resource security. Data may also refer to an instance of content. Therefore, content instance security may also be referred to generally herein as data security. In some cases, a TEF is a specialized implementation of an MEF that is used primarily for remote provisioning of data (e.g., content or resource) specific security credentials. Thus, unless otherwise specified, the terms TEF and MEF may be used interchangeably without limitation.

Figure 37:
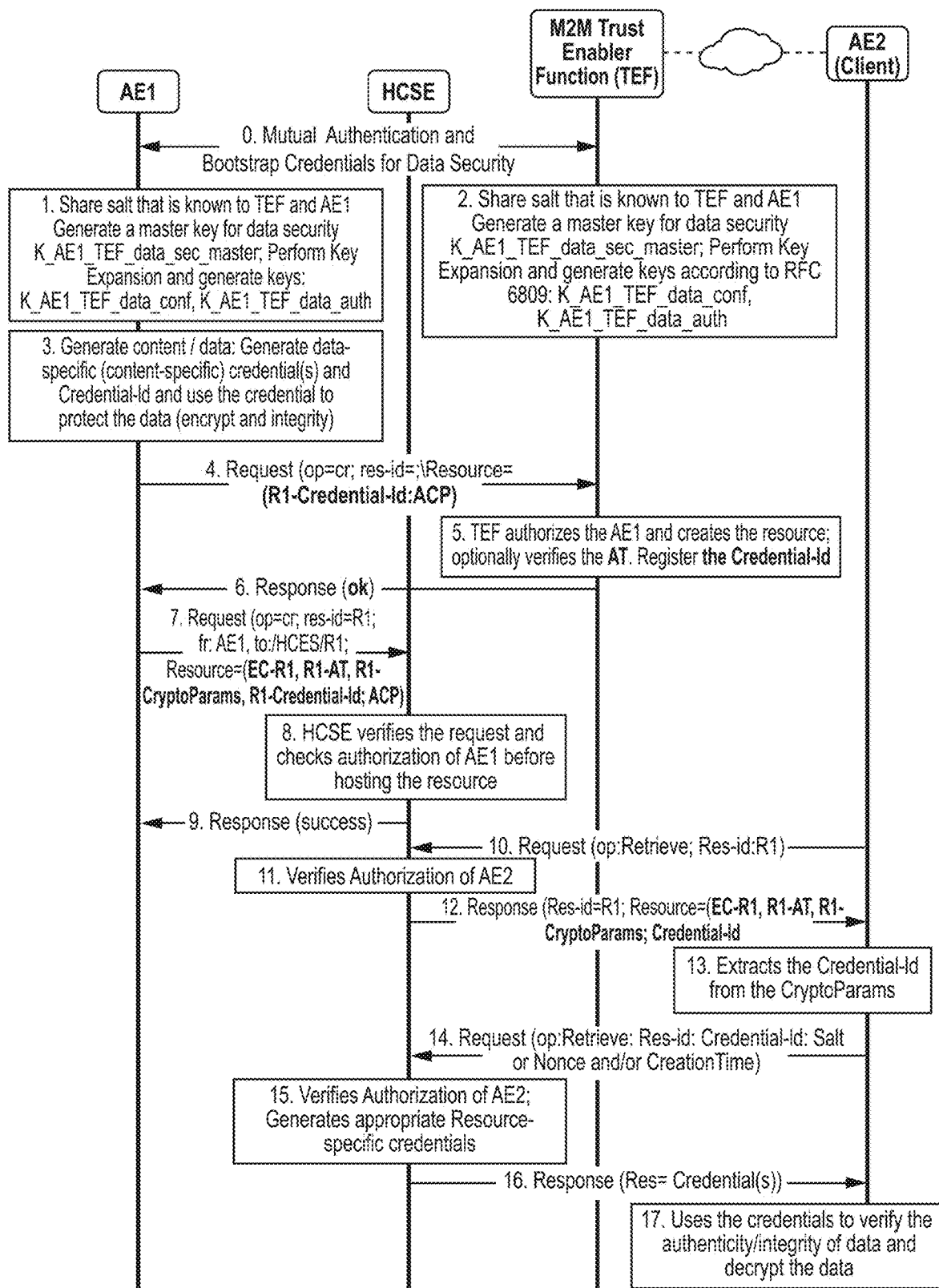
FIG. 37 is a call flow illustrating an example embodiment for resource-specific content protection.

Referring now to FIG. 37, in accordance with the illustrated embodiment, data/content security credentials are generated as a result of a bootstrapping process between an AE and a TEF. At 0, the bootstrapping process currently described within oneM2M specifications (TS-0003, Release 1) may be enhanced by using bootstrapping to derive data security credentials. The credential Kpmld/Kpm that is shared between an AE and a MEF/TEF 15 used to generate session credentials Keld/Ke, as described in TS-0003 (Release 1). The credential Ke may be used to generate data security-specific credentials between the AE and the TEF. Similarly, a bootstrapping process between an AE and a CSE may leverage an existing security association between the AE and the CSE. The security association may be identified by Kpsald/Kpsa, as described in oneM2M TS-0003. The Kpsa is then used instead of the Ke. Similarly, the KmId/Km that is used for establishing the security association between an AE and MEF may be used to generate data security credentials between the AE and the MEF. In some cases, a more preferable approach is for the AE and TEF to generate the data security credentials.

Still referring to FIG. 37, at 1, in accordance with the illustrated example, a master key is generated by the AE (AE1). A Salt, which is a random value that is used as part of the key generation, may have been shared during the bootstrapping process, or may be computed as a hash value of the initial communications between the AE and the TEF during the bootstrapping. The Salt may be a cryptographic representation of a channel that is bound between AE1 and the TEF. The channel may be a secure connection that is established using TLS or DTLS. The AE1, which may be referred to as an Enrollee, and the TEF, which may be referred to as an Enrollment Target, may generate data security credentials using the Ke. As shown, a Ke AE1-TEF refers to the Ke that is associated between the AE1 and the TEF. Ke may be the master key that is used to generate a data security master key, K_AE1_TEF_data_sec_master. Alternatively, if the target is a MEF for example, then the Km may be used as the master key for generating the data security master key. An example of data security key generation using RFC 5809, where the Enrollee is AE and the Enrollment Target is TEF, is provided below:

K_AE1_TEF_data_sec_master=HMAC-Hash (Salt, Ke_AE1_TEF)

T(0)=empty string (zero length)

Once the K_AE1_TEF_data_sec_master has been generated, it may then be used for Key Expansion in order to generate unique data authenticity and data confidentiality keys. In some cases, only a single key is generated if the data authenticity and confidentiality is provided by an algorithm such as the AEAD (e.g., AES-CCM or AES-GCM)

K_AE1_TEF_data_auth=T(1)=HMAC-Hash (K_AE1_TEF_data_sec_master, T(0)|"Data Authenticity and Integrity"|0x01)

The K_AE1_TEF_data_auth key is used for providing data authenticity and data integrity, and thus may be referred to a data authenticity or a data integrity key.

K_AE1_TEF_data_conf=T(2)=HMAC-Hash (K_AE1_TEF_data_sec_master, T(1)|"Data Confidentiality Key"|0x02)

In certain cases, the Kpsa_AE1_CSE1 (which is the Kpsa between AE1 and CSE1) may be used instead of the Ke_AE1_TEF, and the process described above may be used to generate unique keys for data security protection (e.g., data authentication, integrity, and data confidentiality). Kpsa may be used if a CSE is used by the AE as the data security credential registry. In certain cases, the Kpsa_AE1_CSE,_ Ke_AE_TEF, or Km_AE1_MAF may be used as the K_AE1_TEF_data_sec_master key, and the process described above may be used to generate unique keys for data security protection (e.g., data authentication, integrity, and data confidentiality). If certain other cases, a session key is generated from Ke_AE1_CSE1, Kpsa_AE1_TEF,_ Km_AE1_MAF, which is then used as the master key for generating unique keys for data authenticity and data confidentiality. In certain other cases, only a single session key (K_AE1_TEF_data_auth conf) that is generated from Ke, Kpsa, or Kpm is used for providing both data authenticity and data confidentiality, when used with AEAD class of algorithms.

At 2, in accordance with the illustrated example, a similar process of key generation is carried out by the TEF. The negotiation of the algorithm, key generation mechanisms, types of keys, and number of keys to be generated, and the like may be performed during step 0 when the bootstrapping process was carried out between the AE1 and the TEF.

At 3, the AE1 generates content/data. Each instance of the content/data may be protected by a unique set of data authenticity and data confidentiality keys. In another example, instances of the content, for example all instances of the content, may be protected by a single data authenticity key and by a single data confidentiality key. An example key generation in which only a single data authenticity and a single data confidentiality key is generated for a container that may contain multiple content instances is shown below:

K_AE1_Container-x_data_auth=HMAC-Hash (K_AE1_TEF_data_auth, "Data Authenticity and Integrity"|"Container-x"|Nonce or creationTime) and K_AE1_Container-x_data_conf=HMAC-Hash (K_AE1_TEF_data_conf, "Data Confidentiality"|"Container-x"|Nonce or creationTime)

Alternatively, for each instances of content within a container, a unique set of keys may be generated. An example of such an embodiment is shown below:

K_AE1_ContentInstance-x_data_auth=HMAC-Hash (K_AE1_TEF_data_auth, "Data Authenticity and Integrity"|"Container-x"|Nonce or creationTime) and K_AE1_ContentInstance-x_data_conf=HMAC-Hash (K_AE1_TEF_data_conf, "Data Confidentiality"|"ContentInstance"|Nonce or creationTime)

The content may be encrypted and/or integrity protected using the above generated keys. For encrypting the content, a random IV may be generated by the AE1. The random IV may be used with the encryption algorithm and the content (data) in order to generate the encrypted content (EC-R1, the encrypted resource).

In some cases in which content instances are being encrypted separately, each content instance may have a unique confidentiality key, and a new IV may be generated each time an encryption process is carried out, thereby generating an encrypted content instance. Therefore, each content instance may have an associated separate encrypted content instance.

For integrity protection or for adding authenticity to content/data, a random Nonce with an associated time component may be used in order to generate an Authentication Tag (AT) that is associated with the content. In cases in which each content instance is being protected separately, each content instance may have an associated AT. For providing data authenticity, in certain cases, it may be preferable to use a single key for generating each individual AT.

The encrypted content may be represented as the modified oneM2M container or <contentInstance> resource as depicted in FIG. 29. Alternatively, the EC-R1 that is created may be based upon the JSON Web Encryption (JWE) specified in RFC 7516. The R1-AT that is created may be based upon the JSON Web Signature specified in RFC 7515. The appropriate algorithms may be represented in the form as specified in the JSON Web Algorithms (JWA) standards, RFC 7518.

Generally, each key that is generated and used may be associated with a unique Credential-Id. The Credential-Id may be generated by the AE1 or provided by the TEF to the AE1. In some cases, the Credential-Id may carry characteristics of the content id or content instance id and the type of credential. An example of a Credential-id may be of the form: K_AE1_Container-x_data_conf-Id@TEF.com, which is associated with the key, K_AE1_Container-x_data_conf.

With continuing reference to FIG. 37, at 4, in accordance with the illustrated embodiment, the AE1 may register the Credential-Id with the TEF. As illustrated, the AE1 requests to create a Credential resource identified by a Credential-Id and associated Access Control Policies. The Credential-Id may alternatively be provided by the TEF, for example, in order to avoid collision of Credential-Ids that are associated with the TEF. Collisions of Credential-Ids may be avoided if a hash is carried out of the generated id, by AE1. An example hash is shown below:

H1=Hash (K_AE1_Container-x_data_conf-Id)
Credential-Id=H1@TEF.com

At 5, as shown, the TEF checks to ensure that the AE1 has been authorized to register the credentials with the TEF. The TEF may also verify the Credential-Id and the optional CryptoParams that may have been included. The TEF then may create a <credential-Id> resource type and populates it with the attributes, such as, for example, the <accessControlPolicy> values.

At 6, in accordance with the illustrated example, the TEF sends a Response that indicates successful creation of the Credential resource, to AE1. At 7, the AE1 Requests to create a secure resource R1, which is encrypted EC-R1 and integrity protected using R1-AT. The AE1 may also provide the CryptoParams and the Credential-Id. The Credential-Id may be part of the CryptoParams or may be sent as a separate child resource associated with R1. In some cases, the AE1 and HCSE have mutually authenticated one another and established a secure communications channel using TLS or DTLS. The request may also include an associated access control policy (ACP) resource. This ACP may be integrity protected.

At 8, the H-CSE verifies the request and checks to ensure that the AE1 has been authorized to create a resource at H-CSE. At 9, the H-CSE responds with a success message. Referring to 10, at some point a client (AE2) may want to retrieve R1. The client may send a Request to retrieve R1 to HCSE. In some cases, AE2 is able to discover the location of a secure version of R1. In some cases, AE2 may discover a less secure version of R1 having lesser assurance from an integrity perspective. The request may be sent over a secure channel after a mutual authentication was performed based on DTLS or TLS. The AE2 may send a Request to perform a "Retrieve" operation on resource R1. At 11, in accordance with the illustrated example, the HCSE verifies the authorization of whether the AE2 is allowed to perform a retrieve operation using the information within the ACP that was created by the AE1. At 12, the HCSE sends a Response containing the EC-R1, EC-AT and the R1-CryptoParams. The EC-R1 may be represented using JSON-based notation (e.g., JWE) for example, the EC-AT may be represented using JWS, and the R1-CryptoParams may be represented using JWA. Alternatively, both the EC-AT and EC-R1 may be represented as JWE especially, for example, if the algorithm used for encryption and integrity protection is based on AEAD algorithm (e.g., AES-GCM or AES-CCM). Alternatively still, the encrypted content, EC-R1 and the R1-AT may be represented as a oneM2M resource along with the appropriate CryptoParams.

At 13, in accordance with the illustrated example, if the Credential-Id was included as part of the CryptoParams, the AE2 extracts the Credential-Id from it. At 14, the AE2 sends a Request message to the TEF in order to perform a retrieve operation, for example, by including the Credential-Id as the resource-id within the message. The AE2 and TEF may have mutually authenticated one another and established a secure communications channel using TLS or DTLS. The Credential-Id may be sent using, for example, JSON-based notation (e.g., JWK) or using the oneM2M resource structure. The AE2 may also extract a Salt or Nonce from the CryptoParams that is associated with the resource R1 (data). The AE2 may also send the Salt or Nonce, with the Credential-Id, to retrieve resource-specific credentials.

At 15, the TEF verifies authorization of the AE2 based on the ACP that was created by the AE1 during the credential registration process at 2. At 16, if the AE2 is authorized to retrieve, then the TEF computes the resource-specific credentials, and sends the credentials over a secure channel to the AE2. The TEF may also send usage information that indicates how the credentials may be used and the associated algorithms that can be used. In some cases, the AE2 may already have possession of the usage information, which it obtained from the HCSE as part of the CryptoParams. However, in other cases in which a container may contain a number of contentInstance resources (and each resource may be associated with its own encrypted contentInstance, authentication tags, credentials), the TEF may be able to provide additional guidance on how the credentials may be used to verify contentInstance integrity and to decrypt the contentInstances. In an example in which the Salt is sent, the TEF may generate the K_AE1_TEF_data_sec_master, which may then be provisioned to the AE2. In an example, the AE2 uses the K_AE1_TEF_data_sec_master to generate container-specific or contentInstance-specific credentials. The mechanisms to generate K_AE1_TEF_data_auth and K_AE1_TEF_data_conf (and associated container or contentInstance-specific credentials) may be implemented in accordance with the mechanisms described above. It is recognized herein that an advantage of provisioning the K_AE1_TEF_data_sec_master is that the AE2 might not have to contact the TEF as long as the credential lifetime associated with the K_AE1_TEF_data_sec_master has not expired regardless of whether newer content instances are generated by the AE1. The AE2 may be able to generate container or contentInstance-specific credentials from the K_AE1_TEF_data_sec_master using the CryptoParams that the AE2 obtains as part of the resource retrieval process performed in step 12. In some cases, provisioning of the K_AE1_TEF_data_sec_master may give the AE2 cryptographic access to content and instances, for instance all content and instances, generated by the AE1. Thus, it is recognized herein that this provisioning is not the preferred approach in some cases.

In another example embodiment, the TEF may provision the K_AE1_TEF_data_auth and/or the K_AE1_TEF_data_conf to the AE2, which then generates the container-specific or contentInstance-specific credentials. In other cases, the TEF might only provision the container-specific or contentInstance-specific credential(s) to the AE2. In some cases, the AE2 might not perform any key generation because it is provisioned with the keys, thereby limiting the AE2 from having cryptographic access to a specific container or contentInstance(s). In some cases, for each of the keys, the associated Nonce(s), creation time associated with the container, or content instances may have to be provided to the TEF. In certain cases, when the AE1 performs registration of the credential process at 4, the AE1 may include the CryptParams associated with the Credential-Id to the TEF.

From a performance and security perspective, it is recognized herein that an approach may be for the TEF to only provision the K_AE1_TEF_data_auth and/or the K_AE1_TEF_data_conf to the AE2. The credentials may have an associated life-time associated with each of them. After the expiration of lifetime, new credentials may have to be generated.

At 17, in accordance with the illustrated example, using the credentials, AE2 verifies the integrity using R1-AT, and decrypts R1 using the provisioned or generated container or contentInstance credentials.

In an alternative embodiment, a node (e.g., AE1) generates client-specific "protected" content, which may be protected for consumption by a particular client (e.g., AE2). In oneM2M, because AEs do not directly communicate to authenticate one another, a CSE may perform a client-specific protection on behalf of AEL such that client-specific (e.g., AE2) protected content is generated and hosted at the CSE. Alternatively, similar mechanisms described herein, wherein a CSE performs the security functions on behalf of an AE1, may be performed by the AE1 itself without having to rely on the CSE1. A client-specific protected content embodiment is illustrated FIG. 38, which will now be discussed.

Figure 38:
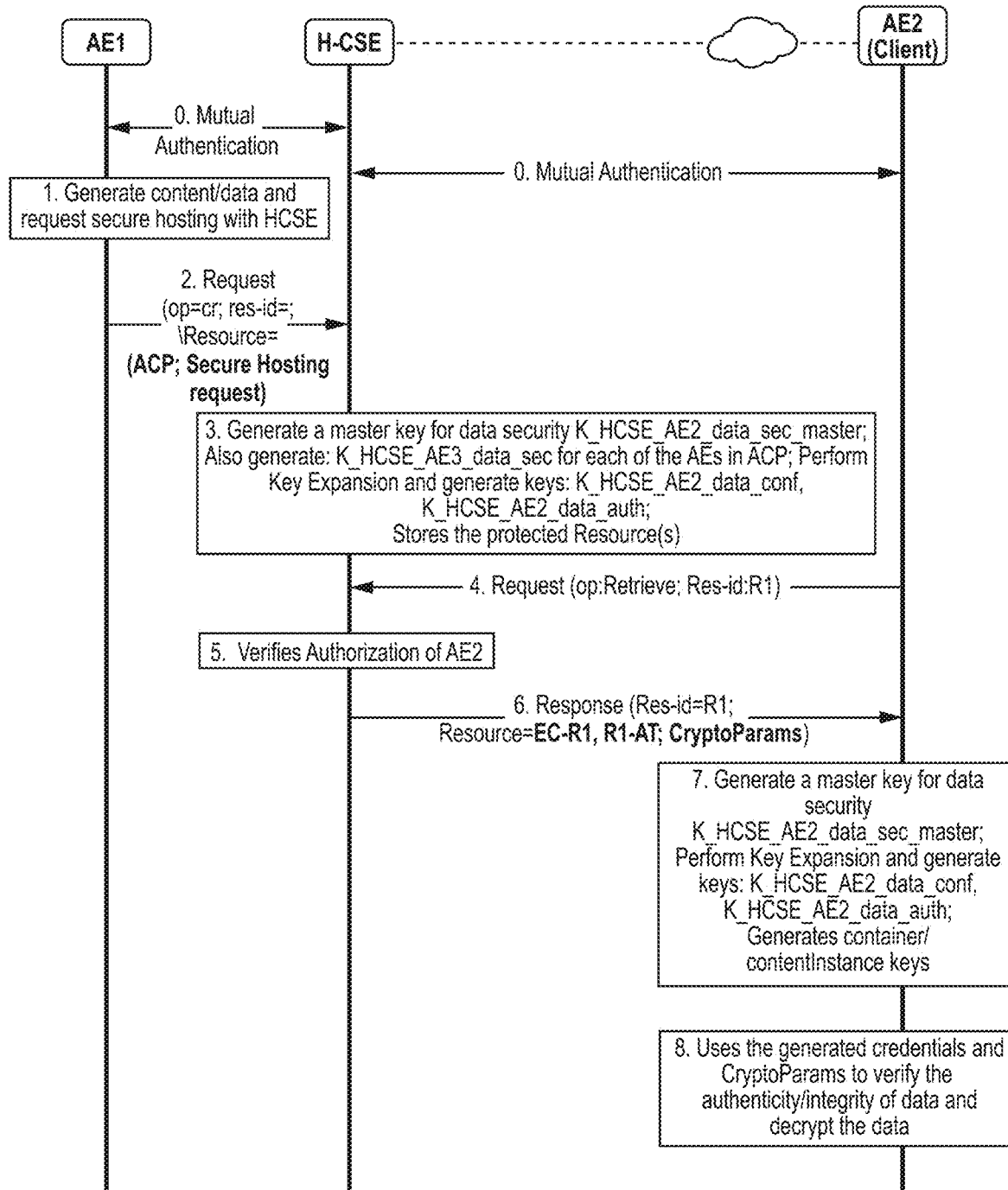
FIG. 38 is a call flow illustrating an example embodiment for client-specific content protection.

As mentioned above, FIG. 38 illustrates a client-specific content protection embodiment. Referring to FIG. 38, in accordance with the illustrated embodiment, at 0, an AE1 has mutually authenticated with a HCSE using (D)TLS. Similarly, an AE2 has mutually authenticated with the HCSE using (D)TLS.

At 1, in accordance with the illustrated example, the AE1 generates content (data) and/or contentInstances. Further, the AE1 would like to ensure that the content is protected for integrity and/or confidentiality by a Hosting CSE. At 2, the AE1 requests that the content is protected for integrity and/or confidentiality for each specific client, using unique client-specific credentials. At 3, the HCSE processes the ACP provided by the AE1, and determines the clients (e.g., AE2) that have been authorized to be able to perform CRUD operations on the secured content. The HCSE also determines that unique client specific (e.g., AE2-specific) credentials will have to be generated. Alternatively, the CSE1 may determine the ACP, and therefore the authorized clients. Or in some cases, the ACP provided by AE1 is combined with an ACP that has been provided by a service provider in order to determine the authorized clients that are allowed to perform CRUD operations on the content, in particular, the "Retrieve" operation. In accordance with the example, assuming that the AE2 is an approved client and has been authorized by the AE1, the HCSE generates a K_HCSE AE2_data_sec_master by leveraging the pre-shared key that was provisioned or generated as a result of remote provisioning or bootstrapping according to oneM2M TS-0003 specifications (Release 1), the Kpsa_HCSE_AE2. The master key used for data security, K_HSCE_AE2_data_sec_master, may be generated using Key expansion mechanisms, for example, based on RFC 5869:

K_HCSE_AE2_data_sec_master=HMAC-Hash (Salt, Kpsa_HCSE_AE2)

T(0)=empty string (zero length)

At 4, once the K_HCSE_AE2_data_sec_master is generated, it may be used for Key Expansion to generate unique data authenticity and data confidentiality keys. In some cases, only a single key is generated if the data authenticity and confidentiality are provided by an algorithm, such as the AEAD for example (e.g., AES-CCM or AES-GCM). For example, keys may be generated as follows:

K_HCSE_AE2_data_auth=T(1)=HMAC-Hash (K_HCSE_AE2_data_sec_master, T(0)|"Data Authenticity and Integrity"|0x01)

The K_HCSE_AE2_data_auth key is used for providing data authenticity and data integrity and may be referred to as a data authenticity or data integrity key.

K_HCSE_AE2 conf=T(2)=HMAC-Hash (K_HCSE_AE2_data_sec_master, T(1)|"Data Confidentiality Key"|0x02)

A key generation in which only a single data authenticity and a data confidentiality key for a container that may contain multiple content instances is shown below, for purposes of example:

K_HCSE_AE2 Container-x_data_auth=HMAC-Hash (K_HCSE_AE2_data_auth, "Data Authenticity and Integrity"|"Container-x"|Nonce or creationTime) and K_HCSE_AE2 Container-x_data_conf=HMAC-Hash (K_HCSE_AE2_data_conf, "Data Confidentiality"|"Container-x"|Nonce or creationTime)

Alternatively, for each instances of content within a container, a unique set of keys may be generated, such as shown below, for example:

K_HCSE_AE2_ContentInstance-x_data_auth=HMAC-Hash(K_HCSE_AE2_data_auth, "Data Authenticity and Integrity"|"Container-x"|Nonce or creationTime) and K_HCSE_AE2_ContentInstance-x_data_conf=HMAC-Hash (K_HCSE_AE2_data_conf, "Data Confidentiality"|"ContentInstance"|Nonce or creationTime)

Alternatively still, in some cases in which public-keying mechanisms are used, client-specific credentials may be based upon Identity-Based Encryption (IBE) mechanisms.

Still referring to FIG. 38, at 5, in accordance with the illustrated example, the AE2 requests (at some point) to "Retrieve" the resource R1 (container or contentInstance(s)) from HCSE. At 6, the HCSE verifies the authorization of AE2. At 7, the HCSE responds with the encrypted content EC-R1, the authentication tag, R1-AT, and the associated CryptoParams. At 8, the AE2 uses the CryptoParams, and extracts the UsageInfo and "Salt" in order to generate the K_HCSE_AE2_data_sec_master. Further, the AE2 extracts the Nonces and other parameters required to generate: K_HCSE_AE2_data_conf, K_HCSE_AE2_data_auth, etc. The AE2 may then generate the container-specific and contentInstance(s) keys in order to verify the authenticity and integrity of the data within the container/contentInstances and decrypt the data within the container or data contained within each containerinstances.

Thus, with reference to FIGS. 37 and 38, the illustrated nodes may comprise a processor, a memory, and communication circuitry. The node may be connected to a network via its communication circuitry, and the node may further comprise computer-executable instructions stored in the memory of the node which, when executed by the processor of the node, cause the node to perform the illustrated and described steps.

Figure 27:
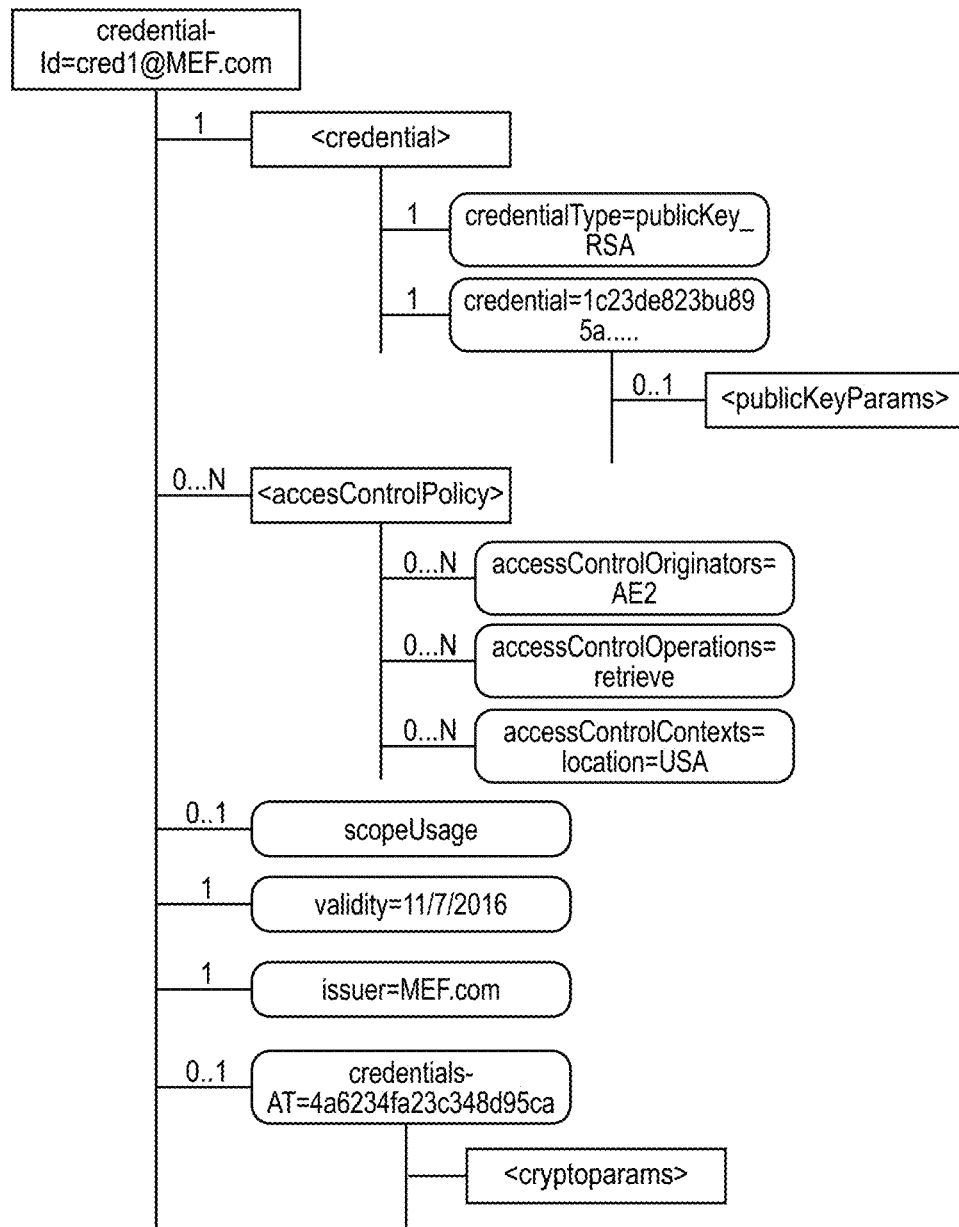
FIG. 27 illustrates an example structure of a Credential-Id resource created at a Trust Enablement Function, in particular a machine-to-machine (M2M) Enrollment Function (MEF), in accordance with an example embodiment.

FIG. 27 illustrates an example credential-Id resource. As shown, the example credential-Id resource is itself integrity protected using credentials-AT, which may have been created by the creator of the credential-Id resource by means of the creator's credentials (e.g., AE1's private key) or by a SCHF (e.g., H-CSE). Details of the example attributes are now described, presented by way of example and without limitation:

- credential-Id: It uniquely identifies the credential within a domain. It may be globally unique or locally unique and generally based on the scope of the credentials. It may be of the form: using a random but unique value as the prefix and a FQDN as the post-fix (e.g. xyz@credentials.example.com) or in the form of a URI (e.g. //example.com/credentials/xyz).
- credential: It is made up of child resource attributes that are specific to the credentials. The attributes are:
  - credentialType: Describes the type of credentials, namely, symmetric key or public key. It may also specify the type of public key (e.g., RSA or ECC)
  - credential: The attribute stores the actual credential value (e.g. the symmetric key or a public key). Note: the size of the credential may depend upon the type of credential. If the Key is a public key then it may have associated:
    - publicKeyParams: The parameters may be (e.g., type of curve used, key size) and/or may be based on JWK parameters. This may be optional.
- accessControlPolicy: The example ACP based on oneM2M defined ACPs has three attributes: accessControlOriginators, accessControlOperations and, accesControlContexts
- scopeUsage: This attribute defines the scope (e.g., signing or encryption, key generation process). It may also be able to provide usage, on how the credentials may be used. Rules on using the credentials.
- validity: The validity attribute may be used to indicate the lifetime associated with the credentials. The credentials may have to be renewed and CLMP may be initiated based on policies.
- issuer: The identity of the entity (e.g., FQDN) that generated and issued the credentials.
- credentials-AT: This attribute may store the AT value that is computed on the credential resource (that includes all the attributes except the credentials-AT attribute) using the associated cryptoParams sub-resource which is described in FIG. 30.

An example embodiment of a generic ACP that is integrity protected is illustrated in FIG. 28. The illustrated ACP has an associate AT, which may have been generated using the AE's private key if the cryptoParams specifies the use of public key mechanisms. It is also possible that any entity that creates an ACP may be able to generate and authenticated/integrity-protected ACP. Therefore, if an ACP was created by a CSE, then the AT generated is based on the CSE's private key provided the CryptoParams have required the use of public key mechanisms.

FIG. 29 illustrates an example of a contentInstance that is confidentiality protected (EC-contentInfo) using an encryption algorithm and a particular credential (e.g., symmetric key) described within the cryptoParams resource. It may also be integrity protected by means of a DS or MAC (e.g. stored in content-AT attribute) that is generated by means of pubic keying mechanisms (e.g., private key of the content generator) or by means of a symmetric key that was generated out of a master key (e.g., KeyGenKey).

Figure 30:
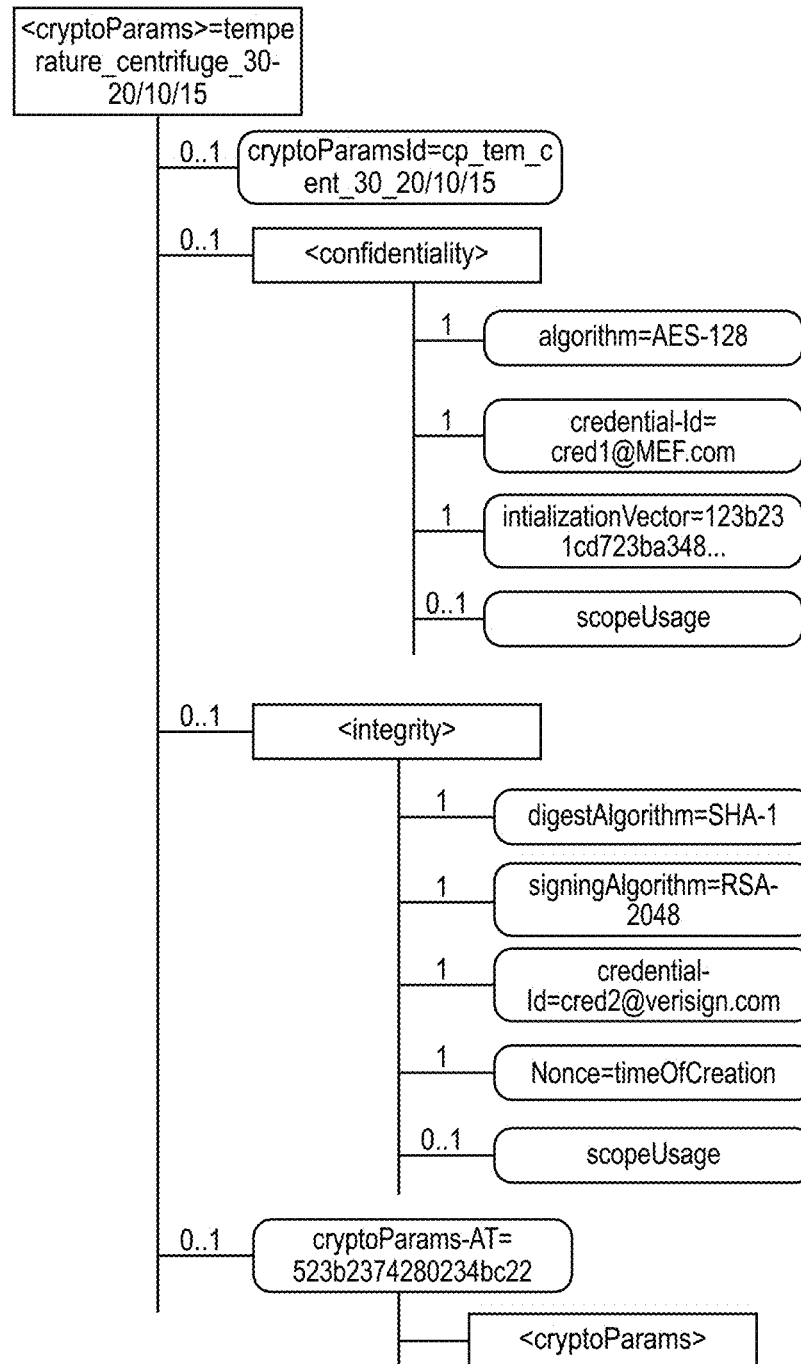
FIG. 30 illustrates an example crypto parameter resource in accordance with an example embodiment.

An example associated cryptoParams resource is depicted in FIG. 30. Details regarding the example attributes associated with the cryptoParams resource is provided below, presented by way of example and without limitation:

- cryptoParamsId: This is an optional attribute that may be used to uniquely identify the cryptographic parameters associated with a content/data that is being protected.
- confidentiality: It is a sub-resource type that describes the parameters associated with the encryption process. The example attributes are:
  - algorithm: Describes the encryption algorithm that is to be used (e.g., AES-128)
  - credential-Id: Describes the credential-Id that is to be used in order to retrieve the credential (e.g. keys) that is used for encrypting the content (e.g. centrifuge temperature)
  - initializationVector: It describes the IV that has to be used for encrypting/decrypting content for that particular algorithm.
  - scopeUsage: This is an optional attribute that may describe usage and scope of the credentials, IV, and the algorithm in order to encrypt or de-crypt a content/resource
- integrity: It is a sub-resource that describes the parameters associated with integrity protecting content/resource. The attributes are:
  - digestAlgorithm: The algorithm used for creating a digest (e.g., SHA-1).
  - signingAlgorithm: The algorithm used for digitally signing a digest in the case of public key, an appropriate algorithm may be used (e.g., RSA), whereas in the case of symmetric key an appropriate algorithm may be used (e.g., HMAC-SHA-1). It may be possible that in the case of symmetric key, the digestAlgorithm is replaced by a Keyed-Hash-MAC algorithm (e.g., HMAC-SHA-256). The example described here uses a public key mechanisms however, similar mechanisms may be used for symmetric keys.
  - credential-Id: Describes the credential-Id (e.g., cred2@verisign.com) that is to be used in order to retrieve the credential (e.g., keys) for creating the AT associated with the content/resource.
  - nonce: This value is used for replay protection and may contain a randomly generated value or time/date associated with the creation of the content/resource.
  - scopeUsage: This is an optional attribute that may describe usage of the credentials, nonce and the algorithm in order to create an AT of the content/resource.
- crtypotoParams-AT: This is the AT associated with the cryptoParams resource identified by cryptoParamsId: cp_tem_cent_30_20/10/15) using the associated cryptoParams sub-resource.

Figure 31:
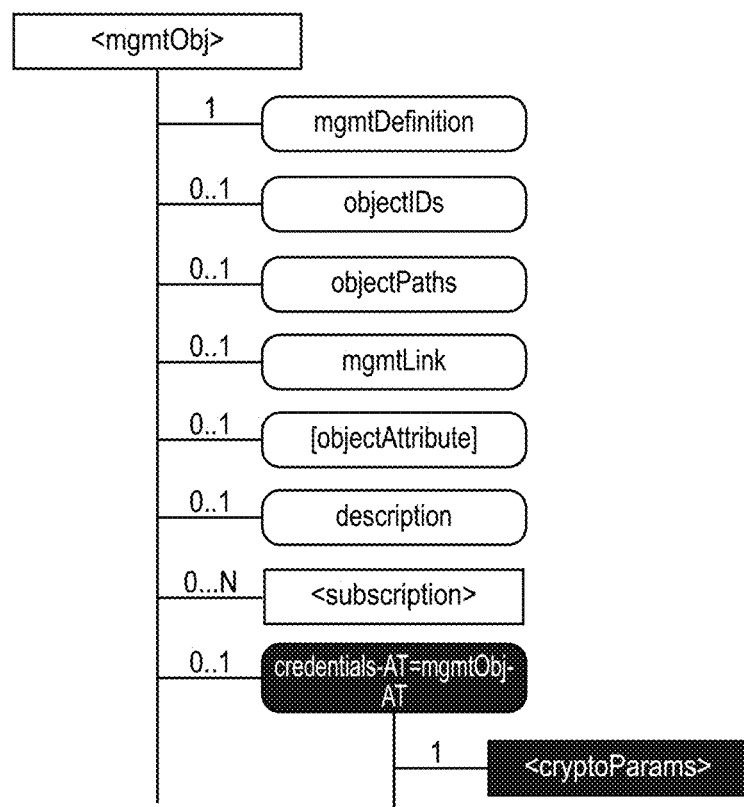
FIG. 31 illustrates an example of a management object that is integrity protected.
Figure 32:
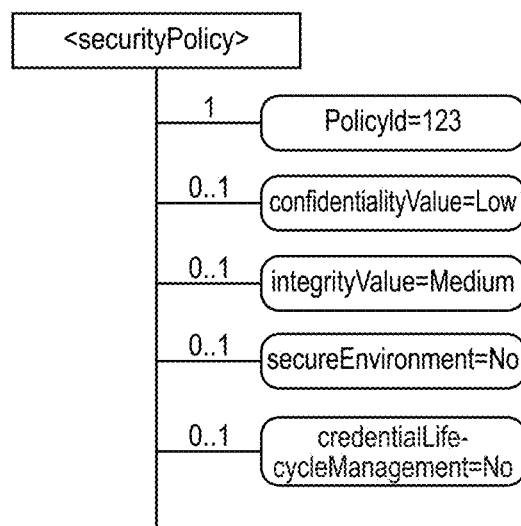
FIG. 32 illustrates an example security policy resource.

An example of a <mgmtObj> resource protected for integrity and authenticity is illustrated in FIG. 31. An example security policy resource is illustrated in FIG. 32.

Figure 33:
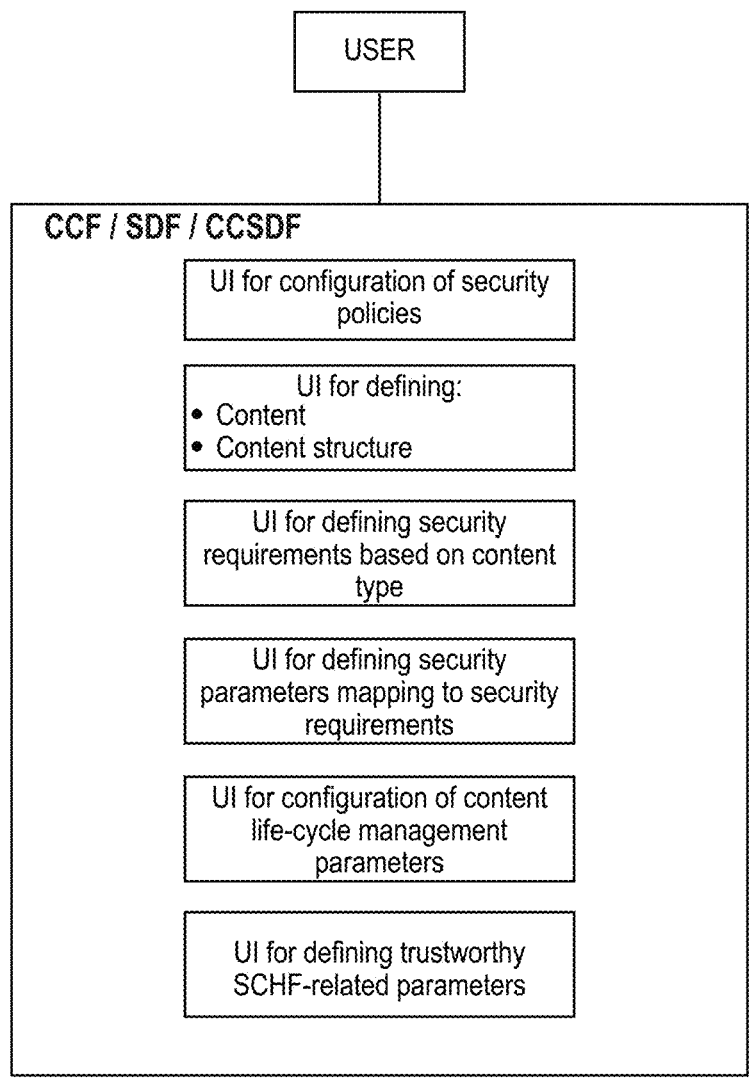
FIG. 33 illustrates an example graphical user interface (GUI) that may be provided at the CCSDF in accordance with an example embodiment.

In accordance with an example embodiment, configuration of policies and security parameters associated with content security may be performed by a user using graphical user interfaces (GUIs). Alternatively, web interfaces may be used instead of, or in addition to, a GUI. Example user interfaces (UIs) are shown in FIG. 33. For example, a UI may be used for, without limitation:

- configuration of security policies relating to content security
- providing a user with the ability to:
  - Define what constitutes a content
  - Define structure of content
- defining security requirements based on content/content type displaying a table that may be used by user so that the user is able to configure/map security requirements to associated security parameters configuration of content life-cycle parameters (more specifically security parameters)

defining parameters that are used to identify trustworthy SCHFs

Figure 34:
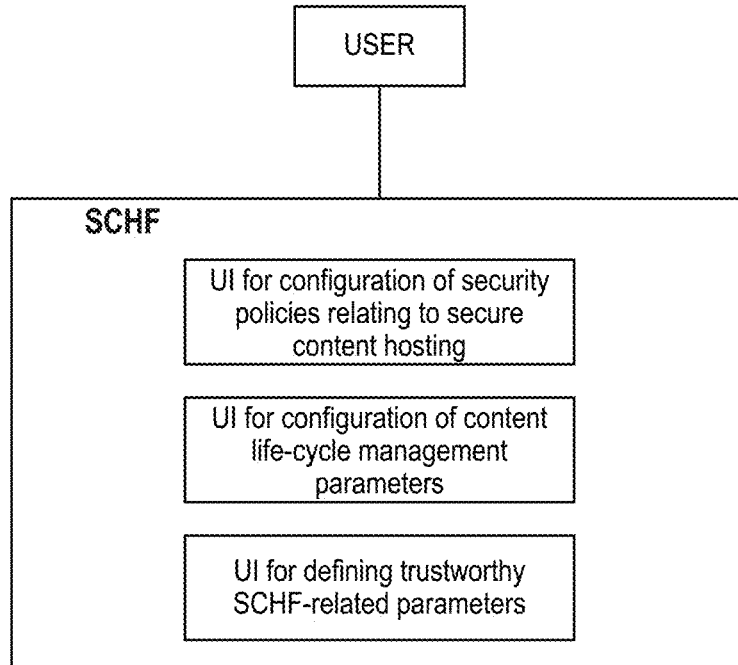
FIG. 34 illustrates an example GUI that may be provided at the SCHF in accordance with an example embodiment.

Various UIs may be provided at the SCHF. FIG. 34 shows example UIs that may be provided at the SCHF, which include, presented by way of example and without limitation:

UI for configuration of security policies relating to content security

UI for configuration of content life-cycle parameters (more specifically security parameters)

UI for defining parameters that is used to define it's (SCHF's) trustworthiness

Figure 35:
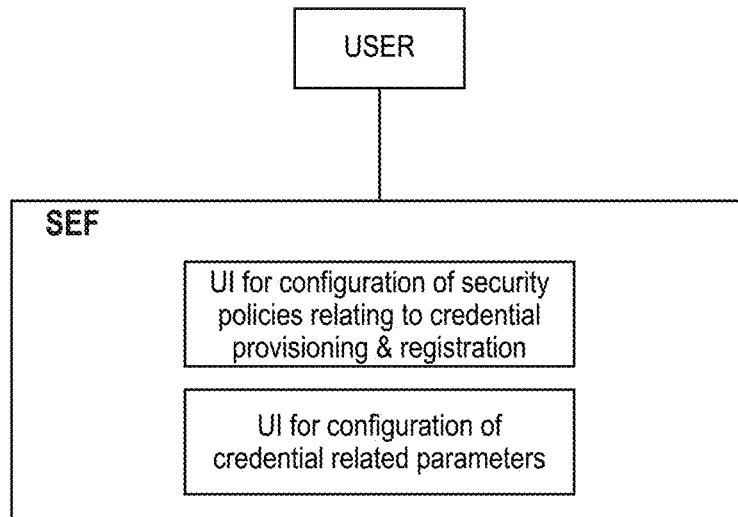
FIG. 35 illustrates an example GUI that may be provided at the SEF in accordance with an example embodiment.

FIG. 35 illustrates example UIs that may be provided at the SEF, presented by way of example and without limitation:

UI for configuration of security policies relating to content security related credential requisition and registration UI for configuration of credential related parameters It will be understood that the example user interfaces can be used to monitor and control alternative parameters as desired. It will further be understood that GUIs can provide a user with various information in which the user is interested via a variety of charts or alternative visual depictions.

Figure 36A:
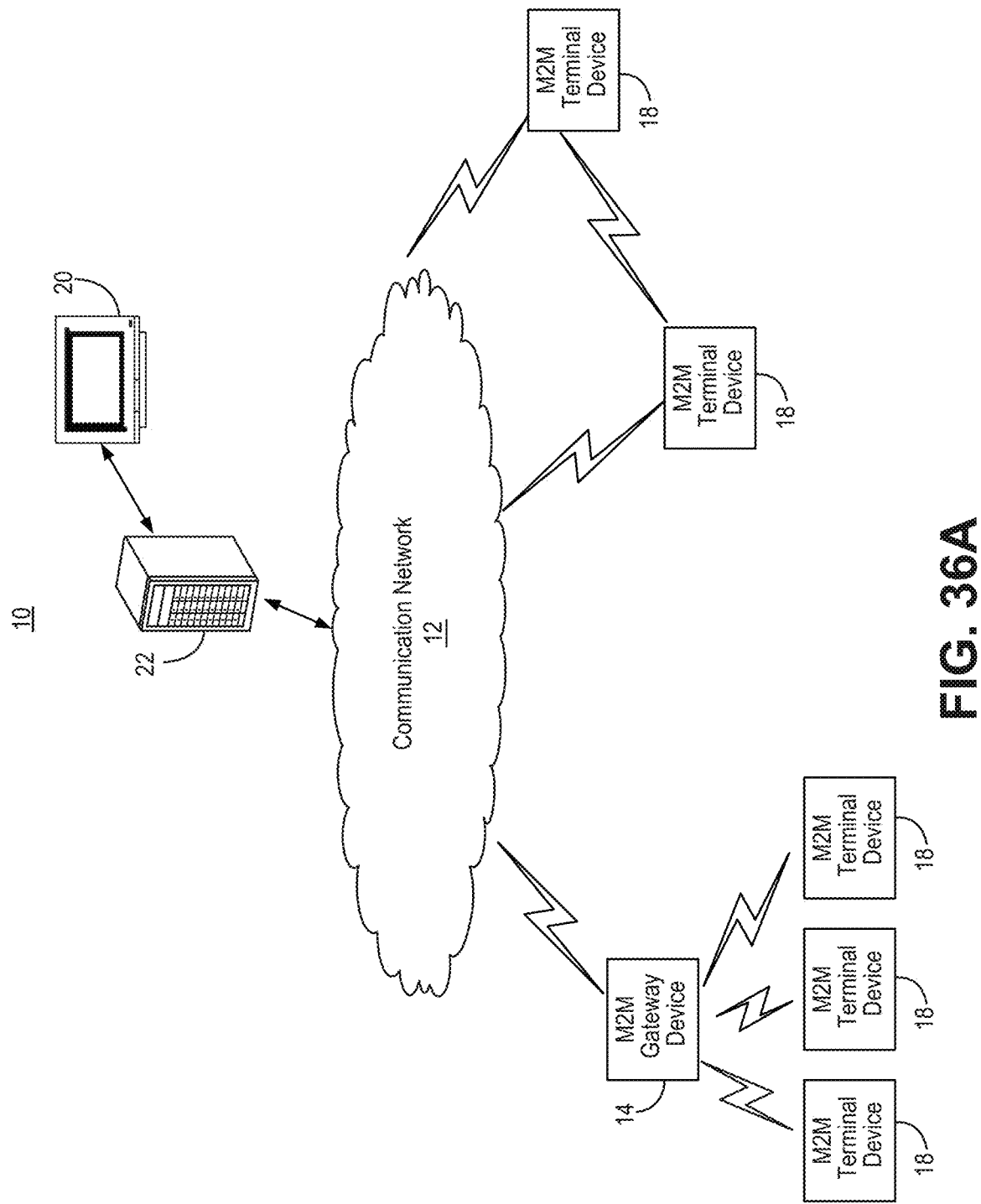
FIG. 36A is a system diagram of an example machine-to-machine (M2M) or Internet of Things (IoT) communication system in which one or more disclosed embodiments may be implemented.

FIG. 36A is a diagram of an example machine-to-machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway or M2M service platform may be a component of the IoT/WoT as well as an IoT/WoT service layer, etc. Any of the client or entities illustrated in any of FIGS. 6-35, 37, and 38 may comprise a node of a communication system such as the one illustrated in FIGS. 36A-D.

As shown in FIG. 36A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 36A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, devices, of the network. For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. A M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles personal digital assistants, health and fitness monitors, lights, thermostats, appliances, garage doors and other actuator-based devices, security devices, and smart outlets.

Figure 36B:
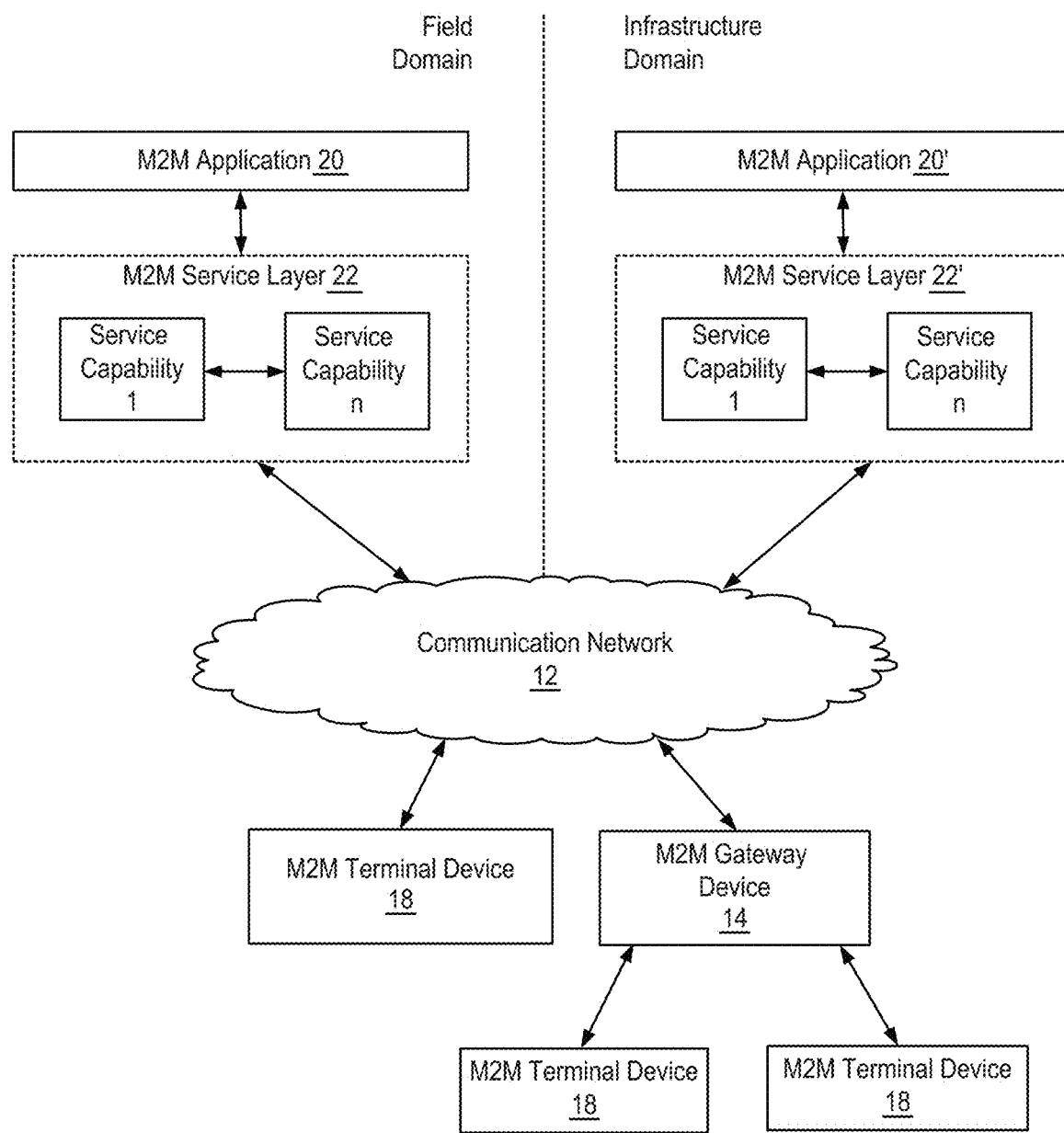
FIG. 36B is a system diagram of an example architecture that may be used within the M2M/IoT communications system illustrated in FIG. 36A.

Referring to FIG. 36B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Still referring to FIG. 36B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Generally, a service layer (SL), such as the service layers 22 and 22' illustrated in FIGS. 36A and 36B, defines a software middleware layer that supports value-added service capabilities through a set of application programming interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented in a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device, or the like) having the general architecture illustrated in FIG. 36C or 36D described below.

Further, the methods and functionalities described herein may be implemented as part of an M2M network that uses a Service Oriented Architecture (SOA) and/or a resource-oriented architecture (ROA) to access services, such as the above-described Network and Application Management Service for example.

Figure 36C:
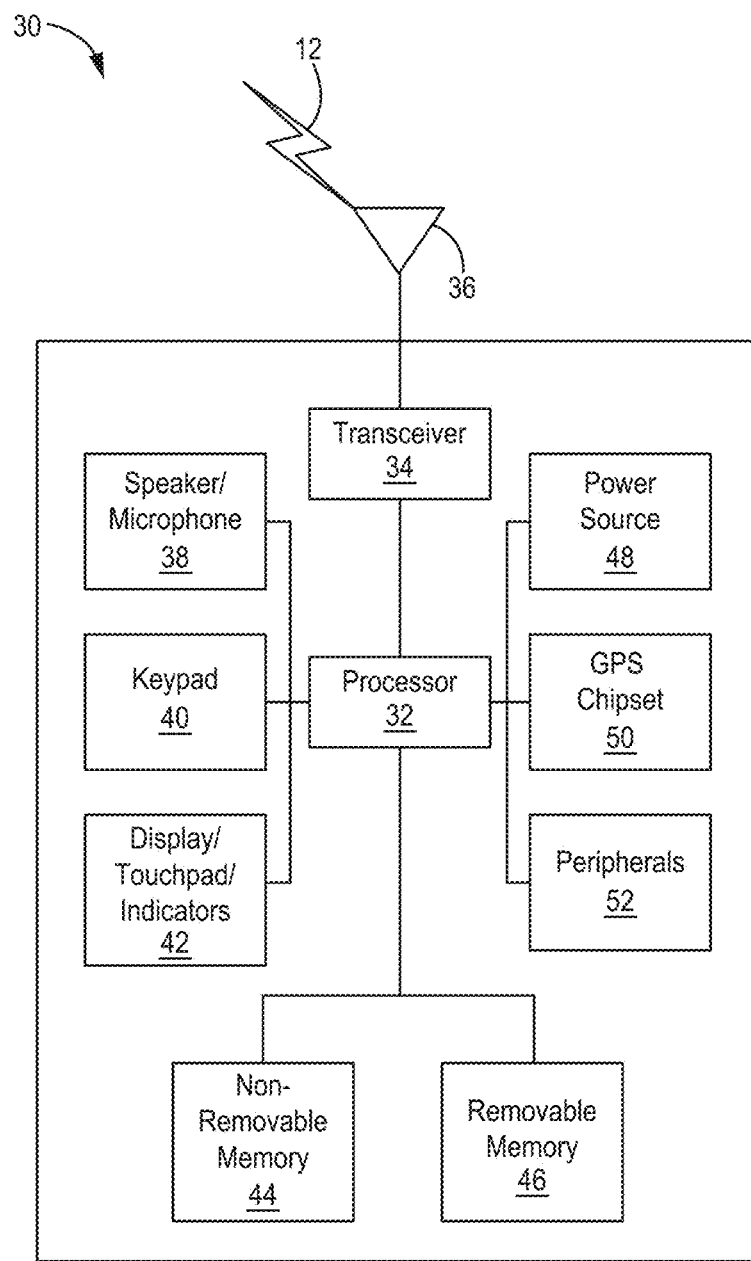
FIG. 36C is a system diagram of an example M2M/IoT terminal or gateway device that may be used within the communications system illustrated in FIG. 36A.

FIG. 36C is a block diagram of an example hardware/software architecture of a node of a network, such as one of the clients or entities illustrated in FIGS. 6-35, 37, and 38 which may operate as an M2M server, gateway, device, or other node in an M2M network such as that illustrated in FIGS. 36A and 36B. As shown in FIG. 36C, the node 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the security protection and methods related thereto described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the node 30 to operate in a wireless environment. The processor 32 may be coupled to the transceiver 34, which may be coupled to the transmit/receive element 36. While FIG. 36C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

As shown in FIG. 36C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., in FIGS. 6-35, 37, and 38) and in the claims. While FIG. 36C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, devices, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 36C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status a UE (e.g., see GUI 1400), and in particular underlying networks, applications, or other services in communication with the UE. The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

Figure 36D:
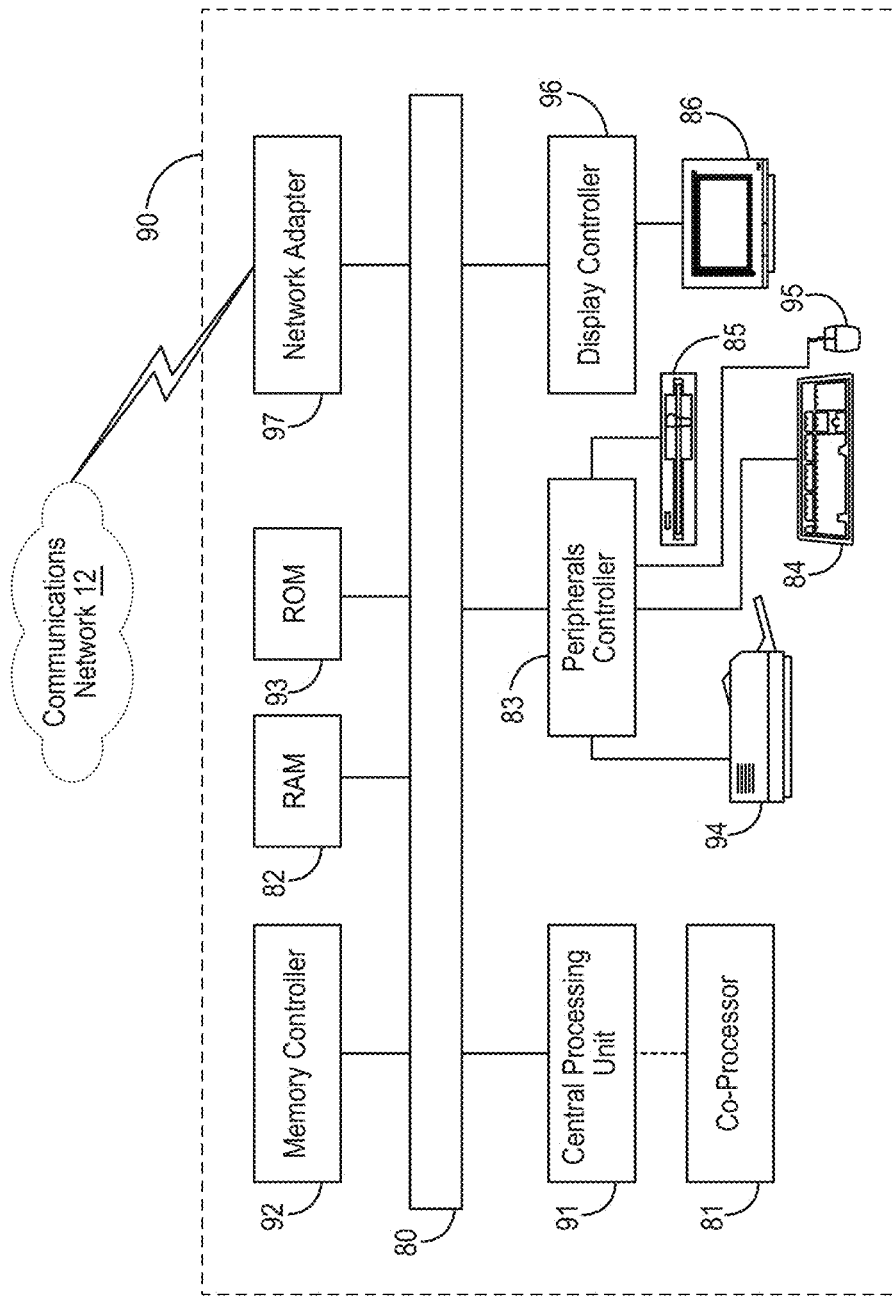
FIG. 36D is a block diagram of an example computing system in which aspects of the communication system of FIG. 36A may be embodied.

FIG. 36D is a block diagram of an exemplary computing system 90 which may also be used to implement one or more nodes of a network, such as clients or entities illustrated in FIGS. 6-35, 37, and 38, which may operate as an M2M server, gateway, device, or other node in an M2M network such as that illustrated in FIGS. 36A and 36B. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, which performs additional functions or assists CPU 91. CPU 91 and/or coprocessor 81 may receive, generate, and process data related to the disclosed systems and methods for security protection.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97 that may be used to connect computing system 90 to an external communications network, such as network 12 of FIG. 36A and FIG. 36B, to enable the computing system 90 to communicate with other nodes of the network. The communication circuitry, alone or in combination with the CPU 91, may be used to perform the transmitting and receiving steps described herein (e.g., in FIGS. 6-35, 37, and 38) and in the claims.

It will be understood that any of the methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The following is a list of acronyms relating to service level technologies that may appear in the above description. Unless otherwise specified, the acronyms used herein refer to the corresponding term listed below.

ACP Access Control Policy
AE Application Entity
AEAD Authenticated Encryption with Associated Data
AES Advanced Encryption Standard
AES—GCM AES—Galois Mode
Cert Digital Certificate
CCF Content Creation Function
CCP Content Creation Process
CCSDF Content Creation and Security Determination Function
CDB Credential Database
CHF Content Hosting Function
CLMP Content Life-cycle Management Process
CR Credential Registry
CGP Credential Registration Process
CQP Credential Requisition Process
CP Content Processing
CRP Content Retrieval Process
CRRP Credential Requisition and Registration Process
DES Digital Encryption Standard
DS Digital Signature
DTLS Datagram Transport Layer Security
ECC Elliptic Curve Cryptography
E2E End-to-End
IoT Internet-of-Things
IPSec Internet Protocol Security
JWA JSON Web Algorithms
JWE JSON Web Encryption
JWK JSON Web Key
JWS JSON Web Signature
JWT JSON Web Token
KDF Key Derivation Function
M2M Machine-to-Machine
MAC Message Authentication Code
MEF M2M Enrollment Function
NTP Network Time Protocol
PCS Protected Content Store
PKI Public Key Infrastructure
PSK Pre-Shared Key
RoT Root-of-Trust
RSA Rivest-Shamir-Addleman algorithm
SCHF Secure Content Hosting Function
SDF Security Determination Function
SE Secure Element
SEF Service Enabling Function
SESC Service Enabling and Security Configuration
SHRP Secure Hosting Requisition Process
SL Service Layer
SP Service Provider
SPDP Security Parameters Determination Function
TEE Trusted Execution Environment
TLS Transport Layer Security
TTP Trusted Third Party This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. An apparatus comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to perform operations comprising:
    receiving, from a device, a first request for one or more credentials that encrypt or integrity protect application content when stored at rest on a hosting common services entity, the request based on one or more security parameters associated with the application content; and
    sending, based on the request and to the device, the one or more credentials to cause:
        encrypting or integrity protecting the application content, and
        sending, by the device to the hosting common services entity, a second request to create a resource that stores the encrypted or integrity protected content.

2. The apparatus as recited in claim 1, wherein the one or more credentials comprise a master key for symmetric key confidentiality protection.

3. The apparatus as recited claim 1, wherein the apparatus is a common service entity, and the credentials are obtained from a trust enablement function.

4. The apparatus as recited in claim 3, wherein a second application entity that is authorized to obtain the content can obtain the one or more credentials from the trust enablement function or common service entity.

5. The apparatus as recited claim 1, wherein the apparatus is a trust enablement function.

6. The apparatus as recited in claim 1, wherein the one or more credentials comprise a credential identifier.

7. A method comprising:
    receiving, from a device, a first request for one or more credentials that encrypt or integrity protect application content when stored at rest on a hosting common services entity, the request based on one or more security parameters associated with the application content; and
    sending, based on the request and to the device, the one or more credentials to cause:

encrypting or integrity protecting the application content, and sending, by the device to the hosting common services entity, a second request to create a resource that stores the encrypted or integrity protected content.

8. The method as recited in claim 7, wherein the one or more credentials comprise a master key for symmetric key confidentiality protection.

9. The method as recited claim 7, wherein the method is performed by a common service entity, and the credentials are obtained from a trust enablement function or common service entity.

10. The method as recited in claim 9, wherein a second application entity that is authorized to obtain the content can obtain the one or more credentials from the trust enablement function.

11. The method as recited claim 7, wherein the method is performed by a trust enablement function.

12. The method as recited in claim 7, wherein the one or more credentials comprise a credential identifier.

* * * * *